(12) United States Patent
Dicker et al.

(10) Patent No.: US 11,386,424 B2
(45) Date of Patent: Jul. 12, 2022

(54) CONDUCTING TRANSACTIONS USING ELECTRONIC DEVICES WITH NON-NATIVE CREDENTIALS

(71) Applicant: Apple Inc., Cupertino, CA (US)

(72) Inventors: George R. Dicker, Sunnyvale, CA (US); Nicholas J. Shearer, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1041 days.

(21) Appl. No.: 15/415,679

(22) Filed: Jan. 25, 2017

(65) Prior Publication Data

US 2017/0213212 A1 Jul. 27, 2017

Related U.S. Application Data

(60) Provisional application No. 62/384,059, filed on Sep. 6, 2016, provisional application No. 62/348,958, filed
(Continued)

(51) Int. Cl.
*G06Q 30/00* (2012.01)
*G06Q 20/38* (2012.01)
(Continued)

(52) U.S. Cl.
CPC ......... *G06Q 20/3829* (2013.01); *G06Q 20/10* (2013.01); *G06Q 20/3223* (2013.01);
(Continued)

(58) Field of Classification Search
None
See application file for complete search history.

(56) References Cited

U.S. PATENT DOCUMENTS

| | | | |
|---|---|---|---|
| 7,813,822 B1 * | 10/2010 | Hoffberg | H04N 7/163 |
| | | | 381/73.1 |
| 8,219,490 B2 * | 7/2012 | Hammad | G06Q 20/387 |
| | | | 705/40 |

(Continued)

FOREIGN PATENT DOCUMENTS

| | | |
|---|---|---|
| CN | 102254259 | 11/2011 |
| CN | 105099694 | 11/2015 |

(Continued)

OTHER PUBLICATIONS

Smart Card Alliance. "Security of Proximity Mobile Payments." (May 2009). Retrieved online Feb. 28, 2022. https://www.securetechalliance.org/resources/pdf/Security_of_Proximity_Mobile_Payments.pdf (Year: 2009).*

(Continued)

*Primary Examiner* — James A Reagan
(74) *Attorney, Agent, or Firm* — Bakerhostetler

(57) ABSTRACT

Systems, methods, and computer-readable media for conducting a transaction using an electronic device with a non-native credential are provided. In one embodiment, a client electronic device in a system including a credential subsystem, a processing subsystem, and a host electronic device may include an online communications component and a processor that accesses, from the processing subsystem, potential transaction data indicative of a transaction, communicates, to the host electronic device using the online communications component, credential request data based on the potential transaction data, receives, from the host electronic device using the online communications component, host credential data based on the credential request data, and communicates, to the processing subsystem, the host credential data, wherein the host credential data is operative to access funds or other suitable enabling elements (Continued)

from the credential subsystem for funding at least a portion of the transaction. Additional embodiments are also provided.

35 Claims, 14 Drawing Sheets

Related U.S. Application Data on Jun. 12, 2016, provisional application No. 62/286,938, filed on Jan. 25, 2016.

(51) Int. Cl.
    *G06Q 20/32* (2012.01)
    *G06Q 20/10* (2012.01)
    *G06Q 20/40* (2012.01)

(52) U.S. Cl.
    CPC ..... *G06Q 20/3278* (2013.01); *G06Q 20/3821* (2013.01); *G06Q 20/401* (2013.01); *G06Q 2220/00* (2013.01)

(56) References Cited

U.S. PATENT DOCUMENTS

| | | | | |
|---|---|---|---|---|
| 8,316,237 | B1* | 11/2012 | Felsher | H04L 9/3249 380/282 |
| 8,423,415 | B2* | 4/2013 | Sahota | G06Q 20/10 705/16 |
| 8,571,937 | B2* | 10/2013 | Rose | G06Q 20/12 705/16 |
| 8,577,803 | B2* | 11/2013 | Chatterjee | G06Q 20/326 705/41 |
| 9,276,740 | B2* | 3/2016 | Nix | H04L 9/30 |
| 9,757,644 | B2* | 9/2017 | Rose | G06Q 30/0601 |
| 10,500,481 | B2* | 12/2019 | Rose | G06Q 30/0241 |
| 10,688,385 | B2* | 6/2020 | Rose | G06Q 20/3224 |
| 2006/0219776 | A1* | 10/2006 | Finn | G06K 7/0043 235/380 |
| 2007/0022058 | A1* | 1/2007 | Labrou | G06Q 20/401 705/67 |
| 2007/0233615 | A1* | 10/2007 | Tumminaro | G06Q 20/12 705/75 |
| 2007/0255620 | A1* | 11/2007 | Tumminaro | H04W 12/068 705/40 |
| 2007/0255653 | A1* | 11/2007 | Tumminaro | G06Q 20/327 705/39 |
| 2009/0112768 | A1* | 4/2009 | Hammad | G06Q 20/401 705/44 |
| 2009/0254485 | A1* | 10/2009 | Baentsch | G06Q 20/20 705/71 |
| 2009/0307139 | A1* | 12/2009 | Mardikar | H04W 12/069 726/19 |
| 2010/0051685 | A1 | 3/2010 | Royyuru et al. | |
| 2011/0264582 | A1* | 10/2011 | Kim | G06Q 20/14 705/40 |
| 2011/0289004 | A1 | 11/2011 | Prakash et al. | |
| 2012/0030047 | A1* | 2/2012 | Fuentes | G06Q 20/425 705/26.1 |
| 2012/0136780 | A1* | 5/2012 | El-Awady | G06Q 20/102 705/40 |
| 2012/0150598 | A1* | 6/2012 | Griggs | G06Q 20/384 705/14.16 |
| 2012/0215693 | A1 | 8/2012 | Faith et al. | |
| 2012/0221421 | A1* | 8/2012 | Hammad | G06Q 10/00 705/16 |
| 2012/0290376 | A1* | 11/2012 | Dryer | G06Q 20/425 705/14.23 |
| 2012/0316992 | A1* | 12/2012 | Oborne | G06Q 20/386 705/26.41 |
| 2012/0330764 | A1 | 12/2012 | Nahidipour | |
| 2013/0013499 | A1* | 1/2013 | Kalgi | G06Q 20/12 705/41 |
| 2013/0144785 | A1* | 6/2013 | Karpenko | G06Q 20/425 705/44 |
| 2013/0160134 | A1 | 6/2013 | Marcovecchio et al. | |
| 2013/0166332 | A1* | 6/2013 | Hammad | G06Q 20/12 705/28 |
| 2013/0262317 | A1* | 10/2013 | Collinge | G06Q 20/4012 705/72 |
| 2013/0282567 | A1* | 10/2013 | Bacastow | G06Q 20/4016 705/39 |
| 2013/0317924 | A1 | 11/2013 | Bush et al. | |
| 2013/0317927 | A1* | 11/2013 | Bush | G06Q 20/3278 705/21 |
| 2014/0074637 | A1* | 3/2014 | Hammad | G06Q 20/351 705/41 |
| 2014/0279552 | A1* | 9/2014 | Ortiz | G06Q 20/3278 705/65 |
| 2014/0298027 | A1* | 10/2014 | Roberts | G06Q 20/20 713/171 |
| 2015/0019944 | A1* | 1/2015 | Kalgi | G06Q 20/3552 715/205 |
| 2015/0032603 | A1* | 1/2015 | Rutherford | G06K 5/00 705/39 |
| 2015/0058191 | A1 | 2/2015 | Khan et al. | |
| 2015/0073907 | A1* | 3/2015 | Purves | G02B 27/017 705/14.58 |
| 2015/0095219 | A1* | 4/2015 | Hurley | G06Q 20/3829 705/39 |
| 2015/0095238 | A1* | 4/2015 | Khan | G06Q 20/3823 705/71 |
| 2015/0106616 | A1* | 4/2015 | Nix | H04W 52/0277 713/170 |
| 2015/0142666 | A1* | 5/2015 | Landrok | G06Q 20/4016 705/67 |
| 2015/0161587 | A1 | 6/2015 | Khan et al. | |
| 2015/0213433 | A1 | 7/2015 | Khan | |
| 2015/0326545 | A1 | 11/2015 | Khan | |
| 2015/0348009 | A1 | 12/2015 | Brown et al. | |
| 2015/0371226 | A1 | 12/2015 | Hurley et al. | |
| 2017/0017936 | A1* | 1/2017 | Bisikalo | G06Q 20/308 |
| 2017/0017954 | A1* | 1/2017 | McDonough | H04L 9/3239 |
| 2017/0017955 | A1* | 1/2017 | Stern | G06F 21/645 |

FOREIGN PATENT DOCUMENTS

| | | | |
|---|---|---|---|
| CN | 105474224 | 4/2016 | |
| JP | 2003-141432 | 5/2003 | |
| JP | 3459376 B | 10/2003 | |
| JP | 2013058218 A | * 3/2013 | ............. G06Q 10/10 |
| JP | 2013153425 A | * 8/2013 | ......... G06Q 20/3278 |
| JP | 2016076262 A | * 5/2016 | ............. G06Q 20/02 |
| KR | 10-0806993 B | 2/2008 | |
| KR | 10-0949652 B | 3/2010 | |
| KR | 2010-0075497 | 7/2010 | |
| KR | 10-1075891 B | 10/2011 | |
| WO | 2013/067521 A2 | 5/2013 | |

OTHER PUBLICATIONS

Steven J. Olivieri. "An Investigation of Security in Near Field Communication Systems." (Jan. 26, 2015). Retrieved online Feb. 28, 2022. https://web.wpi.edu/Pubs/ETD/Available/etd-012615-000457/unrestricted/olivieri.pdf (Year: 2015).*

Pardis Pourghomi et al. "A Proposed NFC Payment Application." (2013). Retrieved online Feb. 28, 2022. https://arxiv.org/ftp/arxiv/papers/1312/1312.2828.pdf (Year: 2013).*

Clark, "ACS launches token-sized USB plug and play NFC contactless reader", NFC World, Nov. 9, 2009, 5 pages, https://www.nfcworld.com/2009/11/09/32220/acs-launches-token-sized-usb-plug-and-play-nfc-contactless-reader/.

Clark, "Ask launches contactless and NFC reader for home PCs" NFC World, Oct. 20, 2009, 5 pages, https://www.nfcworld.com/2009/10/20/32028/ask-launches-contactless-and-nfc-reader-for-home-pcs/.

Clark, "MasterCard and ING test NFC for online payments." NFC World, Nov. 7, 2012, 7 pages, https://www.nfcworld.com/2012/11/07/320990/mastercard-and-ing-test-nfc-for-online-payments/.

(56) References Cited

OTHER PUBLICATIONS

Coskun et al., "Near Field Communication: From Theory to Practice", Feb. 13, 2012, 185 pages.

Demeter, "Near Field Communication im Handel", Nov. 20, 2013, 46 pages.

Langer et al., "Anwedndungen und Technik von Near Field Communication (NFC)", Sep. 16, 2010, 276 pages.

Rankl et al., "Smart Card Handbook, Fourth Edition", Jul. 19, 2010, 49 pages.

Roland et al. "Cloning Credit Cards: A combined pre-play and downgrade attack on EMV Contactless" Proceeding WOOT '13, Proceedings of the 7th USENIX conference on Offensive Technologies, Aug. 13, 2013, 12 pages, http://0b4af6cdc2f0c5998459-c0245c5c937c5dedcca3f1764ecc9b2f.r43.cf2.rackcdn.com/12055-woot13-roland.pdf.

Stanek, "Windows Server 2012 Inside Out", Jan. 25, 2013, 4 pages.

Wikipedia, "Online shopping", Sep. 30, 2015, 12 pages, https://en.wikipedia.org/w/index.php?title=Online_shopping&oldid=683443843.

Wikipedia, "Unique identifier", Aug. 17, 2015, 4 pages, https://en.wikipedia.org/w/index.php?title=Unique_identifier&oldid=676547469.

Japanese Office Action from Japanese Patent Application No. 2018-558106, dated Sep. 9, 2019, 8 pages including English language translation.

European Office Action from European Patent Application No. 17703605.0, dated Jun. 9, 2020, 10 pages.

Japanese Office Action from Japanese Patent Application No. 2018-558106, dated Jun. 8, 2020, 6 pages including English language translation.

Wikipedia, "Payment Terminal," Jan. 15, 2016, 5 pages, retrieved from https://en.wikipedia.org/w/index.php?title=Payment_terminal&oldid=699926379.

Korean Office Action from Korean Patent Application No. 10-2018-702213 8, dated Mar. 2, 2021, 7 pages including English language translation.

Indian Office Action from Indian Patent Application No. 201817030235, dated Dec. 10, 2020, 8 pages.

Japanese Decision of Grant from Japanese Patent Application No. 2018-558106, dated Dec. 3, 2020, 4 pages including English language translation.

Korean Office Action from Korean Patent Application No. 10-2018-702213 8, dated Jun. 10, 2021, 9 pages including English language translation.

Chinese Office Action from Chinese Patent Application No. 201780008066.7, dated Jul. 5, 2021, 34 pages including English language translation.

European Office Action from European Patent Application No. 17703605.0, dated Jul. 6, 2021, 10 pages.

"Digital wallet," Wikipedia, last edited Oct. 2015, retrieved from https://en.wikipedia.org/w/index.php?title=Digital_wallet&oldid=687417892, 4 pages.

Korean Office Action from Korean Patent Application No. 10-2018-702213 8, dated Jan. 31, 2020, 15 pages including English language translation.

Japanese Office Action from Japanese Paten Application No. 2020-170396, dated Feb. 2, 2022, 7 pages including English language translation.

Chinese Office Action from Chinese Patent Application No. 201780008066.7, dated Apr. 6, 2022, 35 pages including English language translation.

Korean Office Action from Korean Patent Application No. 2018-7022138, dated Apr. 4, 2022, 19 pages including English language translation.

Korean Office Action from Korean Patent Application No. 2021-7021813, dated Feb. 24, 2022, 5 pages including machine-generated English language translation.

\* cited by examiner

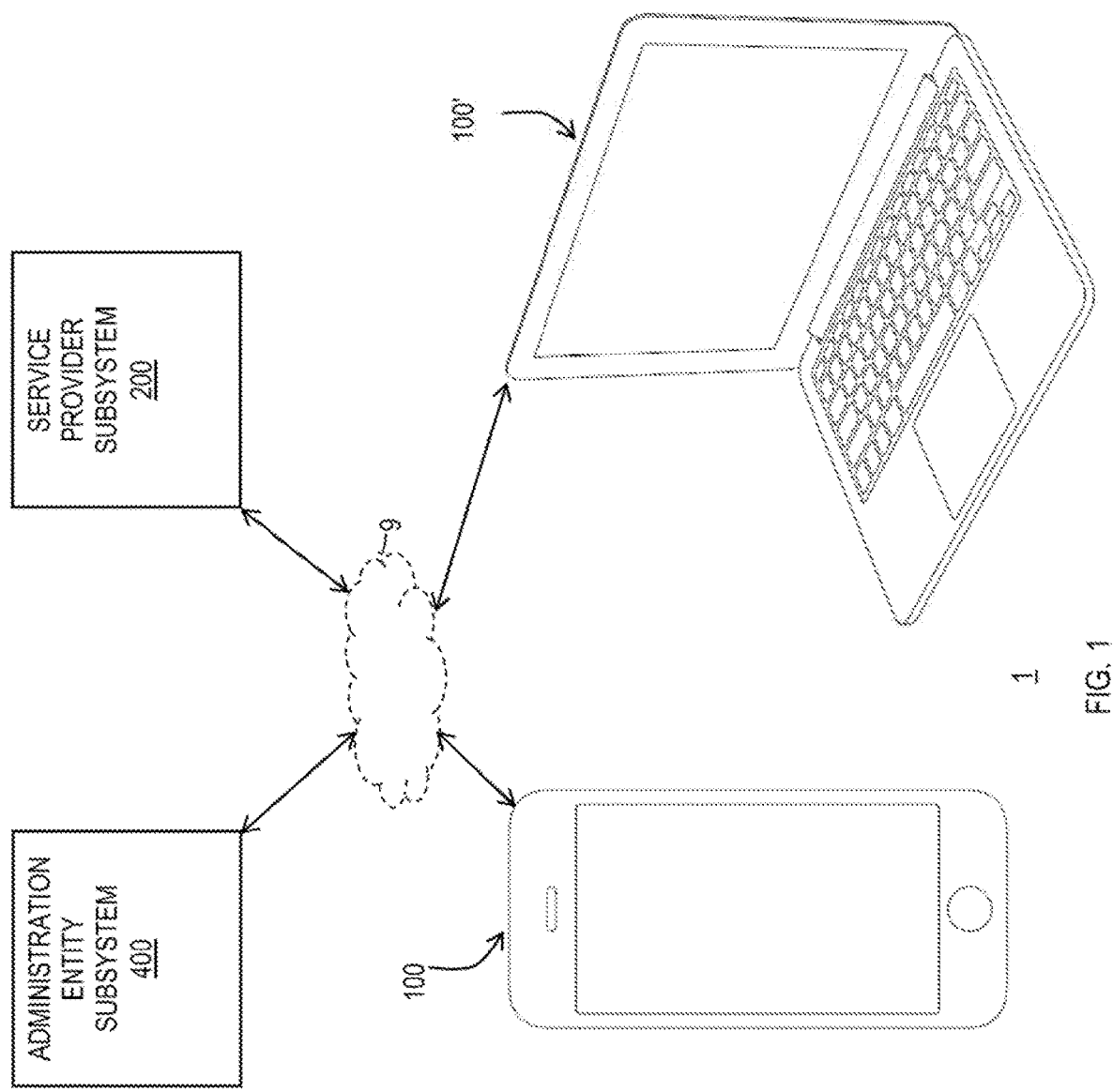

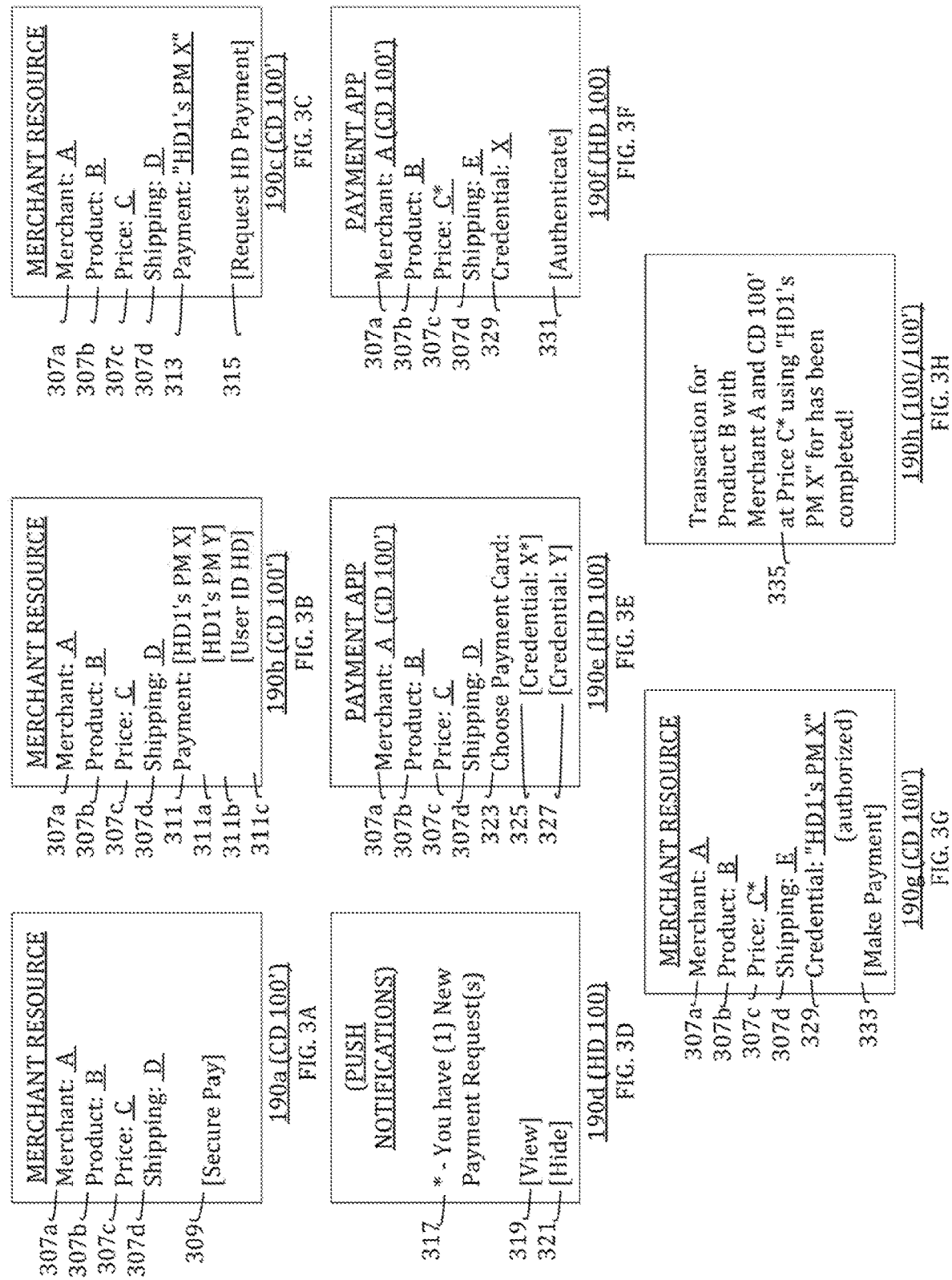

COMMUNICATE, AT A CLIENT ELECTRONIC DEVICE, WITH A SERVICE PROVIDER SUBSYSTEM TO DEFINE AT LEAST A PORTION OF A TRANSACTION FOR PURCHASING ACCESS TO A PRODUCT OF THE SERVICE PROVIDER SUBSYSTEM
1002

↓

INVOLVING, WITH THE CLIENT ELECTRONIC DEVICE, A HOST ELECTRONIC DEVICE TO GENERATE A TRANSACTION CREDENTIAL FOR FUNDING THE TRANSACTION
1004

CONDUCTING TRANSACTIONS USING ELECTRONIC DEVICES WITH NON-NATIVE CREDENTIALS

CROSS-REFERENCE TO RELATED APPLICATION(S)

This application claims the benefit of prior filed U.S. Provisional Patent Application No. 62/286,938, filed Jan. 25, 2016, U.S. Provisional Patent Application No. 62/348,958, filed Jun. 12, 2016, and U.S. Provisional Patent Application No. 62/384,059, filed Sep. 6, 2016, each of which is hereby incorporated by reference herein in its entirety.

TECHNICAL FIELD

This disclosure relates to conducting a transaction using an electronic device with a non-native credential and, more particularly, to conducting a transaction using a client electronic device with a credential from a host electronic device.

BACKGROUND OF THE DISCLOSURE

Portable electronic devices (e.g., cellular telephones) may be provided with near field communication ("NFC") components for enabling contactless proximity-based communications with another entity (e.g., a merchant). Often times, these communications are associated with financial transactions or other secure data transactions that require the electronic device to generate, access, and/or share a native payment credential, such as a credit card credential, with the other entity in a contactless proximity-based communication. However, efficient use of such a native payment credential by the electronic device in other types of communications (e.g., online financial transactions) has often been inefficient.

SUMMARY OF THE DISCLOSURE

This document describes systems, methods, and computer-readable media for conducting a transaction using an electronic device with a non-native credential.

As an example, a method for conducting a financial transaction with a merchant subsystem using a commercial entity subsystem, a client electronic device, and a host electronic device that includes a secure element and a host credential application provisioned on the secure element, may include, at the host electronic device, receiving, from the client electronic device, payment request data that includes merchant subsystem identifier information that identifies the merchant subsystem and host credential application identifier information that identifies the host credential application, generating, on the secure element using the host credential application identified by the received payment request data, first data that includes host payment credential data, generating, on the secure element, second data by encrypting the first data and the merchant subsystem identifier information of the received payment request data with a first key, transmitting, to the commercial entity subsystem, the second data, receiving third data that includes the first data encrypted with a second key that is associated with the merchant subsystem identifier information, and transmitting the received third data to fund at least a portion of the financial transaction.

As another example, a method for conducting a financial transaction with a merchant subsystem using a client electronic device and a host electronic device, may include, at the client electronic device, receiving, from the merchant subsystem, potential transaction data indicative of the financial transaction, transmitting, to the host electronic device, payment request data based on the received potential transaction data, receiving host transaction data that includes host payment credential data generated by the host electronic device based on the transmitted payment request data, and transmitting, to the merchant subsystem, the host payment credential data of the received host transaction data to fund at least a portion of the financial transaction.

As another example, a method for conducting a financial transaction with a merchant subsystem using a commercial entity subsystem, a client electronic device, and a host electronic device that includes a secure element and a host credential application provisioned on the secure element, may include, at the commercial entity subsystem, receiving, from the client electronic device, a host availability request that identifies at least one payment type acceptable to the merchant subsystem for funding the financial transaction, determining that the host electronic device is associated with the client electronic device, based on the determination that the host electronic device is associated with the client electronic device, determining that the host credential application provisioned on the secure element of the host electronic device satisfies the identified at least one payment type of the received host availability request, and based on the determination that the host credential application satisfies the identified at least one payment type, transmitting, to the client electronic device, a host availability response that identifies the host electronic device.

As yet another example, a client electronic device in a system including a financial institution subsystem, a merchant subsystem, and a host electronic device, may include an online communications component and a processor that accesses, from the merchant subsystem using the online communications component, potential transaction data indicative of a financial transaction, communicates, to the host electronic device using the online communications component, payment request data based on the potential transaction data, receives, from the host electronic device using the online communications component, host payment credential data based on the payment request data, and communicates, to the merchant subsystem using the online communications component, the host payment credential data, wherein the host payment credential data is operative to access funds from the financial institution subsystem for funding at least a portion of the financial transaction.

As yet another example, a non-transitory computer-readable storage medium storing at least one program may be provided, the at least one program including instructions, which when executed by an electronic device including a user interface output component, cause the electronic device to identify at least one payment type acceptable to a merchant subsystem for funding a potential transaction, transmit host availability request data indicative of the identified at least one payment type, process host availability response data from another electronic device based on the host availability request data, and, in response to the processing, present, using the user interface output component, a user-selectable option operative to initiate transmission of payment request data to the other electronic device.

As yet another example, a method may be provided for conducting transactions with a service provider subsystem using a client electronic device and a host electronic device. The method may include, at the client electronic device, communicating with the service provider subsystem to define at least a portion of a transaction for purchasing access to a product of the service provider subsystem, and involving the host electronic device to generate a transaction credential for funding the transaction.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which:

FIG. 1 is a schematic view of an illustrative system for conducting a transaction;

FIGS. 3A-3H are front views of screens of a graphical user interface of an electronic device of one or more of FIGS. 1-3 illustrating processes for conducting a transaction;

FIGS. 5-10 are flowcharts of illustrative processes for conducting a transaction.

DETAILED DESCRIPTION OF THE DISCLOSURE

A credential (e.g., a payment credential or any other suitable transaction credential) provisioned on a secure element of a credential-enabled (or payment-enabled) host electronic device may be used for securely funding or otherwise conducting a transaction (e.g., a financial transaction or any other suitable credential transaction) with a merchant (or service provider or processing) subsystem via a client electronic device that may be interfacing with the merchant subsystem. While interfacing with the merchant subsystem (e.g., via an online resource (e.g., an online app or web browser) or via a contactless proximity-based communication medium) for accessing (e.g., purchasing) a merchant product, the client device may identify the host device as a desired source of a credential to be used for funding or otherwise furthering the transaction to access the merchant product. The client device may then send to the identified host device a credential (or payment) request that may be indicative of the transaction to be funded (e.g., data indicative of the merchant, the product(s) to be purchased, the cost of the transaction, the currency of the transaction, the shipping address of the transaction, etc.). In response to the host device receiving the payment request and after a user of the host device approves the request, certain credential data (e.g., token data and associated crypto data) for a credential (e.g., a payment credential) provisioned on the host device may be provided by the secure element of the host device and securely communicated along with any other suitable transaction information (e.g., data indicative of the merchant, the product(s) to be purchased, the cost of the transaction, the currency of the transaction, the shipping address of the transaction, etc.) from the host device to the client device or to the merchant subsystem or to a financial institution (or issuing or credential) subsystem for funding the transaction. Such credential data may not be shared directly between the host electronic device and the merchant subsystem. Instead, the client device may receive the credential data from the host device and then the client device may share the credential data with the merchant subsystem. The client device may identify and communicate with the host device using any suitable techniques including by leveraging an identity management service of a commercial (or administration or trusted) entity subsystem that may be operative to monitor the status of various credentials of various host devices that may or may not be associated with the client device.

Figure 1A:
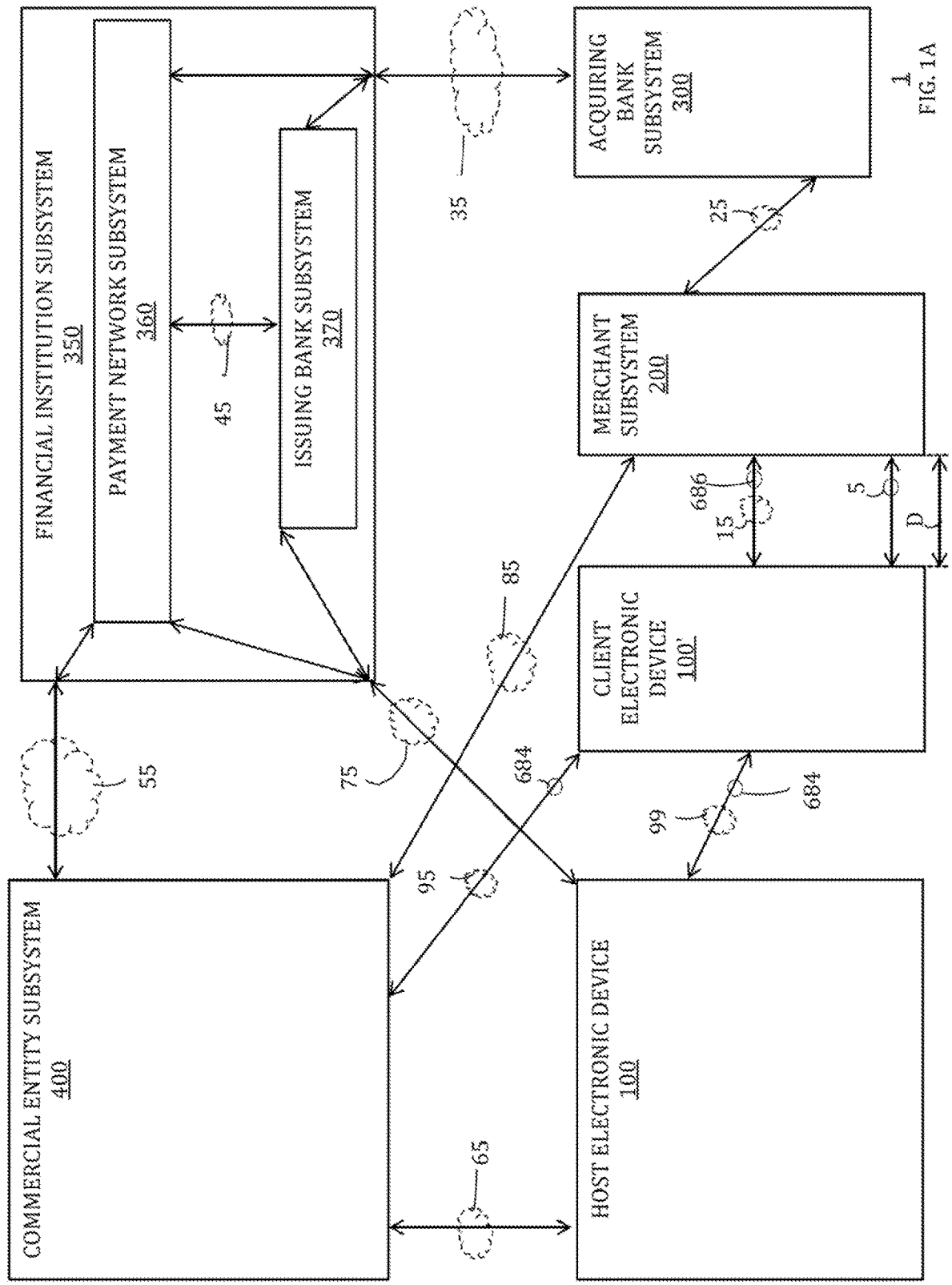
FIG. 1A is a more detailed schematic view of the system of FIG. 1.
Figure 1B:
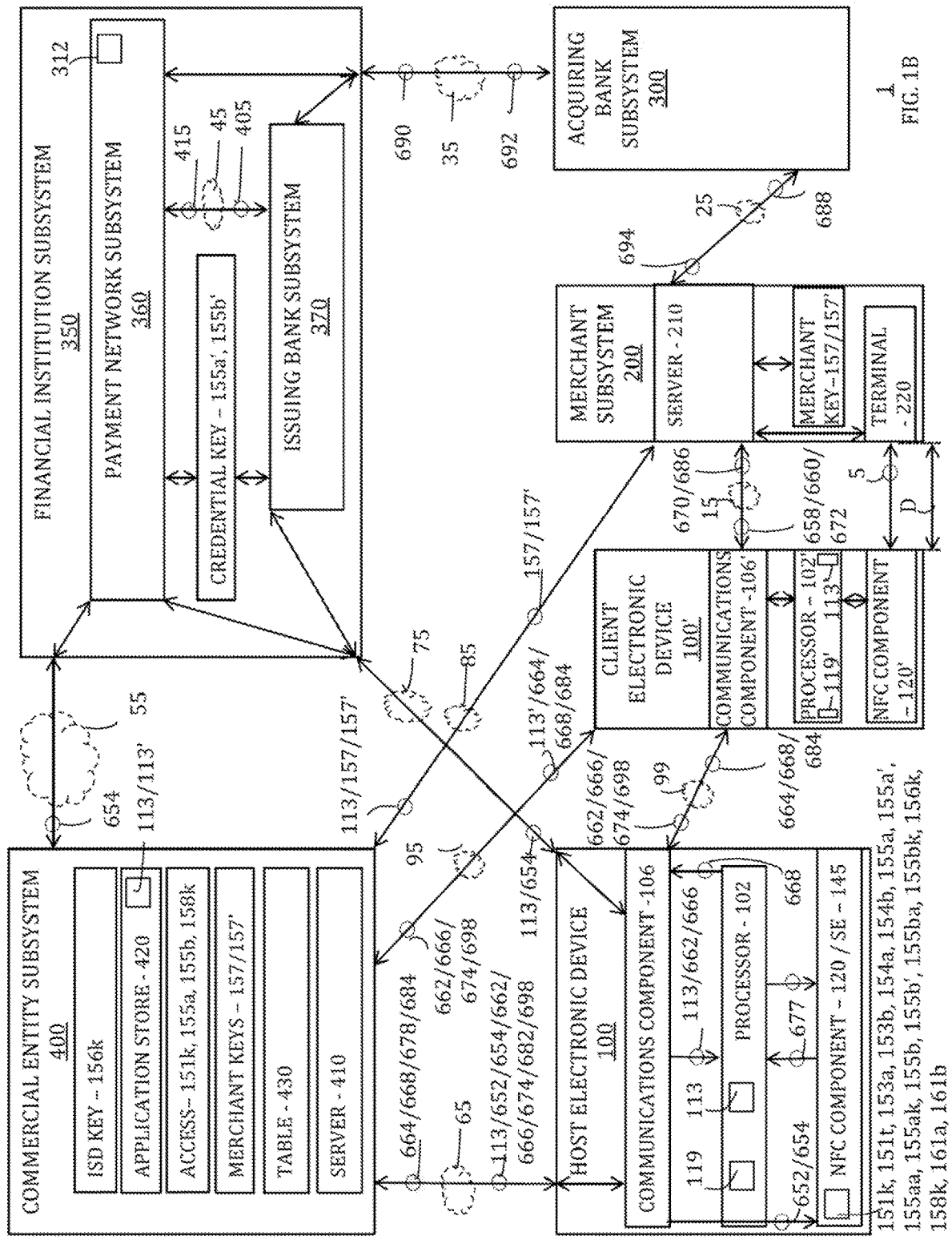
FIG. 1B is another more detailed schematic view of the system of FIGS. 1 and 1A.
Figure 2:
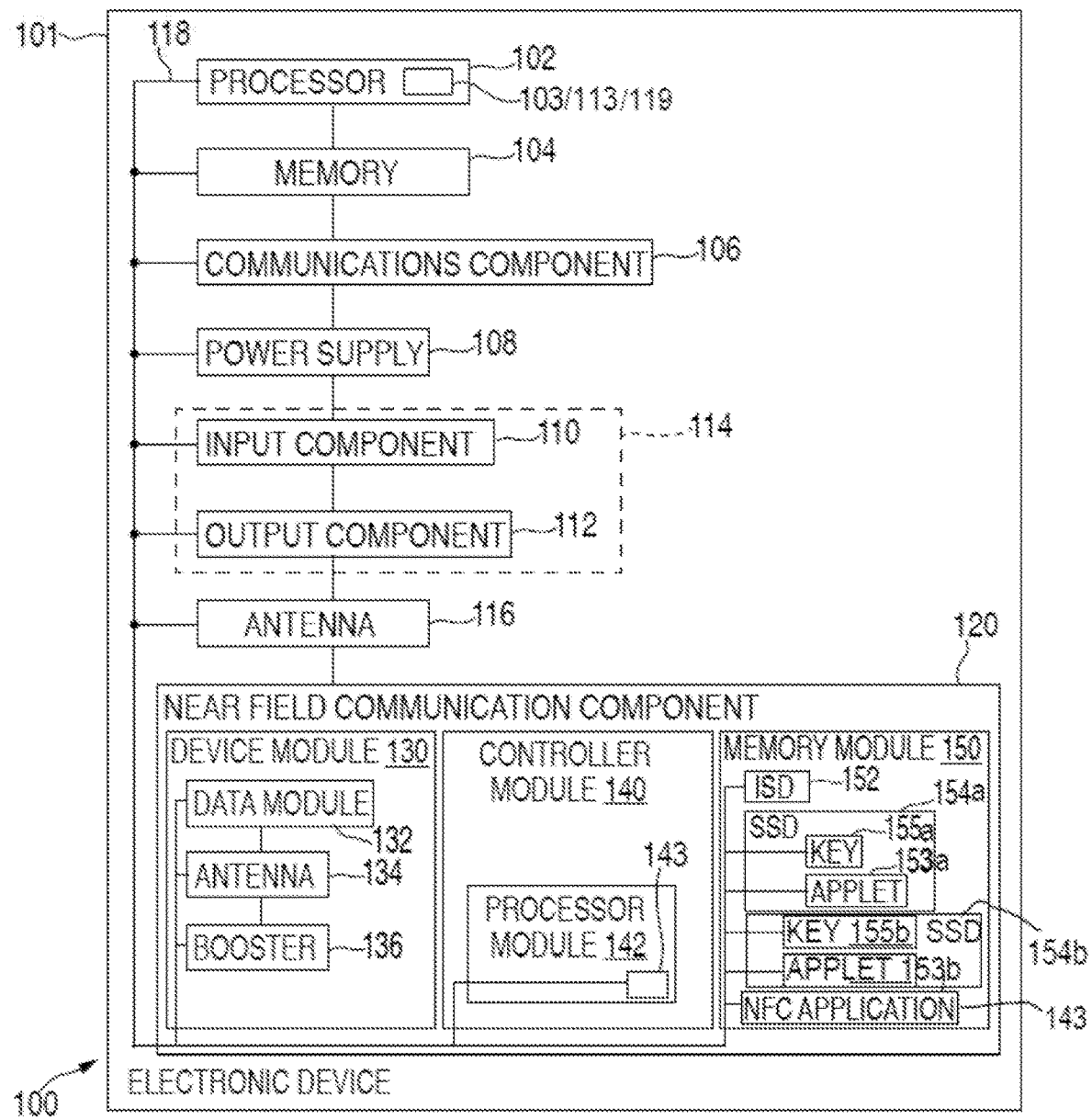
FIG. 2 is a more detailed schematic view of an electronic device of the system of FIGS. 1-1B.
Figure 3:
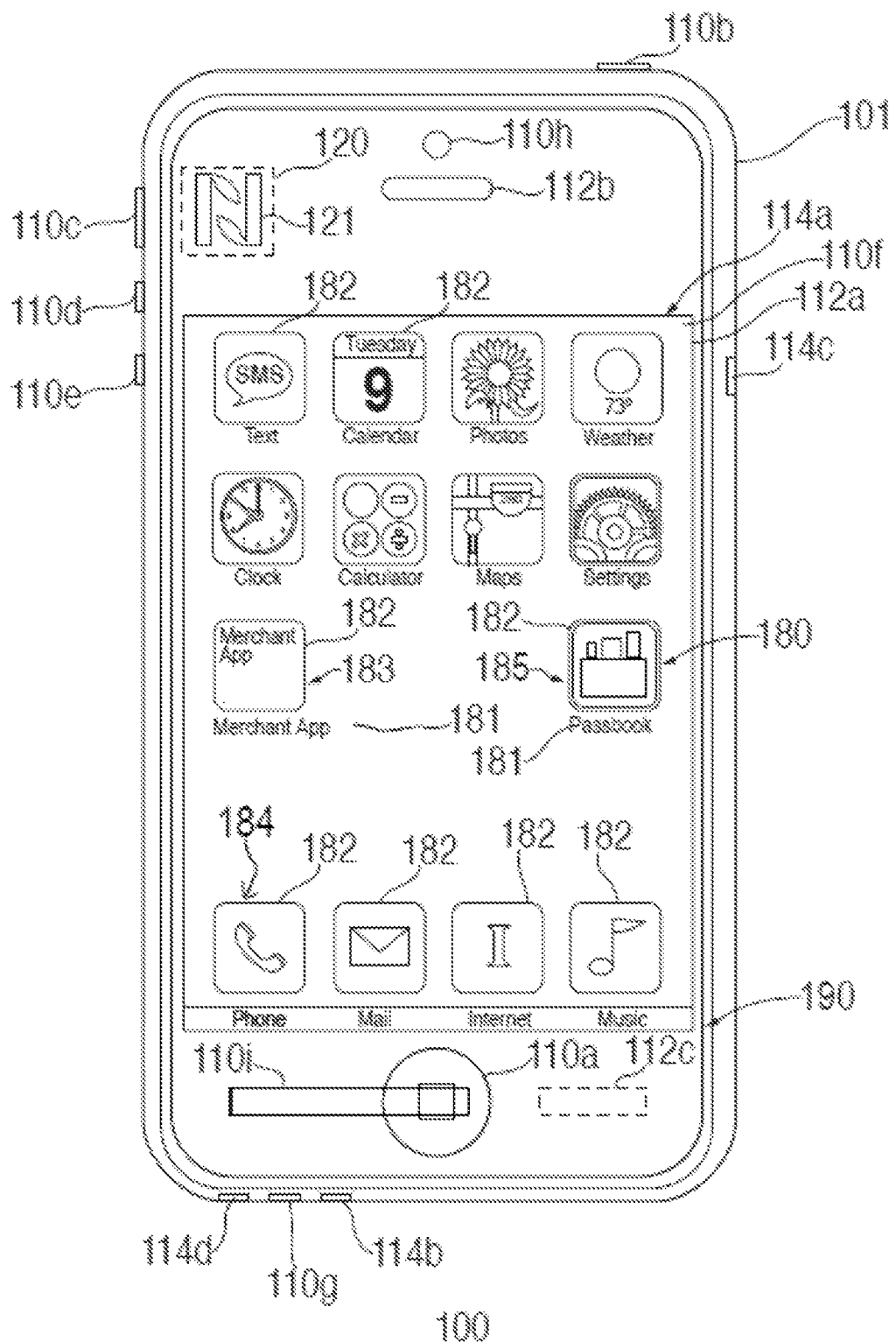
FIG. 3 is a front view of the electronic device of FIGS. 1-2A.
Figure 4:
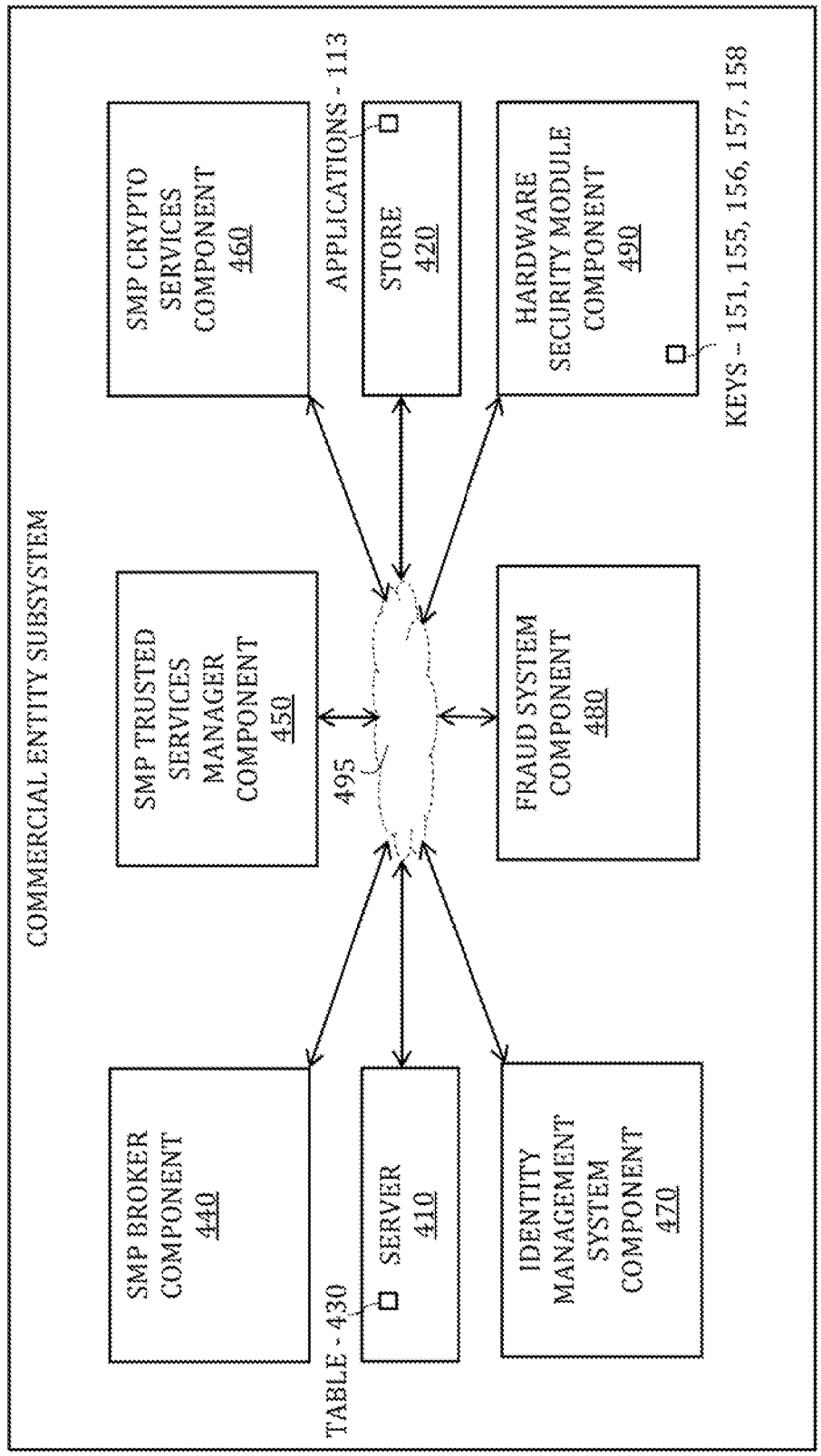
FIG. 4 is a more detailed schematic view of the commercial entity subsystem of the system of FIGS. 1-1B.

FIG. 1 shows a system 1 in which a credential provisioned on a host electronic device 100, perhaps in conjunction with an administration (or commercial or trusted) entity subsystem 400, may be used by host electronic device 100 for conducting a transaction with a service provider (or merchant or processing) subsystem 200 via a client electronic device 100' or at the request of client electronic device 100', FIGS. 1A and 1B show more detail of system 1 in which one or more credentials may be provisioned onto host electronic device 100 from a financial institution (or issuing or credential) subsystem 350 in conjunction with commercial (or administration or trusted) entity subsystem 400, and in which such credentials may be used by host electronic device 100 for conducting a transaction with merchant (or service provider or processing) subsystem 200 and an associated acquiring subsystem 300 (e.g., acquiring bank subsystem) via or at the request of client electronic device 100', while FIGS. 2-3 show further details with respect to particular embodiments of one or more electronic devices of system 1, FIGS. 3A-3H show example screens 190a-190h that may be representative of graphical user interfaces of one or more electronic devices of system 1 during such a transaction, FIG. 4 shows further details with respect to particular embodiments of commercial entity subsystem 400 of system 1, and FIGS. 5-10 are flowcharts of illustrative processes for conducting such a transaction.

Description of FIG. 1

FIG. 1 is a schematic view of an illustrative system 1 that may allow for the secure use of a credential on a host electronic device in a transaction (e.g., an online payment or a contactless proximity-based payment) with a service provider (or merchant or processor) via or at the request of a client electronic device. For example, as shown in FIG. 1, system 1 may include an end-user host electronic device 100 with at least one credential provisioned thereon (e.g., on a secure element of host electronic device 100), an end-user client electronic device 100' that may or may not have at least one credential provisioned thereon, an administration (or commercial or trusted) entity subsystem 400 and a service provider (or merchant or processing) subsystem 200. Communication of any suitable data between any two of host electronic device 100, client electronic device 100', service provider subsystem 200, and administration entity subsystem 400 may be enabled via any suitable communications set-up 9, which may include any suitable wired communications path, wireless communications path, or combination of two or more wired and/or wireless communications paths using any suitable communications protocol(s) and/or any suitable network and/or cloud architecture(s).

A credential (e.g., a payment credential or any other suitable transaction credential) may be provisioned on host electronic device 100 (e.g., on a secure element or other storage component of host electronic device 100) from any suitable credential issuing subsystem (e.g., a financial institution subsystem), either directly from the credential issuing subsystem or via administration entity subsystem 400, which may be operative to securely communicate credential data onto host device 100 and manage such credential data. Once provisioned on host device 100, a transaction credential may then be used by host device 100 for securely funding or otherwise conducting a transaction (e.g., a financial transaction or any other suitable credential transaction) with service provider subsystem 200 (e.g., any suitable subsystem that may be operative to provide access to any suitable good or service as part of a transaction), either via client device 100' that may be interfacing with service provider subsystem 200 or on behalf of client device 100' that may have initiated the transaction with service provider subsystem 200.

For example, while interfacing with service provider subsystem 200 (e.g., via an online resource (e.g., an online app or web browser) or via a contactless proximity-based communication medium) for accessing (e.g., purchasing) a service provider product, client device 100' may identify host device 100 as a desired source of a transaction credential to be used for funding or otherwise furthering a transaction to access the service provider product. Client device 100' may be either a type of device that may not be configured to store or otherwise have provisioned thereon a transaction credential for use in funding the transaction (e.g., client device 100' may not include a secure element operative to securely utilize a payment credential) or a type of device that is configured to store a transaction credential but that does not currently have a particular credential stored thereon that is desired to be used in a particular transaction initiated by client device 100'. For example, at any suitable point during any suitable communication between client device 100' and service provider subsystem 200 for defining a transaction to access a product of service provider subsystem 200, client device 100' may identify or have identified on its behalf (e.g., by administration entity subsystem 400) the availability of at least one transaction credential stored on host device 100 that may be available for use in funding the transaction. Then, client device 100' may share any suitable data with host device 100 for requesting that such a transaction credential on host device 100 be shared with service provider subsystem 200 for funding the transaction on behalf of client device 100'. In response to such a request, host device 100 may generate any suitable transaction credential data that may be operative to fund the transaction. Then, in some embodiments, host device 100 may communicate such transaction credential data along with any other suitable transaction data (e.g., the transaction data included in the request from client device 100') to service provider subsystem 200 for completing the funding of the transaction without client device 100' handling the transaction credential data (e.g., client device 100' may hand off control of the transaction to host device 100 (e.g., in a communication along with the request for the transaction credential)). Alternatively, in other embodiments, host device 100 may communicate such transaction credential data back to client device 100' and client device 100' may then communicate the transaction credential data on to service provider subsystem 200 for completing the funding of the transaction (e.g., without service provider subsystem 200 having to communicate with or even be aware of host device 100 (e.g., as if the transaction credential data had been generated locally on client device 100')). In either scenario, administration entity subsystem 200 may be utilized as a conduit between service provider subsystem 200 and either device that may be communicating the transaction credential data (e.g., for enabling a secure communication path using any suitable shared secret(s) or other security features of administration provider subsystem 200). Moreover, client device 100' may identify and/or otherwise communicate with host device 100 using any suitable techniques, including directly via a peer-to-peer or other direct link or by using an identity management service or any other suitable service of administration entity subsystem 200 that may be operative to monitor the status of various credentials of various host devices that may or may not be associated with client device 100' (e.g., host device 100 and client device 100' may be paired or otherwise associated with one another based on a common user account managed by administration entity subsystem 200, which may facilitate any suitable portions of the transaction process).

Description of FIG. 1A

Referring now to FIG. 1A, FIG. 1A shows an expanded view of the system 1 described above with respect to FIG. 1 that may allow for the secure use of a credential on a host electronic device in a transaction (e.g., an online payment or a contactless proximity-based payment) with a merchant via a client electronic device. For example, as shown in FIG. 1A, system 1 may include an end-user host electronic device 100 as well as a commercial entity subsystem 400 and a financial institution (or credential or issuing) subsystem 350 for securely provisioning one or more credentials on host electronic device 100. Moreover, as shown in FIG. 1A, system 1 may also include an end-user client electronic device 100' and a merchant (or service provider or processing) subsystem 200, whereby such a provisioned credential may be used by host device 100 for conducting a financial transaction with merchant subsystem 200 via client device 100'. For example, in response to receiving a client payment request from client device 100' for a particular financial transaction with merchant subsystem 200, host device 100 may share host transaction data or host payment credential data of the provisioned credential with client device 100' (e.g., as secured host transaction data 684), and client device 100' may then share that host payment credential data with merchant subsystem 200 as a contactless proximity-based communication 5 (e.g., a near field communication or a Bluelooth™ communication) and/or an online-based communication 686 (e.g., a network telecommunication or otherwise) for finding the particular financial transaction with merchant subsystem 200. System 1 may also include an acquiring bank subsystem 300 that may utilize such contactless proximity-based communication 5 and/or such online-based communication 686 for completing the financial transaction with financial institution subsystem 350.

System 1 may include a communications path 15 for enabling communication between client device 100' and merchant subsystem 200, a communications path 25 for enabling communication between merchant subsystem 200 and acquiring bank subsystem 300, a communications path 35 for enabling communication between acquiring bank subsystem 300 and financial institution subsystem 350, a communications path 45 for enabling communication between a payment network subsystem 360 of financial institution subsystem 350 and an issuing bank subsystem 370 of financial institution subsystem 350, a communications path 55 for enabling communication between financial institution subsystem 350 and commercial entity subsystem 400, a communications path 65 for enabling communication between commercial entity subsystem 400 and host electronic device 100, a communications path 75 for enabling communication between financial institution subsystem 350 and host electronic device 100, a communications path 85 for enabling communication between commercial entity subsystem 400 and merchant subsystem 200, a communications path 95 for enabling communication between commercial entity subsystem 400 and client device 100', and a communications path 99 for enabling communication between host device 100 and client device 100'. One or more of paths 15, 25, 35, 45, 55, 65, 75, 85, 95, and 99 may be at least partially managed by one or more trusted service managers ("TSMs"). Any suitable circuitry, device, system, or combination of these (e.g., a wireless communications infrastructure that may include one or more communications towers, telecommunications servers, or the like) that may be operative to create a communications network may be used to provide one or more of paths 15, 25, 35, 45, 55, 65, 75, 85, 95, and 99, which may be capable of providing communications using any suitable wired or wireless communications protocol. For example, one or more of paths 15, 25, 35, 45, 55, 65, 75, 85, 95, and 99 may support Wi-Fi (e.g., an 802.11 protocol), ZigBee (e.g., an 802.15.4 protocol), WiDi™, Ethernet, Bluetooth™, BLE, high frequency systems (e.g., 900 MHz, 2.4 GHz, and 5.6 GHz communication systems), infrared, TCP/IP, SCTP, DHCP, HTTP, BitTorrent™, FTP, RTP, RTSP, RTCP, RAOP, RDTP, UDP, SSH, WDS-bridging, any communications protocol that may be used by wireless and cellular telephones and personal e-mail devices (e.g., GSM, GSM plus EDGE, CDMA, OFDMA, HSPA, multi-band, etc.), any communications protocol that may be used by a low power Wireless Personal Area Network ("6LoWPAN") module, any other communications protocol, or any combination thereof. One or more of paths 15, 25, 35, 45, 55, 65, 75, 85, 95, and 99 may be enabled by any suitable communications set-up (e.g., communications set-up 9 of FIG. 1).

Description of FIG. 1B

Referring now to FIG. 1B, FIG. 1B shows a more detailed view of the system 1 described above with respect to FIG. 1A. As shown in FIG. 1B, for example, host electronic device 100 may include a processor 102, a communications component 106, and/or a near field communication ("NFC") component 120. NFC component 120 may include or otherwise provide a secure element 145 that may be configured to provide a tamper-resistant platform (e.g., as a single-chip or multiple-chip secure microcontroller) that may be capable of securely hosting applications and their confidential and cryptographic data (e.g., credential applets and associated credential keys, such as a credential key 155a', and an access key 155a, and/or an issuer security domain ("ISD") key 156k, as shown in FIG. 1B) in accordance with rules and security requirements that may be set forth by a set of well-identified trusted authorities (e.g., an authority of a financial institution subsystem and/or an industry standard, such as GlobalPlatform). As described below in more detail, a credential applet or a payment application on secure element 145 (e.g., of NFC component 120) of host device 100 may be configured to provide host payment credential data as host transaction data with sufficient detail for identifying a funding account or other financial instrument or credit source (e.g., at financial institution subsystem 350), where such host payment credential data may be used by host device 100 in one or more communications with client device 100' and/or merchant subsystem 200 and/or commercial entity subsystem 400 for facilitating a financial transaction. NFC component 120 may be configured to communicate such host payment credential data as a contactless proximity-based communication (e.g., near field communication) with merchant subsystem 200 (e.g., with a merchant terminal 220 of merchant subsystem 200 via a communications path (not shown), which may be located at a brick and mortar store or any physical location at which a user of host device 100 may use a credential stored on host device 100 to conduct a financial transaction with a proximately located merchant terminal 220 via a contactless proximity-based communication) and/or with NFC component 120' of client device 100'. Alternatively or additionally, communications component 106 may be provided to allow host device 100 to communicate any suitable host payment credential data with one or more other electronic devices or servers or subsystems (e.g., one or more subsystems or other components of system 1) using any suitable wired or wireless protocol (e.g., via one or more of communications paths 65, 75, and/or 99). Processor 102 of host device 100 may include any processing circuitry that may be operative to control the operations and performance of one or more components of host device 100. For example, processor 102 may be configured to run one or more applications on device 100 (e.g., an application 103 and/or an online resource or merchant application 113) that may at least partially dictate the way in which data (e.g., host payment credential data of host transaction data) may be communicated by host device 100 for funding a financial transaction with merchant subsystem 200, such as via client device 100' (e.g., the way in which data may be communicated between host device 100 and client device 100' (e.g., via communications path 99) and/or the way in which data may be communicated between host device 100 and commercial entity subsystem 400 (e.g., via communications path 65), which may eventually be communicated from commercial entity subsystem 400 to client device 100' via communications path 95). Moreover, as shown in FIG. 1B, host device 100 may include any suitable host device identification information 119, which may be accessible to processor 102 or any other suitable portion of device 100. Host device identification information 119 may be utilized by a user of client device 100' and/or commercial entity subsystem 400 and/or merchant subsystem 200 and/or financial institution subsystem 350 for uniquely identifying host device 100 to facilitate a financial transaction with merchant subsystem 200 and/or to enable any suitable secure communication with host device 100. As just one example, host device identification information 119 may be a telephone number or e-mail address or any unique identifier that may be associated with device 100.

Client device 100' may include one, some, or all of the same components as host device 100 or any components that are not provided by host device 100. For example, as shown in FIG. 1B, client device 100' may include any suitable communications component 106' that may communicate any suitable communications with host device 100 (e.g., via communications path 99) and/or with commercial entity subsystem 400 (e.g., via communications path 95) and/or with merchant subsystem 200 (e.g., via communications path 15). Additionally or alternatively, as shown in FIG. 1B, client device 100' may include any suitable contactless proximity-based or NFC component 120' that may be operative to communicate contactless proximity-based communications 5 with terminal 220 of merchant subsystem 200. Additionally or alternatively, as shown in FIG. 1B, client device 100' may include any suitable processor 102' that may be operative to run one or more suitable applications on device 100' (e.g., online resource or merchant application 113') that may at least partially dictate the way in which host payment credential data from host device 100 may be communicated by client device 100' for funding a financial transaction with merchant subsystem 200. Moreover, as shown in FIG. 1B, client device 100' may include any suitable client device identification information 119', which may be accessible to processor 102' or any other suitable portion of device 100'. Client device identification information 119' may be utilized by a user of host device 100 and/or commercial entity subsystem 400 and/or merchant subsystem 200 and/or financial institution subsystem 350 for uniquely identifying client device 100' to facilitate a financial transaction with merchant subsystem 200 and/or to enable any suitable secure communication with client device 100'. As just one example, client device identification information 119' may be a telephone number or e-mail address or any unique identifier that may be associated with device 100'. Although not shown, client electronic device 100' may also include an I/O interface that may be the same as or similar to I/O interface 114 of electronic device 100 of FIG. 2, a bus that may be the same as or similar to bus 118 of electronic device 100 of FIG. 2, a memory component that may be the same as or similar to memory component 104 of electronic device 100 of FIG. 2, and/or a power supply component that may be the same as or similar to power supply component 108 of electronic device 100 of FIG. 2.

Merchant subsystem 200 may include any suitable merchant server 210, as shown in FIG. 1B, which may include any suitable component or subsystem configured to communicate any suitable data via any suitable communications protocol (e.g., Wi-Fi, Bluetooth™, cellular, wired network protocols, etc.) with a communications component of commercial entity subsystem 400 (e.g., via communications path 85) and/or with a communications component of acquiring bank 300 (e.g., via communications path 25) and/or with a communications component of client device 100' (e.g., via communications path 15). For example, merchant server 210 may be operative to communicate potential transaction data 660 and/or updated potential transaction data 672 with communications component 106' of client device 100' within any suitable online-context, such as when a user of client device 100' is communicating with merchant server 210 to conduct a financial transaction via any suitable merchant online resource 113' that may be running on client device 100', such as a third party merchant application 113' running on client device 100' that may be managed by merchant server 210 or an internet application 113' (e.g., Safari™ by Apple Inc.) running on client device 100' that may be pointed to a uniform resource locator ("URL") whose target or web resource may be managed by merchant server 210. Accordingly, it is noted that communications between merchant server 210 and client device 100' may occur wirelessly and/or via wired paths (e.g., over the internet). Merchant server 210 may be provided by a merchant of merchant subsystem 200 (e.g., as a webserver to host website data and/or manage third party application data). Additionally or alternatively, as shown in FIG. 1B, merchant subsystem 200 may include any suitable merchant terminal 220 (e.g., a merchant payment terminal), which may include any suitable component or subsystem configured to communicate any suitable data with a contactless proximity-based communication component of host device 100 and/or of client device 100' (e.g., a contactless proximity-based communication 5 with NFC component 120' of client device 100'). Moreover, as shown in FIG. 1B, merchant subsystem 200 may include a merchant key 157. Although not shown, merchant subsystem 200 may also include a merchant processor component that may be the same as or similar to a processor component 102 of electronic device 100 of FIGS. 1B and 2, a merchant communications component that may be the same as or similar to a communications component 106 of electronic device 100 of FIGS. 1B and 2 (e.g., as a portion of server 210), a merchant I/O interface that may be the same as or similar to an I/O interface 114 of electronic device 100 of FIG. 2, a merchant bus that may be the same as or similar to a bus 118 of electronic device 100 of FIG. 2, a merchant memory component that may be the same as or similar to a memory component 104 of electronic device 100 of FIG. 2, and/or a merchant power supply component that may be the same as or similar to a power supply component 108 of electronic device 100 of FIG. 2.

Financial institution subsystem 350 may include a payment network subsystem 360 (e.g., a payment card association or a credit card association) and/or an issuing bank subsystem 370. For example, issuing bank subsystem 370 may be a financial institution that may assume primary liability for a consumer's capacity to pay off debts they may incur with a specific credential. Each specific credential applet of NFC component 120 of host device 100 may be associated with a specific payment card that may be electronically linked to an account or accounts of a particular user. Various types of payment cards may be suitable, including credit cards, debit cards, charge cards, stored-value cards, fleet cards, gift cards, and the like. The commerce credential of a specific payment card may be provisioned on host device 100 (e.g., as a credential of a credential supplemental security domain of NFC component 120, as described below) by issuing bank subsystem 370 for use in a commerce credential data communication (e.g., a contactless proximity-based communication and/or an online-based communication) with merchant subsystem 200 (e.g., directly or via commercial entity subsystem 400 and/or via client device 100'). Each credential may be a specific brand of payment card that may be branded by a payment network subsystem 360. Payment network subsystem 360 may be a network of various issuing banks 370 and/or various acquiring banks 300 that may process the use of payment cards (e.g., commerce credentials) of a specific brand.

In order for a financial transaction to occur within system 1, at least one commerce credential must be securely provisioned on a secure element of NFC component 120 of host electronic device 100. For example, such a commerce credential may be at least partially provisioned on a secure element of NFC component 120 of host device 100 directly from financial institution subsystem 350 (e.g., as credential data 654 via communications path 75 between financial institution subsystem 350 and device 100, which may be passed to NFC component 120 via communications component 106). Additionally or alternatively, such a commerce credential may be at least partially provisioned on a secure element of NFC component 120 of host device 100 from financial institution subsystem 350 via commercial entity subsystem 400 (e.g., as credential data 654 via communications path 55 between financial institution subsystem 350 and commercial entity subsystem 400, which may be passed to device 100 as credential data 654 via communications path 65 between a server 410 of commercial entity subsystem 400 and communications component 106 of device 100, which may then be passed to NFC component 120 from communications component 106). Credential data 654 via path 75 and/or via paths 55/65 may be provisioned on a secure element of device 100 as at least a portion or all of a credential supplemental security domain of NFC component 120 and may include a credential applet with credential information and/or a credential key, such as payment application or credential applet 153a with credential information 161a and credential key 155a'. As shown in FIG. 1B, for example, financial institution subsystem 350 may also have access to credential key 155a' (e.g., for decrypting data encrypted by device 100 using credential key 155a'). Financial institution subsystem 350 may be responsible for management of credential key 155a', which may include the generation, exchange, storage, use, and replacement of such a key. Financial institution subsystem 350 may store its version of credential key 155a' in a secure element of financial institution subsystem 350. It is to be understood that credential key 155a' of NFC component 120 and of financial institution subsystem 350 may be any suitable shared secret (e.g., a password, passphrase, array of randomly chosen bytes, one or more symmetric keys, public-private keys (e.g., asymmetric keys), etc.) available to both the secure element of electronic device 100 and financial institution subsystem 350 that may be operative to enable any suitable crypto data (e.g., a cryptogram) or any other suitable data to be independently generated by electronic device 100 and financial institution subsystem 350 (e.g., for validating payment data for a financial transaction), such as by using any suitable cryptographic algorithm or cipher whose functional output may be at least partially determined by the shared secret, where such a shared secret may be provisioned on device 100 by financial institution subsystem 350. A shared secret may either be shared beforehand between financial institution subsystem 350 and host device 100 (e.g., during provisioning of a credential on device 100 by financial institution subsystem 350), in which case such a shared secret may be referred to as a pre-shared key, or a shared secret may be created prior to use for a particular financial transaction by using a key-agreement protocol (e.g., using public-key cryptography, such as Diffie-Hellman, or using symmetric-key cryptography, such as Kerberos). The shared secret and any suitable cryptographic algorithm or cipher whose functional output may be at least partially determined by the shared secret may be accessible to the secure element of device 100.

Commercial entity subsystem 400 may be provided as an intermediary between financial institution subsystem 350 and host device 100, where commercial entity subsystem 400 may be configured to provide a new layer of security and/or to provide a more seamless user experience when a credential is being provisioned on a secure element of device 100 and/or when such a provisioned credential is being used as part of a commerce credential data communication between device 100 and merchant subsystem 200. Commercial entity subsystem 400 may be provided by a specific commercial entity that may offer various services to a user of device 100 and/or a user of device 100' via user-specific log-in information to a user-specific account with that commercial entity (e.g., via user-specific identification and password combinations). As just one example, commercial entity subsystem 400 may be provided by Apple Inc. of Cupertino, Calif., which may also be a provider of various services to users of device 100 and/or of device 100' (e.g., the iTunes™ Store for selling/renting media to be played by device 100, the Apple App Store™ for selling/renting applications for use on device 100, the Apple iCloud™ Service for storing data from device 100 and/or associating multiple user devices and/or multiple user profiles with one another, the Apple Online Store for buying various Apple products online, the Apple iMessage™ Service for communicating media messages between devices, etc.), and which may also be a provider, manufacturer, and/or developer of device 100 itself and/or device 100' itself (e.g., when device 100 is an iPod™, iPad™, iPhone™, or the like) and/or of an operating system (e.g., device application 103) of device 100 and/or of device 100'. The commercial entity that may provide commercial entity subsystem 400 (e.g., Apple Inc.) may be distinct and independent from any financial entity of financial institution subsystem 350. For example, the commercial entity that may provide commercial entity subsystem 400 may be distinct and/or independent from any payment network subsystem 360 or issuing bank subsystem 370 that may furnish and/or manage any credit card or any other commerce credential to be provisioned on end-user host device 100. Additionally or alternatively, the commercial entity that may provide commercial entity subsystem 400 (e.g., Apple Inc.) may be distinct and independent from any merchant of merchant subsystem 200. For example, the commercial entity that may provide commercial entity subsystem 400 may be distinct and/or independent from any merchant of merchant subsystem 200 that may provide a merchant terminal for NFC communications, a third party application 113, and/or any other aspect of merchant subsystem 200. Such a commercial entity may leverage its potential ability to configure or control various components of device 100 (e.g., software and/or hardware components of device 100, such as when that commercial entity may at least partially produce or manage device 100) in order to provide a more seamless user experience for a user of device 100 when he or she wants to provision a credential offered by financial institution subsystem 350 on host device 100 and/or when such a provisioned credential is being used as part of a commerce credential data communication with merchant subsystem 200 to fund a financial transaction. For example, in some embodiments, device 100 may be configured to communicate with commercial entity subsystem 400 seamlessly and transparently to a user of device 100 (e.g., via communications path 65) for sharing and/or receiving certain data that may enable a higher level of security (e.g., during an online-based commerce credential data communication between device 100 and merchant subsystem 200). Although not shown, commercial entity subsystem 400 may also include a processor component that may be the same as or similar to processor component 102 of electronic device 100 of FIGS. 1B and 2, a communications component that may be the same as or similar to communications component 106 of electronic device 100 of FIGS. 1B and 2, an I/O interface that may be the same as or similar to I/O interface 114 of electronic device 100 of FIG. 2, a bus that may be the same as or similar to bus 118 of electronic device 100 of FIG. 2, a memory component that may be the same as or similar to memory component 104 of electronic device 100 of FIG. 2, and/or a power supply component that may be the same as or similar to power supply component 108 of electronic device 100 of FIG. 2, one, some or all of which may be at least partially provided by server 410.

In addition to at least one commerce credential being provisioned on a secure element of NFC component 120 of host device 100 (e.g., as a portion of a credential SSD with credential key 155a' and credential information 161a), at least one access SSD with an access key 155b may also be provisioned on the secure element of NFC component 120 of device 100 in order to more securely enable device 100 to conduct a financial transaction with merchant subsystem 200. For example, an access SSD may be at least partially provisioned on a secure element of NFC component 120 of host device 100 directly from commercial entity subsystem 400 (e.g., as access data 652 via communications path 65 between server 410 of commercial entity subsystem 400 and communications component 106 of device 100, which may then be passed to NFC component 120 from communications component 106). Access data 652 via path 65 may be provisioned on a secure element of device 100 as at least a portion or all of an access SSD and may include an access applet 153b with an access key 155b. As shown in FIG. 1B, commercial entity subsystem 400 may also have access to access key 155b (e.g., for decrypting data encrypted by device 100 using access key 155b). Commercial entity subsystem 400 may be responsible for management of access key 155b, which may include the generation, exchange, storage, use, and replacement of such a key. Commercial entity subsystem 400 may store its version of access key 155b in a secure element of commercial entity subsystem 400. An access SSD of NFC component 120 with access key 155b may be configured to determine intent and local authentication of a user of device 100 (e.g., via one or more input components 110 of device 100, such as a biometric input component) and, in response to such a determination, may be configured to enable another particular SSD for conducting a payment transaction (e.g., with a credential of a credential SSD of NFC component 120). By storing such an access SSD within a secure element of device 100, its ability to reliably determine user intent for and authentication of a financial transaction may be increased. Moreover, access key 155b of such an access SSD of NFC component 120 may be leveraged to provide increased encryption to financial transaction data that may be communicated outside of the secure element of device 100. Additionally or alternatively, as described below, access data 652 may include an issuer security domain ("ISD") key 156k for an ISD of the secure element of electronic device 100, which may also be maintained by commercial entity subsystem 400, and may be used in addition to or as an alternative to access key 155b, as described below.

Although not explicitly shown or described, it is to be understood that commercial entity subsystem 400 may be operative to interact with or be associated with client device 100' in any or all of the same ways that commercial entity subsystem 400 may be operative to interact with or be associated with host device 100 (e.g., when a credential may be provisioned on client device 100', such that client device 100' may be operative to operate as a host device).

A merchant application or online resource 113' may be accessed by client device 100' in order to enable an online financial transaction to be facilitated between device 100' and merchant subsystem 200. First, such an application 113' may be approved or otherwise enabled by commercial entity subsystem 400 before application 113' may be accessible by client device 100'. For example, an application store 420 of commercial entity subsystem 400 (e.g., the Apple App Store™) may receive at least some data representative of application 113' from merchant subsystem 200 via communications path 85. Moreover, in some embodiments, commercial entity subsystem 400 may generate or otherwise assign a merchant key 157' for application 113' and may provide such a merchant key 157' to merchant subsystem 200 (e.g., via path 85). Alternatively, merchant subsystem 200 may generate or otherwise assign a merchant key 157' for application 113' and may provide such a merchant key 157' to commercial entity subsystem 400 (e.g., via path 85). Either merchant subsystem 200 or commercial entity subsystem 400 may be responsible for management of merchant key 157', which may include the generation, exchange, storage, use, and replacement of such a key. No matter how or where such a merchant key 157' may be generated and/or managed, both merchant subsystem 200 and commercial entity subsystem 400 may store a version of merchant key 157' (e.g., in a respective secure element of merchant subsystem 200 and commercial entity subsystem 400). In some embodiments, such a merchant key 157' may be specifically associated with merchant application 113', while, in other embodiments, merchant key 157' may be specifically associated with a merchant of merchant subsystem 200 such that merchant key 157' may be associated with multiple third party applications operated by the same merchant of merchant subsystem 200. A table 430 or any other suitable data structure or source of information that may be accessible to commercial entity subsystem 400 may be provided for associating a particular merchant key 157' with a particular merchant application 113' or merchant entity. Table 430 may enable commercial entity subsystem 400 to determine and utilize an appropriate merchant key 157' for providing a layer of security to any commerce credential data communicated to merchant subsystem 200 (e.g., commerce credential data that may include payment credential data native to host device 100) for a financial transaction that may involve client device 100' interfacing with merchant subsystem 200 via merchant application 113' associated with key 157'. Device 100' may be configured to access application 113' (e.g., from application store 420 via communications path 95) and run application 113' (e.g., with processor 102'). Alternatively or additionally, a merchant key 157' may be associated with a merchant's website (e.g., one or more URLs) or with the merchant generally, rather than or in addition to a merchant's third party application (e.g., application 113'). For example, a merchant of merchant subsystem 200 may work with commercial entity subsystem 400 to associate a particular merchant website or the merchant generally with a particular merchant key 157' within table 430, which may enable commercial entity subsystem 400 to determine and utilize an appropriate merchant key 157' for providing a layer of security to any commerce credential data communicated to merchant subsystem 200 (e.g., commerce credential data that may include payment credential data native to host device 100) for a financial transaction that may involve client device 100' interfacing with merchant server 210 to conduct a financial transaction via an internet application or web browser running on device 100' that may be pointed to a URL whose target or web resource may be associated with that merchant key 157'. Device 100' may be configured to access such a URL, for example, from merchant server 210 via communication path 15 (e.g., using an internet application 113' on device 100'). In other embodiments, an application 113' may not be associated with a specific merchant, merchant subsystem 200, and/or merchant key 157', but instead may be an independent application available to device 100'. In some embodiments, as shown, a similar application 113 with a merchant key 157 may be provided for host device 100, where application 113 may be the same as or different than application 113' and/or where key 157 may be the same as or different than key 157'.

Description of FIG. 2

Referring now to FIG. 2, FIG. 2 shows a more detailed view of electronic device 100 of system 1 described above with respect to FIGS. 1-1B. As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. Electronic device 100 may also be provided with a housing 101 that may at least partially enclose one or more of the components of device 100 for protection from debris and other degrading forces external to device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2. One or more input components 110 may be provided to permit a user to interact or interface with device 100 and/or one or more output components 112 may be provided to present information (e.g., graphical, audible, and/or tactile information) to a user of device 100. It should be noted that one or more input components and one or more output components may sometimes be referred to collectively herein as an input/output ("I/O") component or I/O interface 114 (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen. Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103 and/or an application 113. As one example, application 103 may be an operating system application while application 113 may be a third party application or any other suitable online resource (e.g., an application associated with a merchant of merchant subsystem 200). Moreover, as shown, processor 102 may have access to host device identification information 119, which may be utilized by a user of device 100 and/or commercial entity subsystem 400 for providing identification of device 100 to merchant subsystem 200 (e.g., for facilitating a financial transaction) and/or to client device 100' (e.g., for facilitating secure communication between devices 100 and 100').

NFC component 120 may be any suitable proximity-based communication mechanism that may enable contactless proximity-based transactions or communications between electronic device 100 and a merchant terminal (e.g., merchant payment terminal 220) of merchant subsystem 200. NFC component 120 may include any suitable modules for enabling contactless proximity-based communication between electronic device 100 and such a merchant terminal. As shown in FIG. 2, for example, NFC component 120 may include an NFC device module 130, an NFC controller module 140, and/or an NFC memory module 150. NFC device module 130 may include an NFC data module 132, an NFC antenna 134, and an NFC booster 136. NFC data module 132 may be configured to contain, route, or otherwise provide any suitable data that may be transmitted by NFC component 120 to a merchant terminal as part of a contactless proximity-based or NFC communication. Additionally or alternatively, NFC data module 132 may be configured to contain, route, or otherwise receive any suitable data that may be received by NFC component 120 from a merchant terminal as part of a contactless proximity-based communication. NFC controller module 140 may include at least one NFC processor module 142. NFC processor module 142 may operate in conjunction with NFC device module 130 to enable, activate, allow, and/or otherwise control NFC component 120 for communicating an NFC communication between electronic device 100 and a merchant terminal. NFC controller module 140 may include at least one NFC processor module 142 that may be used to run one or more applications, such as an NFC low power mode or wallet application 143 that may help dictate the function of NFC component 120. NFC memory module 150 may operate in conjunction with NFC device module 130 and/or NFC controller module 140 to allow for NFC communications between electronic device 100 and merchant subsystem 200. NFC memory module 150 may be tamper resistant and may provide at least a portion of a secure element 145 (see, e.g., FIG. 2A). For example, such a secure element may be configured to provide a tamper-resistant platform (e.g., as a single-chip or multiple-chip secure microcontroller) that may be capable of securely hosting applications and their confidential and cryptographic data (e.g., applets 153 and keys 155) in accordance with rules and security requirements that may be set forth by a set of well-identified trusted authorities (e.g., an authority of financial institution subsystem and/or an industry standard, such as GlobalPlatform).

As shown in FIG. 2, for example, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution (e.g., financial institution subsystem 350) may store keys and/or other suitable information for creating or otherwise provisioning one or more credentials (e.g., credentials associated with various credit cards, bank cards, gift cards, access cards, transit passes, etc.) on electronic device 100 (e.g., via communications component 106), for credential content management, and/or security domain management. A credential may include credential data (e.g., credential information 161a) that may be assigned to a user/consumer and that may be stored securely on electronic device 100, such as a credit card payment number (e.g., a device primary account number ("DPAN"), DPAN expiry date, CVV, etc. (e.g., as a token or otherwise)). NFC memory module 150 may include at least two SSDs 154 (e.g., at least a first SSD 154a and a second SSD 154b). For example, first SSD 154a (e.g., a credential SSD 154a) may be associated with a specific credential (e.g., a specific credit card credential or a specific public transit card credential provisioned by financial institution subsystem 350) that may provide specific privileges or payment rights to electronic device 100, while second SSD 154b (e.g., an access SSD 154b) may be associated with a commercial entity (e.g., a commercial entity of commercial entity subsystem 400, which may be a controlling entity for device 100) that may control access of device 100 to a specific credential of another SSD (e.g., first SSD 154a), for example, to provide specific privileges or payment rights to electronic device 100. Alternatively, each one of first SSD 154a and second SSD 154b may be associated with a respective specific credential (e.g., a specific credit card credential or a specific public transit card credential provisioned by financial institution subsystem 350) that may provide specific privileges or payment rights to electronic device 100. Each SSD 154 may include and/or be associated with at least one applet 153 (e.g., SSD 154a with applet 153a and SSD 154b with applet 153b). For example, an applet 153 of an SSD 154 may be an application that may run on a secure element of NFC component 120 (e.g., in a GlobalPlatform environment). A credential applet 153 may include or be associated with credential information 161 (e.g., information 161a of applet 153a and/or information 161b of applet 153b). Each SSD 154 and/or applet 153 may also include and/or be associated with at least one of its own keys 155 (e.g., applet 153a with at least one key 155a and applet 153b with at least one key 155b).

A key 155 of an SSD 154 may be a piece of information that can determine a functional output of a cryptographic algorithm or cipher. For example, in encryption, a key may specify a particular transformation of plaintext into ciphertext, or vice versa during decryption. Keys may also be used in other cryptographic algorithms, such as digital signature schemes and message authentication codes. A key of an SSD may provide any suitable shared secret with another entity. Each key and applet may be loaded on the secure element of device 100 by a TSM or an authorized agent or pre-loaded on the secure element when first provided on device 100. As one example, while credential SSD 154a may be associated with a particular credit card credential, that particular credential may only be communicated as a commerce credential data communication to merchant subsystem 200 from a secure element of device 100 (e.g., from NFC component 120) for a financial transaction when applet 153a of that credential SSD 154a has been enabled or otherwise activated or unlocked for such use.

Security features may be provided for enabling use of NFC component 120 that may be particularly useful when transmitting confidential payment information, such as credit card information or bank account information of a credential, from electronic device 100 to merchant subsystem 200 (e.g., via commercial entity subsystem 400 and/or via device 100'). Such security features also may include a secure storage area that may have restricted access. For example, user authentication via personal identification number ("PIN") entry or via user interaction with a biometric sensor may need to be provided to access the secure storage area. As an example, an access SSD 154b may leverage applet 153b to determine whether such authentication has occurred before allowing other SSDs 154 (e.g., a credential SSD 154a) to be used for communicating its credential information 161a. In certain embodiments, some or all of the security features may be stored within NFC memory module 150. Further, security information, such as an authentication key, for communicating commerce credential data with merchant subsystem 200 may be stored within NFC memory module 150. In certain embodiments, NFC memory module 150 may include a microcontroller embedded within electronic device 100. As just one example, applet 153b of access SSD 154b may be configured to determine intent and local authentication of a user of device 100 (e.g., via one or more input components 110, such as a biometric input component) and, in response to such a determination, may be configured to enable another particular SSD for conducting a payment transaction (e.g., with a credential of a credential SSD 154a).

Figure 2A:
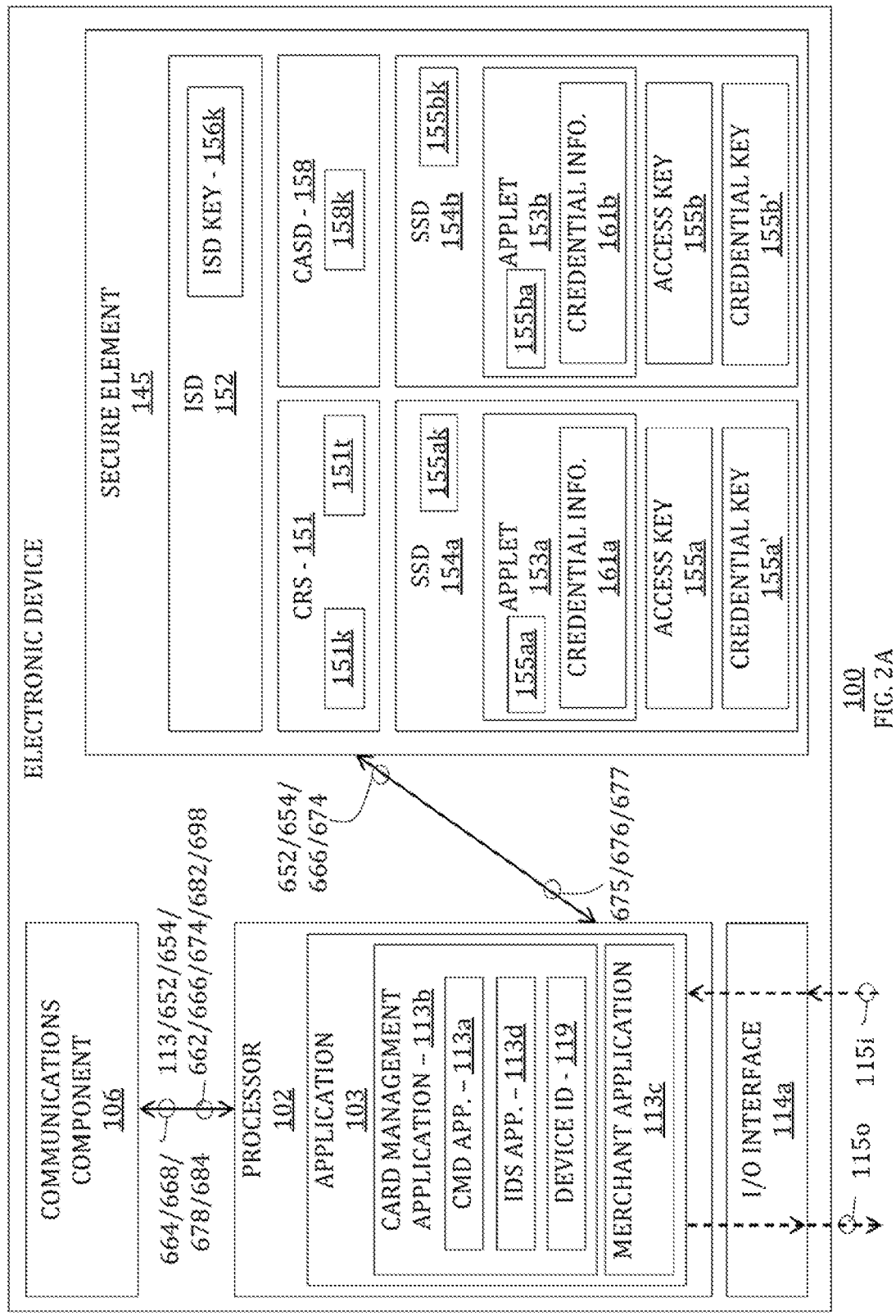
FIG. 2A is another more detailed schematic view of the electronic device of FIGS. 1-2.

Description of FIG. 2A

Referring now to FIG. 2A, FIG. 2A shows another detailed view of a portion of electronic device 100 of system 1 described above with respect to FIGS. 1-2. As shown in FIG. 2A, for example, a secure element 145 of NFC component 120 may include SSD 154a, which may include or be associated with applet 153a, credential information 161a, access key 155a, and/or credential key 155a', and SSD 154b, which may include or be associated with applet 153b, credential information 161b, access key 155b, and/or credential key 155b'. In some embodiments, a specific supplemental security domain ("SSD") 154 (e.g., one of SSDs 154a and 154b) may be associated with a particular TSM and at least one specific commerce credential (e.g., a specific credit card credential or a specific public transit card credential) that may provide specific privileges or payment rights to electronic device 100. Each SSD 154 may have its own manager key 155 (e.g., a respective one of keys 155ak and 155bk) that may need to be activated to enable a function of that SSD 154 for use by NFC device module 130. Additionally or alternatively, each SSD 154 may include and/or be associated with at least one of its own credential applications or credential applets (e.g., a Java card applet instances) associated with a particular commerce credential (e.g., credential applet 153a of SSD 154a may be associated with a first commerce credential and/or credential applet 153b of SSD 154b may be associated with a second commerce credential), where a credential applet may have its own access key (e.g., access key 155a for credential applet 153a and/or access key 155b for credential applet 153b) and/or its own credential key (e.g., credential key 155a' for credential applet 153a and/or credential key 155b' for credential applet 153b), and where a credential applet may need to be activated to enable its associated commerce credential for use by NFC device module 130 as an NFC communication (e.g., with merchant terminal 220) and/or as an online-based communication between electronic device 100 and merchant subsystem 200 (e.g., via commercial entity subsystem 400 and/or client device 100'). In some embodiments, a credential key of a credential applet (e.g., credential key 155a' for credential applet 153a and/or credential key 155b' for credential applet 153b) may be generated by financial institution subsystem 350 that may be responsible for such a credential and may be accessible by that financial institution subsystem 350 (e.g., as shown in FIG. 1B) for enabling secure transmission of that credential information of that applet between secure element 145 and financial institution subsystem 350 (e.g., via merchant subsystem 200). Additionally or alternatively, an access key of a credential applet (e.g., access key 155a for credential applet 153a and/or access key 155b for credential applet 153b) may be generated by commercial entity subsystem 400 and may be accessible by commercial entity subsystem 400 (e.g., as shown in FIG. 1B) for enabling secure transmission of that credential information of that applet between secure element 145 and commercial entity subsystem 400. Additionally or alternatively, as shown, each applet may include its own unique application identifier ("AID"), such as AID 155aa of applet 153a and/or AID 155ba of applet 153b. For example, an AID may identify a specific card scheme and product, program, or network (e.g., MasterCard Cirrus, Visa PLUS, Interac, etc.), where an AID may include not only a registered application provider identifier ("RID") that may be used to identify a payment system (e.g., card scheme) or network (e.g., MasterCard, Visa, Interac, etc.) of the credential associated with the AID but also a proprietary application identifier extension ("PIX") that may be used to differentiate between products, programs, or applications offered by a provider or payment system of the credential associated with the AID. Any suitable specification (e.g., a Java Card specification) that may be operative to preside over firmware of secure element 145 may be operative to ensure or otherwise force the uniqueness of each AID on secure element 145 (e.g., each credential instance on secure element 145 may be associated with its own unique AID).

Additionally or alternatively, as shown in FIG. 2A, secure element 145 may include ISD 152, which may include an ISD key 156k that may also be known to a trusted service manager associated with that security domain (e.g., commercial entity subsystem 400, as shown in FIG. 1B). ISD key 156k may be leveraged by commercial entity subsystem 400 and electronic device 100 similarly to and/or instead of access key 155a and/or access key 155b for enabling secure transmissions between commercial entity subsystem 400 and secure element 145 of electronic device 100. Moreover, as shown in FIG. 2A, various data may be communicated between processor 102 and secure element 145. For example, processor 102 of device 100 may be configured to run a device application 103 that may communicate information with a merchant application 113 of processor 102 as well as secure element 145, an I/O interface component 114a (e.g., for receiving I/O input data 115i and/or for transmitting I/O output data 115o), and/or communications component 106. Moreover, as shown, processor 102 may have access to device identification information 119, which may be utilized for enabling secure communication between device 100 and remote entities.

Additionally or alternatively, as shown in FIG. 2A, secure element 145 may include a controlling authority security domain ("CASD") 158, which may be a special purpose security domain that may be configured to serve as a third-party on-element root of trust. An associated application of CASD 158 may be configured to provide on-element confidential key generation as a global service to other applications and/or to a specific management layer (e.g., a GlobalPlatform management layer). Confidential key material that may be used within CASD 158 may be configured such that it may not be inspected or modified by any entity, including an issuer of secure element 145. CASD 158 may be configured to include and/or may be configured to generate and/or otherwise include CASD access kit 158k (e.g., a CASD private key ("CASD-SK"), a CASD public key ("CASD-PK"), a CASD certificate ("CASD-Cert."), and/or a CASD-signing module). For example, CASD 158 may be configured to sign certain data on secure element 145 (e.g., using CASD access kit 158k) before providing such data to another portion of device 100 (e.g., communications component 106 for sharing with other subsystems of system 1). As an example, CASD 158 may be configured to sign any data that is provided by secure element 145 such that other subsystems (e.g., commercial entity subsystem 400) may be able to confirm that such signed data was signed by secure element 145 (e.g., using an associated CASD kit 158k at commercial entity subsystem 400).

Additionally or alternatively, as shown in FIG. 2A, secure element 145 may include a contactless registry services ("CRS") applet or application 151 that may be configured to provide local functionality to electronic device 100 for modifying a life cycle state (e.g., activated, deactivated, locked, etc.) of certain security domain elements and sharing certain output information 115o about certain security domain elements in certain life cycle states with a user of device 100 (e.g., via a user I/O interface 114a). For example, CRS application 151 may include a CRS list 151t that may maintain a list of the current life cycle state of each security domain element on secure element 145 (e.g., a list that may include the life cycle state of one, some, or all of credential applet 153a of SSD 154a and/or credential applet 153b of SSD 154b), where CRS application 151 may be configured to share the life cycle state of one or more security domain elements of secure element 145 with an application of device 100 (e.g., with any suitable application type, such as a daemon, such as card management daemon ("CMD") application 113a that may be running as a background process inside an operating system application 103 and/or a card management application 113b (e.g., a Passbook™ or Wallet™ application by Apple Inc.) and/or a merchant application 113c (e.g., a merchant application as may be associated with merchant key 157) and/or an identity services ("IDS") application 113d, but that may not necessarily be under the control of an interactive user of device 100), which in turn may provide certain life cycle state information to a user of device 100 as output information 115o via I/O interface 114a and a user interface ("UI") application (e.g., a UI of card management application 113b), which may enable a user to change a life cycle state of a security domain element (e.g., to update a CRS list 151t and a life cycle state of a security domain element, such as for enabling a commerce credential of a specific credential applet for use in a financial transaction). Additionally or alternatively, CRS 151 may include a CRS access key 151k that may also be known to a trusted service manager associated with CRS 151 (e.g., commercial entity subsystem 400, as shown in FIG. 1B). CRS access key 151k may be leveraged by commercial entity subsystem 400 and electronic device 100 similarly to and/or instead of access key 155a and/or access key 155b for enabling secure transmissions between commercial entity subsystem 400 and secure element 145 of electronic device 100.

IDS application 113d may be any suitable application type, such as a daemon, that may be running as a background process inside operating system application 103 and/or card management application 113b and/or that may be provided by CMD application 113a, and may be operative as an IDS manager for listening for and responding to IDS messages that may be sent over any suitable IDS service, which may be similar to any suitable messaging service, such as iMessage™ by Apple Inc., or the like (e.g., FaceTime™ or Continuity™ by Apple Inc.), which may enable unique end-to-end encryption of messages between IDS application 113d of host device 100 and a similar IDS application of another device (e.g., an IDS application of client device 100'). Such messages may be encrypted using unique identifiers for one or both of the communicating devices (e.g., host device unique identifier 119 and/or client device unique identifier 119') and/or for one or both of the specific users of the communicating devices. Such messages may be communicated as a local link or a true device to device (e.g., peer to peer) communication, or may be communicated via commercial entity subsystem 400 (e.g., via an identity management system component 470). Such messaging may be enabled as a low latency solution that may allow data to be exchanged in structured formats (e.g., protocol buffers) and/or unstructured formats. IDS application 113*d* may be automatically awoken should it not be running when an IDS message is received. IDS application 113*d* may be operative to present an appropriate user interface and shepherding requested data of a received IDS communication back to the requesting device. IDS application 113*d* of a host device may be operative to wake up card management daemon application 113*a* of card management application 113*b* when an initial request may be detected from a client device, which may allow the host device to operate in a low-power 'sleep' mode. IDS application 113*d* may additionally or alternatively be operative to manage a 'time out' for such a request, such that, should a request for payment from a client device go unactioned on the host device for a period of time (e.g., 60 seconds, due to no active host device user interaction responsive to such a request), then IDS application 113*d* nay be operative to make a determination to terminate the request that may result in the host device generating and delivering a 'cancel' status back to the client device, which may display an appropriate message (e.g., 'time out error' to a user of the client device).

Description of FIG. 3 and FIGS. 3A-3H

As shown in FIG. 3, and as described below in more detail, a specific example of host electronic device 100 may be a handheld electronic device, such as an iPhone™, where housing 101 may allow access to various input components 110*a*-110*i*, various output components 112*a*-112*c*, and various I/O components 114*a*-114*d* through which device 100 and a user and/or an ambient environment may interface with each other. For example, a touch screen I/O component 114*a* may include a display output component 112*a* and an associated touch input component 110*f*, where display output component 112*a* may be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112*a*. For example, as shown in FIG. 3, GUI 180 may be configured to display a first screen 190 with one or more graphical elements or icons 182 of GUI 180. When a specific icon 182 is selected, device 100 may be configured to open a new application associated with that icon 182 and display a corresponding screen of GUI 180 associated with that application. For example, when the specific icon 182 labeled with a "Merchant App" textual indicator 181 (i.e., specific icon 183) is selected by a user of device 100, device 100 may launch or otherwise access a specific third party merchant application and may display screens of a specific user interface that may include one or more tools or features for interacting with device 100 in a specific manner (see, e.g., FIGS. 3A-3H for specific examples of such displays of GUI 180 during use of any suitable application (e.g., card management application 113*b* on host device 100 and/or merchant application 113' on client device 100') that may be used by a device user for making a payment with a credential of NFC component 120 (e.g., a credential of credential SSD 154*a*) of host device 100). For each application, screens may be displayed on display output component 112*a* and may include various user interface elements. Additionally or alternatively, for each application, various other types of non-visual information may be provided to a user via various other output components 112 of device 100.

While FIGS. 2-3 may be described with respect to host device 100, it is to be understood that one, some, or all of the components of device 100 of any one or more of FIGS. 2-3 may similarly be provided by client device 100'. In some embodiments, one or more components of host device 100 may not be provided by client device 100' (e.g., client device 100' may not include a secure element with one or more credentials provisioned thereon, while in other embodiments client device 100' may also include a secure element with one or more native credentials provisioned thereon and yet client device 100' may still facilitate a financial transaction using a non-native credential (e.g., a credential native to host device 100)). In some embodiments, client device 100' may not include a user interface component operative to provide a GUI but may instead be considered a more automated device. Additionally or alternatively, host device 100 may not include a user interface component operative to provide a GUI but may instead provide an audio output component and mechanical or other suitable user input components for selecting and authenticating use of a payment credential for funding a transaction.

Description of FIG. 4

Referring now to FIG. 4, FIG. 4 shows further details with respect to particular embodiments of commercial entity subsystem 400 of system 1. As shown in FIG. 4, commercial entity subsystem 400 may be a secure platform system and may include a secure mobile platform ("SMP") broker component 440, an SMP trusted services manager ("TSM") component 450, an SMP crypto services component 460, an identity management system ("IDMS") component 470, a fraud system component 480, a hardware security module ("HSM") component 490, store component 420, and/or one or more servers 410. One, some, or all components of commercial entity subsystem 400 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of commercial entity subsystem 400 may be managed by, owned by, at least partially controlled by, and/or otherwise provided by a single commercial entity (e.g., Apple Inc.) that may be distinct and independent from financial institution subsystem 350. The components of commercial entity subsystem 400 may interact with each other and collectively with financial institution subsystem 350 and/or host electronic device 100 and/or client electronic device 100' and/or merchant subsystem 200 for providing a new layer of security and/or for providing a more seamless user experience.

SMP broker component 440 of commercial entity subsystem 400 may be configured to manage user authentication with a commercial entity user account. SMP broker component 440 may also be configured to manage the lifecycle and provisioning of credentials on device 100. SMP broker component 440 may be a primary end point that may control the user interface elements (e.g., elements of GUI 180) on device 100 and/or on device 100'. An operating system or other application of an end user device (e.g., application 103, application 113, and/or application 143 of host device 100) may be configured to call specific application programming interfaces ("APIs") and SMP broker 440 may be configured to process requests of those APIs and respond with data that may derive the user interface of device 100 and/or respond with application protocol data units ("APDUs") that may communicate with the secure element of NFC component 120 (e.g., via a communication path 65 between commercial entity subsystem 400 and electronic device 100). Such APDUs may be received by commercial entity subsystem 400 from financial institution subsystem 350 via a trusted services manager ("TSM") of system 1 (e.g., a TSM of a communication path 55 between commercial entity subsystem 400 and financial institution subsystem 350). SMP TSM component 450 of commercial entity subsystem 400 may be configured to provide Global-Platform-based services or any other suitable services that may be used to carry out credential provisioning operations on device 100 from financial institution subsystem 350. GlobalPlatform, or any other suitable secure channel protocol, may enable SMP TSM component 450 to properly communicate and/or provision sensitive account data between secure element 145 of device 100 and a TSM for secure data communication between commercial entity subsystem 400 and financial institution subsystem 350.

SMP TSM component 450 may be configured to use HSM component 490 to protect its keys and generate new keys. SMP crypto services component 460 of commercial entity subsystem 400 may be configured to provide key management and cryptography operations that may be provided for user authentication and/or confidential data transmission between various components of system 1. SMP crypto services component 460 may utilize HSM component 490 for secure key storage and/or opaque cryptographic operations. A payment crypto service of SMP crypto services component 460 may be configured to interact with IDMS component 470 to retrieve information associated with on-file credit cards or other types of commerce credentials associated with user accounts of the commercial entity (e.g., an Apple iCloud™ account). Such a payment crypto service may be configured to be the only component of commercial entity subsystem 400 that may have clear text (i.e., non-hashed) information describing commerce credentials (e.g., credit card numbers) of its user accounts in memory. IDMS component 470 may be configured to enable and/or manage any suitable communication between host device 100 and client device 100', such as an identity services ("IDS") transport (e.g., using a commercial-entity specific service (e.g., iMessage™ by Apple Inc.). For example, certain devices may be automatically or manually registered for such a service (e.g., all devices in an eco-system of commercial entity 400 may be automatically registered for the service). Such a service may provide an end-to-end encrypted mechanism that may require active registration before messages can be sent using the service (e.g., using IDS application 113d of host device 100). IDMS component 470 and/or any other suitable server or portion of commercial entity subsystem 400 may be operative to identify or otherwise lookup the status of any credentials provisioned on any electronic devices associated with a given user account or otherwise, such that commercial entity subsystem 400 may be operative to efficiently and effectively identify one or more non-native payment credentials that may be available to a particular client device associated with a particular user account (e.g., multiple host devices of a family account with commercial entity subsystem 400).

Commercial entity fraud system component 480 of commercial entity subsystem 400 may be configured to run a commercial entity fraud check on a commerce credential based on data known to the commercial entity about the commerce credential and/or the user (e.g., based on data (e.g., commerce credential information) associated with a user account with the commercial entity and/or any other suitable data that may be under the control of the commercial entity and/or any other suitable data that may not be under the control of financial institution subsystem 350). Commercial entity fraud system component 480 may be configured to determine a commercial entity fraud score for the credential based on various factors or thresholds. Additionally or alternatively, commercial entity subsystem 400 may include store 420, which may be a provider of various services to users of device 100 (e.g., the iTunes™ Store for selling/renting media to be played by devices 100/100', the Apple App Store™ for selling/renting applications for use on devices 100/100', the Apple iCloud™ Service for storing data from devices 100/100' and/or associating multiple user devices and/or multiple user profiles with one another, the Apple Online Store for buying various Apple products online, etc.). As just one example, store 420 may be configured to manage and provide an application 113 to device 100 (e.g., via communications path 65), where application 113 may be any suitable application, such as a banking application, a commercial merchant application, an e-mail application, a text messaging application, an internet application, a card management application, or any other suitable communication application. Any suitable communication protocol or combination of communication protocols may be used by commercial entity subsystem 400 to communicate data amongst the various components of commercial entity subsystem 400 (e.g., via at least one communications path 495 of FIG. 4) and/or to communicate data between commercial entity subsystem 400 and other components of system 1 (e.g., financial entity subsystem 350 via communications path 55 of FIG. 1A and/or host electronic device 100 via communications path 65 of FIG. 1A and/or client electronic device 100' via communications path 95 of FIG. 1A).

Figure 5:
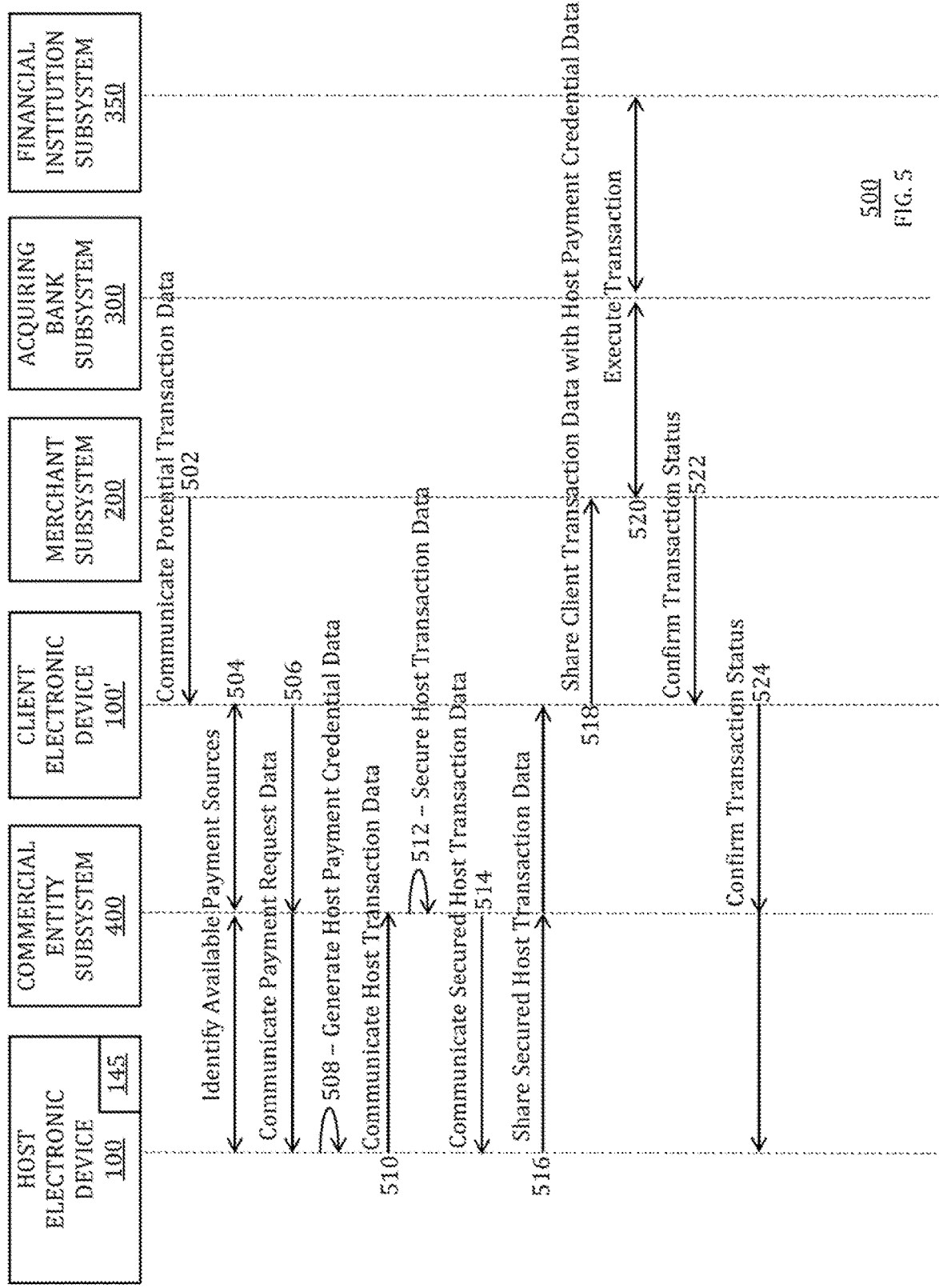

Description of FIG. 5

FIG. 5 is a flowchart of an illustrative process 500 for conducting a financial transaction using an electronic device with a non-native payment credential. Process 500 is shown being implemented by host electronic device 100, client electronic device 100', merchant subsystem 200, acquiring bank subsystem 300, commercial entity subsystem 400, and financial institution subsystem 350. However, it is to be understood that process 500 may be implemented using any other suitable components or subsystems. Process 500 may provide a seamless user experience for securely and efficiently conducting a financial transaction with merchant subsystem 200 via client device 100' while using a payment credential from host device 100.

At step 502 of process 500, potential transaction data may be communicated to client device 100' from merchant subsystem 200. For example, at some point during user interaction with client device 100' running merchant application 113' (e.g., while a user is shopping online for goods or services of a merchant), potential transaction data may be communicated to client device 100' from merchant subsystem 200 or from any other suitable entity that may be indicative of any suitable data related to a potential financial transaction to occur between a user of client device 100' and a merchant of merchant subsystem 200, including, but not limited to, (i) specific merchant information, such as a unique merchant identifier, (ii) specific transaction information, such as identification of a specific currency to be used to pay for the transaction (e.g., yen, pounds, dollars, etc.) and/or identification of a specific amount of a currency to be paid for the transaction and/or identification of the particular product or service to be purchased or rented or otherwise paid for and/or identification of a default or initial shipping address to be used, (iii) information indicative of the one or more types of payment methods acceptable to the merchant for the transaction (e.g., a list of payment cards that may be used for the purchase (e.g., MasterCard but not Visa)), and/or (iv) a unique merchant-based transaction identifier (e.g., any suitable data element, such as a 3 or 4 character alphanumeric string, that may be randomly or uniquely generated by merchant subsystem 200 for association with the transaction being conducted). Such potential transaction data may include any suitable number and types of data fields, with or without associated data, that may be required or at least used for completing a financial transaction, such as contact information fields (e.g., telephone number, e-mail address, mailing address) of a customer making the purchase, where some fields may be populated and included as part of such potential transaction data, and/or where some fields may not be populated as part of such potential transaction data but may be open and awaiting population during process 500. Such potential transaction data of step 502 may be referred to herein as a PKPaymentRequest. Alternatively, in some embodiments, a user may not be actively interacting with client device 100' in order for potential transaction data associated with merchant subsystem 200 to be made available to client device 100' at step 502. Instead, as an example, client device 100' may be configured to determine that a particular product ought to be purchased and to interact with one or more merchants in order to obtain associated transaction data from at least one particular merchant for that particular product (e.g., client device 100' may be a home appliance that may be configured to determine that an appliance product must be purchased (e.g., detect that more laundry detergent is needed by a washing machine or detect a calendar event pre-set by a user to buy more detergent on a particular date) and may automatically identify a particular merchant offering the best deal for that product and may automatically interact with that merchant to obtain transaction data for purchasing that product from that merchant), all automatically and without any active interaction by a user of client device 100'. The potential transaction data of step 502 may include all data necessary for client device 100', or an available host device 100 in association with client device 100', to securely generate and provide payment credential data to merchant subsystem 200 for funding the financial transaction associated with the potential transaction data. Such potential transaction data may be communicated by merchant subsystem 200 to client device 100' at step 502 in any suitable manner (e.g., such potential transaction data may be transmitted from server 210 of merchant subsystem 200 to communications component 106' of client device 100' via communications path 15 using any suitable communications protocol or via a contactless proximity-based communication channel between terminal 220 and NFC component 120' using any suitable communications protocol).

At step 504 of process 500, at least one available non-native payment source may be identified for potentially funding a financial transaction, such as the transaction associated with the transaction data of step 502. This may be accomplished automatically by client device 100' in response to receiving the transaction data at step 502 or may be periodically accomplished independent of the receipt of transaction data or may be accomplished in response to a request made by a user of client device 100' at any suitable time. For example, in response to potential transaction data being received by client device 100' at step 502, client device 100' may be operative to attempt to identify at least one host electronic device (e.g., any electronic device, such as host device 100, that may be configured to generate payment credential data on a secure element) that may be available for at least partially finding the financial transaction associated with the transaction data of step 502. Any suitable technique may be used to identify any available non-native payment sources. For example, a beacon signal may be transmitted by client device 100' as a discovery request that may request a response from any host device that might receive the beacon (e.g., any host device within a particular distance of client device 100' operative to communicate using a particular communication protocol of the beacon or a beacon may be a quick response ("QR") code or any other suitable code that may be presented by client device 100' and read by a scanner of one or more host devices). Alternatively or additionally, client device 100' may send a discovery request to one or more particular host devices using any suitable communication path and protocol (e.g., to one or more devices identified in a contacts application of device 100' and/or identified manually by a user of device 100' (e.g., by telephone number or e-mail address or any suitable unique device identifier (e.g., device identifier 119 of host device 100))). Such a discovery request may include any suitable information, such as information identifying client device 100' (e.g., device identifier 119' of client device 100') and/or information identifying one or more particular payment types that may be acceptable (e.g., by the merchant) for funding the potential financial transaction (e.g., the payment type(s) that may be identified by the potential transaction data of step 502), and may request any suitable information in response, such as any suitable information identifying the responding host device (e.g., device identifier 119 of host device 100) and/or any suitable information identifying one or more particular payment types that may be available to that host device (e.g., AID 155aa and/or AID 155ba of host device 100, where such payment type identification of the response may only include each type that matches a type in the discovery request or may include all payment types available to that responding host) and/or any suitable information identifying a location of the responding host device and/or any suitable information identifying a status of the host device (e.g., awake, asleep, off, etc.).

Commercial entity subsystem 400 or any other entity may participate in the identification of host device 100 by client device 100' at step 504. For example, as mentioned, commercial entity subsystem 400 may be operative to manage any suitable services made available to client device 100' and/or host device 100, such as iCloud™ and/or iMessage™ or any other suitable identity services transport, which may be operative to make associations between different devices and/or to automatically determine the status and/or capabilities of various devices (e.g., a family may have an account with commercial entity subsystem 400 that may be associated with client device 100' as well as multiple other devices, including host device 100). As one example, step 504 may include client device 100' sending a discovery request to commercial entity subsystem 400 for the status of all other devices associated with an account of client device 100', and commercial entity subsystem 400 obtaining (e.g., using an identity services transport or otherwise) the status of one, some, or each one of such devices and sharing each one of those statuses with client device 100', where a status may be indicative of the availability of host device 100 and the identity of at least one payment type available to host device 100 (e.g., host device identifier, AID(s), and status of each payment application (e.g., Visa/in-app enabled and Discover/in-app disabled) and/or status of the device itself). Each host device may have its own settings with respect to such requests and potential responses (e.g., a particular host device may be configured to only respond to status requests from particular client devices (e.g., only devices associated with the same account at commercial entity subsystem 400, only devices associated with contacts in a contact application of that particular host device, etc.)). Such discovery requests and/or discovery responses for enabling the identification of one or more available payment sources at step 504 may be communicated in any suitable manner, such as directly (e.g., peer-to-peer) between client device 100' and host device 100 (e.g., via communications path 99 using any suitable communications protocol), or between client device 100' and commercial entity subsystem 400 (e.g., via communications path 95 using any suitable communications protocol) and between commercial entity subsystem 400 and host device 100 (e.g., via communications path 65 using any suitable communications protocol) (e.g., using identity services transport or any other suitable communication services of commercial entity subsystem 400).

At step 506 of process 500, client device 100' may communicate payment request data to at least one particular host electronic device 100. Such payment request data may include any suitable information that may be provided by client device 100' for identifying one or more particular characteristics of the potential transaction to be financed. For example, like the potential transaction data of step 502, the payment request data of step 506 may include any suitable data related to the potential financial transaction to be funded, including, but not limited to, (i) specific merchant information, such as identification of a merchant identifier that may identify the particular merchant subsystem 200 that provided at least a portion of the potential transaction data of step 502, (ii) specific transaction information, such as identification of a specific currency to be used to pay for the transaction (e.g., yen, pounds, dollars, etc.) and/or identification of a specific amount of a currency to be paid for the transaction and/or identification of the particular product or service to be purchased or rented or otherwise paid for and/or identification of a default or initial shipping address to be used, (iii) information indicative of the one or types of payment methods acceptable to the merchant for the transaction (e.g., a list of payment cards that may be used for the purchase (e.g., MasterCard but not Visa)), (iv) a unique merchant-based transaction identifier (e.g., any suitable data element, such as a 3 or 4 character alphanumeric string, that may be randomly or uniquely generated by merchant subsystem 200 for association with the transaction being conducted), (v) a unique client-based transaction identifier (e.g., any suitable data element, such as a 3 or 4 character alphanumeric string, that may be randomly or uniquely generated by client device 100' for association with the transaction being conducted), and/or (vi) a unique client-based payment request identifier (e.g., any suitable data element, such as a 3 or 4 character alphanumeric string, that may be randomly or uniquely generated by client device 100' for association with the payment request being made). In some embodiments, such payment request data may be encrypted or otherwise formatted or handled by commercial entity subsystem 400 before communication to the target host device 100. The target host device 100 for the payment request data of step 506 may be selected based on the identification of any available payment sources at step 504 (e.g., based on any suitable discovery response of step 504) or may be selected independently of any identification made at step 504. The payment request data of step 506 may include an identifier of a particular payment type that may be known by client device 100' to be available to the target host device (e.g., based on any identification data (e.g., host device AID data) obtained by client device 100' at step 504 or otherwise). A user of client device 100' may select the target host device 100 for the payment request data of step 506 from a list of potential target host devices that may be provided based on the identification of one or more payment sources at step 504, or client device 100' may identify any suitable particular target host device in any suitable manner (e.g., a device in a contacts application of device 100' and/or identified manually by a user of device 100' (e.g., by telephone number or e-mail address or any suitable unique device identifier)). Alternatively, the target host device 100 for the payment request data of step 506 may be automatically selected by client device 100' in response to any identification data obtained by client device 100' at step 504 (e.g., device 100' may be customized or otherwise configured to select one host device from a group of available host devices based on any suitable characteristic (e.g., the host device with the shortest distance to client device 100' or the host device with the highest priority of the available host devices (e.g., as may be determined by a default or customized setting of an application of device 100'), etc.). Such payment request data of step 506 may be referred to herein as a PKRemotePaymentRequest and may include any suitable data, including, but not limited to, (1) the PKPaymentRequest of step 502 (e.g., which may be wrapped inside the PKRemotePaymentRequest), (2) any suitable data identifying the selected target host device (e.g., host device identifier 119 of host device 100, as may be included in a discovery response of step 504), which may be referred to herein as PKRemoteDevice, (3) any suitable data identifying a selected or default particular payment credential of the target host device (e.g., AID 155*aa* of secure element 145 of host device 100, as may be included in a discovery response of step 504 and as may be automatically or user-selected at client device 100'), which may be referred to herein as a SelectedApplicationIdentifier, and/or (4) any suitable data identifying a unique identifier to be associated with the payment request (e.g., a unique value that can be used to identify the payment request across the client and host devices of the system and that may be generated by client device 100 or otherwise), which may be referred to herein as a RemotePaymentIdentifier. Such payment request data may be communicated in any suitable manner at step 506, such as directly (e.g., peer-to-peer) between client device 100' and host device 100 (e.g., via communications path 99 using any suitable communications protocol), or between client device 100' and commercial entity subsystem 400 (e.g., via communications path 95 using any suitable communications protocol) and between commercial entity subsystem 400 and host device 100 (e.g., via communications path 65 using any suitable communications protocol) (e.g., using identity services transport or any other suitable communication services of commercial entity subsystem 400).

At step 508 of process 500, host payment credential data may be at least partially generated by host device 100 and then, at step 510, such host payment credential data may be communicated to commercial entity subsystem 400 by host device 100 as host transaction data. For example, in response to receiving payment request data at step 506, host device 100 may be operative to identify a particular credential of secure element 145 that is to be used to attempt to fund the transaction (e.g., based on a SelectedApplicationIdentifier of the payment request data of step 506), and host payment credential data associated with that particular credential may be generated at step 508 and then communicated along with at least a portion of the payment request data of step 506 (e.g., identification of the merchant of the PKPaymentRequest) as host transaction data at step 510. Such host payment credential data may include any suitable data that may be operative to securely prove proper ownership of the particular secure element credential of host device 100 (e.g., the credential of SSD 154a), including, but not limited to, (i) token data (e.g., a DPAN, DPAN expiry date, and/or CVV of credential information 161a of SSD 154a) and (ii) crypto data (e.g., a cryptogram that may be generated by secure element 145 using a shared secret of SSD 154a and financial institution subsystem 350 (e.g., key 155a') and any other suitable information (e.g., some or all of the token data, information identifying host device 100, information identifying some or all of the potential transaction data of step 502, such as cost and/or currency, any suitable counter values, nonce, etc.) that may be available to host device 100 and that may also be made available to financial institution subsystem 350 (e.g., at step 520 or otherwise) for independently generating the crypto data using the shared secret). Then, host transaction data may be communicated from host device 100 to commercial entity subsystem 400 at step 510, where such host transaction data may include the specific host payment credential data generated at step 508 as well as any other suitable data related to the potential financial transaction to be funded (e.g., as may be provided to host device 100 by the payment request data of step 506), including, but not limited to, (i) specific merchant information, such as identification of a merchant identifier that may identify the particular merchant subsystem 200 that provided the potential transaction data of step 502, (ii) specific transaction information, such as identification of a specific currency to be used to pay for the transaction (e.g., yen, pounds, dollars, etc.) and/or identification of a specific amount of a currency to be paid for the transaction and/or identification of the particular product or service to be purchased or rented or otherwise paid for and/or identification of a default or initial shipping address to be used, (iii) a unique merchant-based transaction identifier (e.g., as generated by merchant subsystem 200 for association with the transaction being conducted), (iv) a unique client-based transaction identifier (e.g., as generated by client device 100' for association with the transaction being conducted), (v) a unique client-based payment request identifier (e.g., as generated by client device 100' for association with the payment request), and/or (vi) a unique host-based transaction identifier (e.g., any suitable data element, such as a 3 or 4 character alphanumeric string, that may be randomly or uniquely generated by host device 100 for association with the transaction being conducted). Therefore, host transaction data communicated from host device 100 to commercial entity subsystem 400 at step 510 may include some or all of the potential transaction data of step 502 and/or of the payment request data of step 506 (e.g., an identifier of the merchant) as well as host payment credential data of step 508 that may include at least two types and/or divisible portions of data based on a particular credential of device 100 (e.g., any suitable token data and any suitable crypto data, which together may enable a more secure financial transaction (e.g., cryptogram validation) when received by financial institution subsystem 350).

Host device 100 may encrypt all or at least a portion of the host payment credential data of the host transaction data (e.g., the token data and/or the crypto data of the host payment credential data) with a financial institution key prior to communicating the host transaction data to commercial entity subsystem 400 at step 510. For example, secure element 145 may encrypt or sign at least a portion of the host transaction data in any suitable manner with any suitable credential key or element available to secure element 145 (e.g., credential key 155a') that may also be available to financial institution subsystem 350. Alternatively or additionally, host device 100 may encrypt all of the host transaction data or at least a portion of the host transaction data (e.g., the host payment credential data) with a commercial entity key prior to communicating the host transaction data to commercial entity subsystem 400 at step 510 (e.g., whether or not any portion of the host transaction data is first encrypted with a financial institution key). For example, secure element 145 may encrypt at least a portion of the host transaction data with access key 155a, access key 155b, CRS 151k, and/or ISD key 156k of secure element 145, which may also be accessible to commercial entity subsystem 400 (e.g., any shared secret between host device 100 and commercial entity subsystem 400). Alternatively or additionally, secure element 145 may sign at least a portion of the host transaction data with CASD 158k that may be accessible to commercial entity subsystem 400. In some embodiments, such a commercial entity key or access key may be a commercial entity public key associated with a scheme of commercial entity subsystem 400 and of which commercial entity subsystem 400 may have access to an associated commercial entity private key. Commercial entity subsystem 400 may provide such a commercial entity public key to financial institution subsystem 350 and financial institution subsystem 350 may then share that commercial entity public key with host device 100 (e.g., when provisioning credential data on host device 100 (e.g., at step 604 of process 600)). Host transaction data, whether or not at least partially encrypted and/or signed by any suitable financial institution key and/or by any commercial entity key, may be communicated by host device 100 to commercial entity subsystem 400 at step 510 in any suitable manner (e.g., such host transaction data may be transmitted from communications component 106 of host device 100 to server 410 of commercial entity subsystem 400 via communications path 65 using any suitable communications protocol).

Next, at step 512, process 500 may include commercial entity subsystem 400 further securing the host transaction data received at step 510 by encrypting at least the host payment credential data of the host transaction data using a shared secret with merchant subsystem 200 such that the host payment credential data may not be utilized for funding a transaction with any entity other than merchant subsystem 200. For example, if the host transaction data of step 510 is encrypted with any commercial entity key, commercial entity subsystem 400 may be operative to decrypt such data at step 512 (e.g., server 410 of commercial entity subsystem 400 may receive the host transaction data and then decrypt/unsign that host transaction data (e.g., with access key 155a, access key 155b, CRS 151k, CASD 158k, and/or ISD key 156k of commercial entity subsystem 400)). By communicating the host transaction data between host device 100 and commercial entity subsystem 400 in a form that has been encrypted/signed using a commercial entity key known to both host device 100 and commercial entity subsystem 400, process 500 may prohibit the communication of that host transaction data from being intercepted and used by an entity that does not have access to the commercial entity key. Moreover, at step 512, commercial entity subsystem 400 may be operative to encrypt or otherwise re-format at least a portion of the host transaction data with a merchant key (e.g., merchant key 157 and/or merchant key 157' that may be associated with merchant subsystem 200 for which the particular transaction is being funded). Such a merchant key may be determined by and accessible to commercial entity subsystem 400 via table 430 (e.g., by identifying a merchant key associated with a merchant identifier of the host transaction data of step 510, which may have been provided to host device 100 from client device 100' by the payment request data of step 506, which may have been provided to client device 100' from merchant subsystem 200 by the potential transaction data of step 502). For example, as mentioned, in some embodiments, the potential transaction request data communicated from merchant subsystem 200 to client device 100' at step 502 may include a merchant identifier that may be indicative of merchant subsystem 200. For example, the merchant identifier may be associated with an online resource 113' utilized by client device 100' when receiving the potential transaction data at step 502. The merchant identifier may be received and utilized by commercial entity subsystem 400 at step 512 to identify a particular one of many merchant keys accessible by commercial entity subsystem 400 (e.g., merchant key 157' through leveraging table 430 of commercial entity subsystem 400) and then commercial entity subsystem 400 may use that identified merchant key for encrypting at least a portion of the host transaction data (e.g., at least the host payment credential data of the host transaction data). By encrypting such host payment credential data with such a merchant key (e.g., a key that may only be known to commercial entity subsystem 400 and merchant subsystem 200), such host payment credential data may be secured in such a manner that it may be securely communicated from commercial entity subsystem 400 to merchant subsystem 200 without being intercepted by another entity and used for funding a transaction with another merchant.

Next, at step 514, process 500 may include commercial entity subsystem 400 communicating the secured host transaction data of step 512 to host device 100. For example, such merchant key-encrypted host payment credential data may be transmitted as at least a portion of secured host transaction data at step 514 from commercial entity subsystem 400 to host device 100 via communications path 65 using any suitable communications protocol. Such secured host transaction data may include any suitable data in addition to the merchant key-encrypted host payment credential data, such as any suitable data of step 502 and/or step 506 associated with the transaction to be funded, including, but not limited to, (i) specific merchant information, such as identification of a merchant identifier that may identify the particular merchant subsystem 200 that provided the potential transaction data of step 502, (ii) specific transaction information, such as identification of a specific currency to be used to pay for the transaction (e.g., yen, pounds, dollars, etc.) and/or identification of a specific amount of a currency to be paid for the transaction and/or identification of the particular product or service to be purchased or rented or otherwise paid for and/or identification of a default or initial shipping address to be used, (iii) a unique merchant-based transaction identifier (e.g., as generated by merchant subsystem 200 for association with the transaction being conducted), (iv) a unique client-based transaction identifier (e.g., as generated by client device 100' for association with the transaction being conducted), (v) a unique client-based payment request identifier (e.g., as generated by client device 100' for association with the payment request), and/or (vi) a unique host-based transaction identifier (e.g., as generated by host device 100 for the host device data). Therefore, the secured host transaction data communicated from commercial entity subsystem 400 to host device 100 at step 514 may include some or all of the potential transaction data of step 502 and/or some or all of the payment request data of step 506 as well as secured host payment credential data.

Next, at step 516 of process 500, host device 100 may receive the secured host transaction data communicated from commercial entity subsystem 400 at step 514 and may share that secured host transaction data with client device 100' in any suitable manner. For example, secured host transaction data may be shared between host device 100 and client device 100' via communications path 99 using any suitable communications protocol that may include encrypting or otherwise reformatting some of the data with a shared secret or key unique to host device 100 and/or client device 100' (e.g., a secure transport protocol (e.g., iMessage™ by Apple Inc.) or e-mail or any other suitable method). In some embodiments, such secured host transaction data may be communicated between host device 100 and client device 100' via a contactless proximity based communication between NFC component 120 and NFC component 120'. Alternatively, although not shown, such secured host transaction data may be communicated directly from commercial entity subsystem 400 to client device 100', rather than via host device 100 and step 514, in any suitable manner (e.g., via communications path 95 using any suitable communications protocol), where commercial entity subsystem 400 may leverage any client device identifier of the host transaction data of step 510 to identify the target client device 100'. Alternatively, although not shown, such secured host transaction data may be communicated directly from commercial entity subsystem 400 to merchant subsystem 200, rather than via host device 100 and/or client device 100' and steps 514 and 516, in any suitable manner (e.g., via communications path 85 using any suitable communications protocol), where commercial entity subsystem 400 may leverage any merchant identifier of the host transaction data of step 510 to identify the target merchant subsystem 200. Alternatively, although not shown, such secured host transaction data may be communicated directly from commercial entity subsystem 400 to financial institution subsystem 350, rather than via host device 100 and/or client device 100' and/or merchant subsystem 200 and steps 514-518, in any suitable manner (e.g., via communications path 55 using any suitable communications protocol). The secured host transaction data that may be received by client device 100' at step 516 may include any suitable data in addition to the merchant key-encrypted host payment credential data, such as any suitable data associated with the transaction to be funded, including, but not limited to, (i) specific merchant information, such as identification of a merchant identifier that may identify the particular merchant subsystem 200 that provided the potential transaction data of step 502, (ii) specific transaction information, such as identification of a specific currency to be used to pay for the transaction (e.g., yen, pounds, dollars, etc.) and/or identification of a specific amount of a currency to be paid for the transaction and/or identification of the particular product or service to be purchased or rented or otherwise paid for and/or identification of a default or initial shipping address to be used, (iii) a unique merchant-based transaction identifier (e.g., as generated by merchant subsystem 200 for association with the transaction being conducted), (iv) a unique client-based transaction identifier (e.g., as generated by client device 100' for association with the transaction being conducted), (v) a unique client-based payment request identifier (e.g., as generated by client device 100' for association with the payment request), and/or (vi) a unique host-based transaction identifier (e.g., as generated by host device 100 for the host device transaction data). Therefore, the secured host transaction data shared with client device 100' may include some or all of the potential transaction data of step 502 and/or some or all of the payment request data of step 506 as well as secured host payment credential data.

Next, at step 518 of process 500, client device 100' may use the secured host transaction data shared at step 516 to fund the transaction with merchant subsystem 200 by sending client transaction data to merchant subsystem 200 that may include the merchant key-encrypted host payment credential data of the secured host transaction data. For example, such client transaction data may be transmitted from communications component 106' of client device 100' to server 210 of merchant subsystem 200 via communications path 15 using any suitable communications protocol and/or as a contactless proximity-based communication between NFC component 120' and merchant terminal 220. The client transaction data that may be communicated to merchant subsystem 200 by client device 100' (e.g., using merchant resource 113') may include any suitable data in addition to the merchant key-encrypted host payment credential data of the secured host transaction data, such as any suitable data associated with the transaction to be funded, including, but not limited to, (i) specific merchant information, such as identification of a merchant identifier that may identify the particular merchant subsystem 200 that provided the potential transaction data of step 502, (ii) specific transaction information, such as identification of a specific currency to be used to pay for the transaction (e.g., yen, pounds, dollars, etc.) and/or identification of a specific amount of a currency to be paid for the transaction and/or identification of the particular product or service to be purchased or rented or otherwise paid for and/or identification of a default or initial shipping address to be used, (iii) a unique merchant-based transaction identifier (e.g., as generated by merchant subsystem 200 for association with the transaction being conducted), (iv) a unique client-based transaction identifier (e.g., as generated by client device 100' for association with the transaction being conducted), (v) a unique client-based payment request identifier (e.g., as generated by client device 100' for association with the payment request), and/or (vi) a unique host-based transaction identifier (e.g., as generated by host device 100 for the host device transaction data). Therefore, the client transaction data shared with merchant subsystem 200 may include some or all of the potential transaction data of step 502 and/or some or all of the payment request data of step 506 as well as at least the merchant key-encrypted host payment credential data of the secured host transaction data of step 512. By communicating the merchant key-encrypted host payment credential data of the secured host transaction data as at least a portion of the client transaction data, process 500 may enable the communication of such merchant key-encrypted host payment credential data to merchant subsystem 200 for funding the financial transaction without merchant subsystem 200 having to communicate with host device 100 and/or commercial entity subsystem 400 yet may also prevent the host payment credential data generated by host device 100 at step 508 from being used to fund a transaction for a merchant entity that does not have access to the merchant key (e.g., host device 100 and/or client device 100'). Alternatively, although not shown, at least the merchant key-encrypted host payment credential data of the secured host transaction data of step 514 may be communicated directly from host device 100 to merchant subsystem 200, rather than via client device 100' and additional step 518, in any suitable manner, where host device 100 may leverage any merchant identifier of the payment request data of step 506 to identify the target merchant subsystem 200. Additionally or alternatively, although not shown, host device 100 may be operative to encrypt the host payment credential data of step 508 with an appropriate merchant key on host device 100 rather than at commercial entity subsystem 400 (e.g., if such a merchant key were to be made accessible to host device 100). Alternatively, although not shown, at least the merchant key-encrypted host payment credential data of the secured host transaction data of step 512 may be communicated directly from commercial entity subsystem 400 to merchant subsystem 200, rather than via host device 100 and/or client device 100' and, thus, additional steps 516 and 518, in any suitable manner (e.g., via communications path 85 using any suitable communications protocol), where commercial entity subsystem 400 may leverage any merchant identifier of the host transaction data of step 510 to identify the target merchant subsystem 200. Alternatively, although not shown, at least the merchant key-encrypted host payment credential data of the secured host transaction data of step 512 may be communicated directly from commercial entity subsystem 400 to financial institution subsystem 350, rather than via host device 100 and/or client device 100' and/or merchant subsystem 200 and steps 514-518, in any suitable manner (e.g., via communications path 55 using any suitable communications protocol). In other embodiments, host device 100 may communicate the secured host transaction data directly to merchant subsystem 200 at step 516 rather than via client device 100'. In yet other embodiments, commercial entity subsystem 400 may communicate the secured host transaction data directly to client device 100' at step 514 rather than via host device 100. In yet other embodiments, commercial entity subsystem 400 may communicate the secured host transaction data directly to merchant subsystem 200 at step 514 rather than via host device 100 and/or via client device 100'.

After the merchant key-encrypted host payment credential data of the secured host transaction data of step 512 has been received by merchant subsystem 200, process 500 may include merchant subsystem 200 utilizing that merchant key-encrypted host payment credential data to execute a financial transaction with acquiring bank 300 and/or financial institution subsystem 350 at step 520. For example, merchant subsystem 200 may decrypt the merchant key-encrypted host payment credential data with a merchant key accessible to merchant subsystem 200 (e.g., merchant key 157 and/or merchant key 157') and may then forward that host payment credential data to acquiring bank 300 and/or financial institution subsystem 350 (e.g., via communications path 25 and/or communications path 35) such that a funding account associated with that host payment credential data may be identified and used by acquiring bank 300 and/or financial institution subsystem 350 to fund a financial transaction. Next, after such a transaction has been executed at step 520, process 500 may include merchant subsystem 200 confirming the status of the transaction (e.g., the execution or denial of the transaction) to client device 100' using any suitable confirmation information at step 522 (e.g., as any suitable payment receipt data and/or any suitable insufficient funds message data). Then, client device 100' may be operative to share such confirmed transaction status with host device 100 at step 524 (e.g., as any suitable payment receipt data and/or any suitable insufficient fluids message data). If the transaction is successful, the confirmation information may be operative to close the transaction (e.g., the transaction identified by the unique RemotePaymentIdentifier of the payment request data) at client device 100' at step 522 and/or at host device 100 at step 524. Additionally or alternatively, if the transaction is not successful, the confirmation information may or may not be operative to close the transaction (e.g., close the transaction if no valid funds available or host device identified as fraudulent, but keep open and allow updates if a non-valid shipping address is determined).

It is understood that the steps shown in process 500 of FIG. 5 are only illustrative and that existing steps may be modified or omitted, additional steps may be added, and the order of certain steps may be altered. For example, in some embodiments, a process similar to process 500 may be carried out without commercial entity subsystem 400. Instead, host device 100 may be operative to access a merchant key associated with merchant subsystem 200 and derive merchant key-encrypted host payment credential data (e.g., at step 508, such that host device 100 may perform the operations of step 512) and then communicate such merchant key-encrypted host payment credential data with client device 100' and/or merchant subsystem 200 for enabling the transaction to be securely funded with the host payment credential data. By communicating merchant key-encrypted host payment credential data with merchant subsystem 200, process 500 may enable a financial transaction initiated between client device 100' and merchant subsystem 200 to be at least partially funded by a payment credential that is non-native to client device 100' but rather by a payment credential that is native to host device 100. Process 500 may enable the communication of such merchant key-encrypted host payment credential data to merchant subsystem 200 for funding the financial transaction without merchant subsystem 200 having to communicate with or even be aware of the existence of either host device 100 and/or commercial entity subsystem 400, yet may also prevent the host payment credential data generated by host device 100 at step 508 from being used by an entity that does not have access to such a merchant key. In some embodiments, host device 100 may be configured to communicate with commercial entity subsystem 400 seamlessly and transparently to a user of host device 100 (e.g., at steps 510-514) for sharing and/or receiving certain data that may enable a higher level of security or efficiency. After a user of host device 100 may choose to utilize a specific credential for carrying out a financial transaction based on the payment request data at step 508, the remaining steps of process 500 may occur transparent to that user (e.g., steps 510-524 may occur without any further user interaction with host device 100 and may seem instantaneous to a user of host device 100). Process 500 may appear to a user of host device 100 as if, after step 508, secure host payment credential data is automatically and instantaneously sent to merchant subsystem 200 and the status of the financial transaction confirmed. Additionally or alternatively, after a user of client device 100' may identify a specific payment source to which payment request data may be communicated at step 506, the remaining steps of process 500 may occur transparent to that user (e.g., steps 508-524 may occur without any further user interaction with client device 100' and may seem instantaneous to a user of client device 100'). Process 500 may appear to a user of client device 100' as if, after step 506 (e.g., after selecting a host device), secure host payment credential data is automatically and instantaneously sent to merchant subsystem 200 and the status of the financial transaction confirmed. Alternatively, in some embodiments, process 500 may occur altogether transparent to a user of client device 100' (e.g., where client device 100' may be configured to automatically determine when a financial transaction ought to occur and to automatically send payment request data for such a financial transaction to one or more available payment sources without any active client device user interaction with client device 100').

Figure 6:
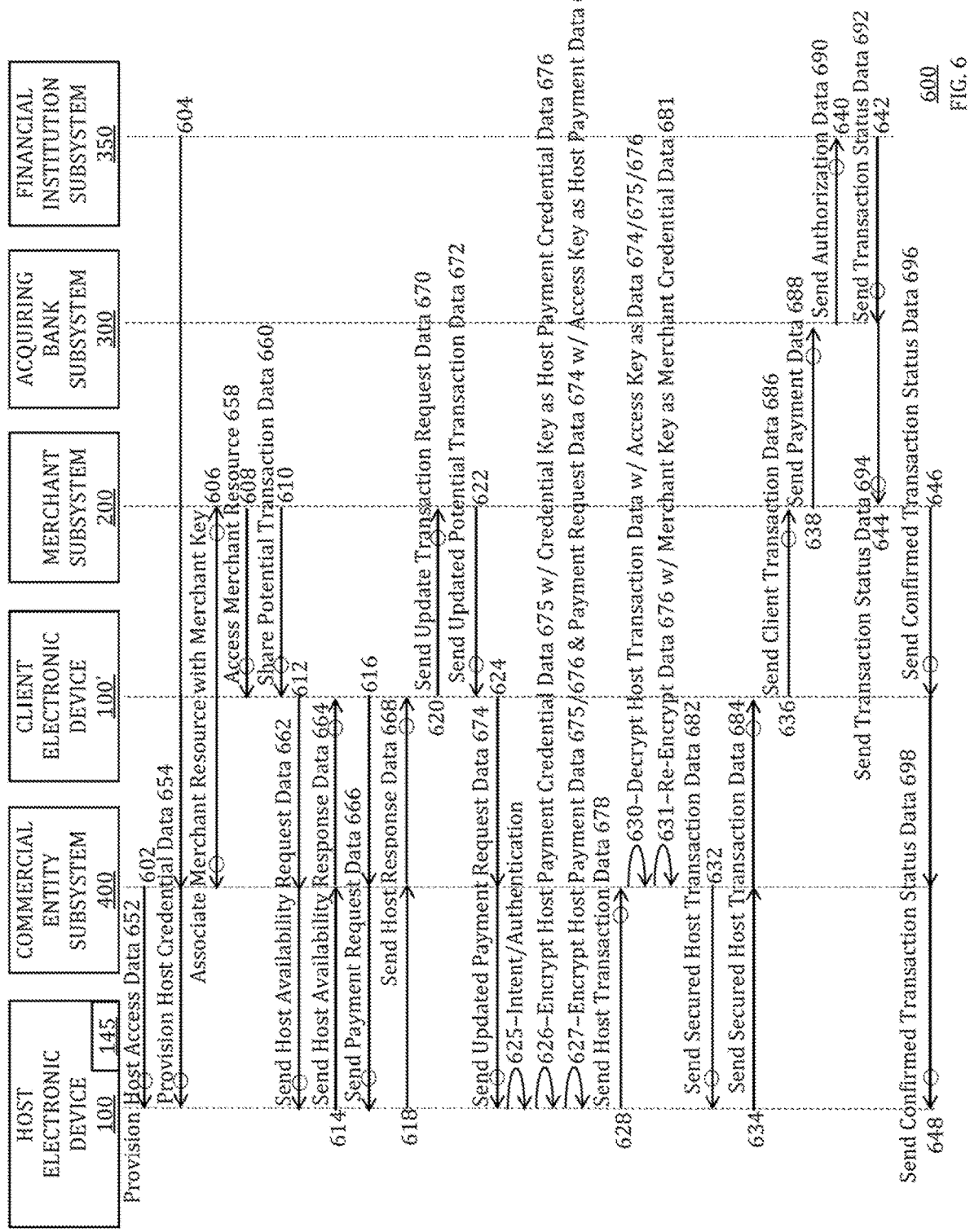

Description of FIG. 6

FIG. 6 is a flowchart of an illustrative process 600 for conducting a financial transaction using an electronic device with a non-native payment credential. Process 600 is shown being implemented by host electronic device 100, client electronic device 100', merchant subsystem 200, acquiring bank subsystem 300, commercial entity subsystem 400, and financial institution subsystem 350. However, it is to be understood that process 600 may be implemented using any other suitable components or subsystems. Process 600 may provide a seamless user experience for securely and efficiently conducting a financial transaction with merchant subsystem 200 via client device 100' while using a payment credential from host device 100. To facilitate the following discussion regarding the operation of system 1 for conducting a financial transaction according to process 600 of FIG. 6, reference is made to various components of system 1 of the schematic diagrams of FIGS. 1-4, and to front views of screens 190-190h of FIGS. 3-3H that may be representative of a graphical user interface of host device (HD) 100 (e.g., a GUI as may be provided by card management application 113b or any suitable payment application of host device 100) and/or that may be representative of a graphical user interface of client device (CD) 100' (e.g., a GUI as may be provided by a merchant application 113' of client device 100' or any suitable payment application of client device 100') during such a transaction. The operations described may be achieved with a wide variety of graphical elements and visual schemes. Therefore, the embodiments of FIGS. 3-3H are not intended to be limited to the precise user interface conventions adopted herein. Rather, embodiments may include a wide variety of user interface styles.

Process 600 may begin at step 602, where host access data 652 (e.g., host access data 652 of FIG. 1B) may be provisioned on a secure element of host device 100 by commercial entity subsystem 400. For example, an access SSD (e.g., SSD 154b) may be provisioned on secure element 145 of host device 100 as access data 652 from server 410 of commercial entity subsystem 400 in order to more securely enable host device 100 to conduct a financial transaction with merchant subsystem 200. As mentioned, access SSD 154b may be at least partially provisioned on secure element 145 of host device 100 directly from commercial entity subsystem 400 (e.g., as host access data 652 via communication path 65 between server 410 of commercial entity subsystem 400 and communications component 106 of host device 100, which may then be passed to secure element 145 from communications component 106 (e.g., via bus 118)). Host access data 652 via path 65 may be provisioned on secure element 145 of host device 100 as at least a portion or all of an access SSD 154b and may include access applet 153b and/or access key 155b. Step 602 may be at least partially carried out when host device 100 is initially configured (e.g., by commercial entity subsystem 400 before host device 100 is sold to a user). Alternatively or additionally, step 602 may be at least partially carried out in response to a user of host device 100 initially setting up secure element 145 of NFC component 120. Additionally or alternatively, host access data 652 may include ISD key 156k for ISD 152 of secure element 145 and may be used in addition to or as an alternative to access key 155b for enabling secure transmissions between commercial entity subsystem 400 and host device 100. Additionally or alternatively, host access data 652 may include CRS 151k of CRS 151 and/or CASD 158k of CASD 158 of secure element 145 of host device 100 and may be used in addition to or as an alternative to access key 155b and/or access key 155a and/or ISD key 156k for enabling secure transmissions between commercial entity subsystem 400 and host device 100 (e.g., for use as any suitable commercial entity key or shared secret between commercial entity subsystem 400 and host device 100).

At step 604, process 600 may include provisioning host credential data 654 (e.g., credential data 654 of FIG. 1B) on a secure element of host device 100 by financial institution subsystem 350, in some embodiments, via commercial entity subsystem 400. For example, such host credential data 654 may be at least partially provisioned on secure element 145 of host device 100 directly from financial institution subsystem 350 (e.g., via communication path 75 of FIG. 1B between financial institution subsystem 350 and device 100, which may be passed to secure element 145 via communications component 106). Additionally or alternatively, such host credential data 654 may be at least partially provisioned on secure element 145 of host device 100 from financial institution subsystem 350 via commercial entity subsystem 400 (e.g., via communication path 55 of FIG. 1B between financial institution subsystem 350 and commercial entity subsystem 400, which may be passed to host device 100 as host credential data 654 via communication path 65 of FIG. 1B between server 410 of commercial entity subsystem 400 and communications component 106 of host device 100, which may then be passed to secure element 145 from communications component 106 (e.g., via bus 118)). Host credential data 654 via path 75 and/or via path 65 may be provisioned on secure element 145 of host device 100 as at least a portion or all of credential SSD 154a and may include credential applet 153a with credential information 161a and/or credential key 155a' and/or key 155ak. Step 604 may be at least partially carried out when a user of host device 100 selects a particular credential to be provisioned on host device 100. In some embodiments, host credential data 654 may also include access key 155a, which may be initially provided from commercial entity subsystem 400 to financial institution subsystem 350 and/or may be added by commercial entity subsystem 400. In some embodiments, such host credential data 654 may include the primary account number as at least a portion of credential information of the payment credential being provisioned (e.g., credential information 161a of applet 153a), an AID (e.g., AID 155aa for applet 153a of the data of the payment credential being provisioned at SSD 154a), an SSD identifier, and/or an SSD counter.

The credential data provisioned on host device 100 may include all data necessary to make a payment with that credential, such as, for example, a primary account number ("PAN"), a card security code (e.g., a card verification code ("CVV")), PAN expiration date, name associated with the credential, and the like, as well as other data that may be operative for host device 100 to generate appropriate crypto data (e.g., any suitable shared secret and any suitable cryptographic algorithm or cipher whose functional output may be at least partially determined by the shared secret). A "virtual" credential or virtual PAN or device PAN ("D-PAN") may be provisioned on host device 100 rather than the user's "actual" credential or actual PAN or funding PAN ("F-PAN"). For example, once it is determined that a credential is to be provisioned on host device 100, it may be requested (e.g., by financial institution subsystem 350, by commercial entity subsystem 400, and/or by a user of host device 100) that a virtual credential be generated, linked to the actual credential, and provisioned on host device 100 instead of the actual credential. Such creation and linking of a virtual credential with an actual credential may be performed by any suitable component of financial institution subsystem 350. For example, a payment network subsystem 360 (e.g., a particular payment network subsystem 360 that may be associated with the brand of the actual credential) may define and store a virtual-linking table 312 (e.g., as shown in FIG. 1B) that may create associations between the actual credential and a virtual credential, such that anytime a virtual credential is utilized by host device 100 for a financial transaction with merchant subsystem 200 (e.g., after being provisioned on host device 100), payment network subsystem 360 may receive an authorization or validation request or otherwise attempt to validate any received data indicative of that virtual credential (e.g., at step 642 in response to receiving data 690 at step 640) and may conduct an analysis of that validation attempt request in light of the actual credential associated with the virtual credential as determined by table 312. Alternatively, such a table may be accessible and/or similarly leveraged by an appropriate issuing bank subsystem 370 or any other suitable subsystem accessible by financial institution subsystem 350. By provisioning a virtual credential on host device 100 rather than an actual credential, financial institution subsystem 350 may be configured to limit the fraudulent activity that may result when the virtual credential is intercepted by an unauthorized user, as payment network subsystem 360 may only be configured to utilize table 312 for linking the virtual credential to the actual credential during certain transactions.

At step 606, process 600 may include associating a merchant's online resource, such as a merchant application 113 or a merchant website, with a merchant key 157. For example, commercial entity subsystem 400 may populate a table 430 to associate a merchant key with a merchant's resource (e.g., merchant key 157 with resource 113 of host device 100 and/or merchant key 157' with resource 113' of client device 100') for enabling a secure commerce credential data communication between commercial entity subsystem 400 and merchant subsystem 200 (e.g., via host device 100 and/or client device 100') using that merchant resource. Both merchant subsystem 200 and commercial entity subsystem 400 may store a version of such a merchant key (e.g., in a respective secure element of merchant subsystem 200 and commercial entity subsystem 400, as shown in FIG. 1B). In some embodiments, in order to participate in an online-resource payment program, a merchant may be required to register as a member of a program run by the commercial entity of commercial entity subsystem 400 and/or obtain a merchant certificate. Merchants may not be able to receive payment data without a certificate. Each certificate may contain a unique commercial entity merchant identifier that may bind the merchant to the public key for that merchant (e.g., a public merchant key 157/157'). A merchant may obtain multiple certificates, and thus may hold more than one identity. Such a unique commercial entity merchant identifier may be provided by merchant subsystem 200 to client device 100' (e.g., at step 610 as a portion of potential transaction data 660 and/or as an inherent element of the merchant online resource running on client device 100' (e.g., merchant application 113')), and such a commercial entity merchant identifier may be provided from client device 100' to commercial entity subsystem 400 via host device 100 during an attempted transaction (e.g., as at least a portion of host transaction data 678 at step 628 via payment request data 666 and/or payment request data 674). In some embodiments, commercial entity subsystem 400 may generate or otherwise assign a merchant key for a merchant online resource (e.g., key 157 for application 113 and/or key 157' for application 113') and provide such a merchant key to merchant subsystem 200 (e.g., via path 85). Alternatively, merchant subsystem 200 may generate or otherwise assign a merchant key for a merchant online resource and provide such a merchant key to commercial entity subsystem 400 (e.g., via path 85). Either merchant subsystem 200 or commercial entity subsystem 400 may be responsible for management of any merchant keys, which may include the generation, exchange, storage, use, and replacement of such a key. No matter how or where such a merchant key may be generated and/or managed, both merchant subsystem 200 and commercial entity subsystem 400 may store a version of a merchant key (e.g., in a respective secure element of merchant subsystem 200 and commercial entity subsystem 400). This may enable a shared secret between commercial entity subsystem 400 and merchant subsystem 200 for securely communicating data therebetween. In some embodiments, host device 100 may be provided with such a merchant key for securely encrypting payment data with that key on host device 100.

At step 608, process 600 may include a merchant's resource 658 (e.g., a merchant's third party resource 113' of FIG. 1B) being accessed by client device 100'. As shown in FIG. 1B, a merchant's resource application 113' may be loaded onto client device 100' from commercial entity subsystem 400 (e.g., from application store 420). For example, as shown in FIG. 3 but with respect to host device 100, a user of client device 100' may select a "Merchant App" icon 183 of a specific screen 190 of GUI 180 using touch screen input component 110*f* of I/O component 114*a*, and this selection may be recognized by client device 100' as an initiation event for providing the user with the ability to interact with a merchant's third party application 113'. Alternatively or additionally, such a merchant's resource 658 may be accessed by client device 100' directly from merchant subsystem 200. In response to such a selection of a merchant application icon, a GUI may provide an interactive screen where client device 100' may enable the user to interact with application 113' to peruse commercially available items from the merchant for purchase. Alternatively, step 608 may include client device 100' accessing a merchant's resource 658 as a merchant's webpage from merchant subsystem 200 (e.g., via merchant server 210) using an internet application of client device 100', which may also be selectable by an "Internet" icon (e.g., icon 182 of specific screen 190 of GUI 180 of FIG. 3) for providing the user with the ability to interact with a merchant's webpage rather than with a merchant's third part application. Alternatively, step 608 may include any suitable automatic accessing of resource 658 without active user input (e.g., client device 100' may be operative to automatically interact with resource 658 in response to detecting any suitable event, such as an autonomous home appliance client device 100' detecting that it is running low of a particular supply (e.g., a washing machine client device 100' in response to detecting a low supply of laundry detergent)).

Next, at step 610, client device 100' may receive potential transaction data 660 from the accessed merchant resource (e.g., as described with respect to step 502 of process 500). For example, as shown in FIG. 1B, potential transaction data 660 may be provided to client device 100' from merchant subsystem 200 (e.g., from merchant server 210) when client device 100' is interacting with the merchant's resource 113' (e.g., third party application or website or any other suitable online resource (e.g., resource 658) of the merchant). Alternatively or additionally, at least a portion of potential transaction data 660 may be locally accessible by client device 100' via application 113' local to client device 100' (e.g., when application 113' is stored in a memory component or being run by processor 102' of client device 100'), rather than the data being actively sent to client device 100' from merchant server 210 at step 610. For example, when application 113' may be initially stored on client device 100' (e.g., at step 608 as merchant's resource 658), at least some of potential transaction data 660 may be generated by that initially stored application 113' absent any additional information provided to client device 100' by merchant subsystem 200. Potential transaction data 660 may include any suitable data indicative of any suitable characteristics of a potential financial transaction to occur between a user of client device 100' and a merchant of merchant subsystem 200, including, but not limited to, (i) specific merchant information, such as a unique merchant identifier (e.g., an acquiring bank merchant identifier and/or a commercial entity merchant identifier) and/or identification of the particular merchant resource being used (e.g., the particular merchant application 113'), (ii) specific transaction information, such as identification of a specific currency to be used to pay for the transaction (e.g., yen, pounds, dollars, etc.) and/or identification of a specific amount of a currency to be paid for the transaction and/or identification of the particular product or service to be purchased or rented or otherwise paid for and/or identification of a default or initial shipping address to be used, (iii) information indicative of the one or more types of payment methods acceptable to the merchant for the transaction (e.g., a list of payment cards that may be used for the purchase (e.g., MasterCard but not Visa)), and/or (iv) a unique merchant-based transaction identifier (e.g., any suitable data element, such as a 3 or 4 character alphanumeric string, that may be randomly or uniquely generated by merchant subsystem 200 for association with the transaction being conducted). Such potential transaction data 660 may include any suitable number and types of data fields, with or without associated data, that may be required or at least used for completing a financial transaction, such as contact information fields (e.g., telephone number, e-mail address, mailing address) of a customer making the purchase, where some fields may be populated and included as part of such potential transaction data 660, and/or where some fields may not be populated as part of such potential transaction data 660 but may be open and awaiting population during process 600. Such potential transaction data 660 of step 610 may be referred to herein as a PKPaymentRequest. Alternatively, as mentioned, a user may not be actively interacting with client device 100' in order for potential transaction data 660 associated with merchant subsystem 200 to be made available to client device 100' at step 610.

Potential transaction data 660 may define a merchant resource's request for client device 100' to produce a payment token for the purchase of products and/or services and may encapsulate any suitable information about the potential transaction including, for example, information about the merchant's payment processing capabilities, an amount to pay, and the currency code. Potential transaction data 660 may also include a list of one or more payment networks (e.g., payment network(s) 360) that may be supported by the merchant such that client device 100' may be configured to determine whether any of such listed one or more payment networks has an authorized payment credential on client device 100' or on any suitable host device available to client device 100'. In some embodiments, once such potential transaction data 660 may be accessed by client device 100', as shown in FIG. 3A, for example, a GUI of client device 100' may provide screen 190*a*, where a merchant's resource may use transaction data 660 to show to a user of client device 100' any suitable information associated with the potential transaction, such as the name of the merchant (e.g., "Merchant A") with information 307*a*, the name of the product (e.g., "Product B") with information 307*b*, the price (e.g., "Price C") with information 307*c*, and/or initial shipping data (e.g., "Address D") with information 307*d*. Potential transaction data 660 that may be provided to client device 100' by merchant subsystem 200 may be indicative of such information 307*a*, 307*b*, 307*c*, and/or 307*d*. A user of client device 100' may interact with device 100' and screen 190*a* to adjust certain portions of such information (e.g., shipping address, etc.), which may require updated potential transaction data to be generated and shared by merchant subsystem 200 (e.g., at step 622). As also shown in FIG. 3A and described below in more detail, screen 190*a* may also include a secure pay prompt 309. At least a portion of potential transaction data 660 may be provided from merchant subsystem 200 to client device 100' via communication path 15 of FIG. 1B and may be received by communications component 106' of client device 100'. Communications component 106' may pass this potential transaction data 660 on to processor 102' (e.g., for displaying on screen 190*a* as part of a user interface on client device 100' (e.g., for information 307*a*-307*d*)) and/or to NFC component 120'. For example, NFC component 120' may utilize such potential transaction data 660 for securely enabling a financial transaction between client device 100' and merchant subsystem 200. In some embodiments, potential transaction data 660 may be referred to as merchant payment request data and/or a uniform resource locator ("URL") or any other suitable reference character string and/or query string.

Next, at step 612 of process 600, client device 100' may attempt to identify at least one non-native payment source (e.g., of at least one host device) for potentially funding a financial transaction, such as the transaction associated with potential transaction data 660 of step 610, by sending any suitable host availability request data 662 (e.g., a discovery request) to any suitable remote source, and, then, at step 614 of process 600, in response to any sent host availability request data 662, client device 100' may receive any suitable host availability response data 664 (e.g., any suitable discovery response) from any suitable source (e.g., as described with respect to step 504 of process 500). Any suitable technique may be used to identify any available non-native payment sources. For example, a beacon signal may be transmitted by client device 100' as host availability request data 662 that may request a response from any host device that might receive the beacon (e.g., any host device within a particular distance of client device 100' that may be operative to communicate using a particular communication protocol of the beacon or a beacon may be a quick response ("QR") code or any other suitable code that may be presented by client device 100' and read by a scanner of one or more host devices). Alternatively or additionally, client device 100' may send host availability request data 662 to one or more particular host devices using any suitable communication path and protocol (e.g., to one or more devices identified in a contacts application of device 100' and/or identified manually by a user of device 100' (e.g., by telephone number or e-mail address or any suitable unique device identifier (e.g., device identifier 119 of host device 100))).

Such host availability request data 662 may include any suitable information, such as information identifying client device 100' (e.g., device identifier 119' of client device 100') and/or information identifying one or more particular payment types that may be acceptable (e.g., by the merchant) for funding the potential financial transaction (e.g., the payment type(s) that may be identified by potential transaction data 660 of step 610), and may request any suitable host availability response data 664 in response, such as any suitable information that may identify the responding host device (e.g., device identifier 119 of host device 100) and/or any suitable information identifying one or more particular payment types that may be available to that host device (e.g., AID 155*aa* and/or AID 155*ba* of host device 100, where such payment type identification of host availability response data 664 may only include each type that matches a type in the discovery request of host availability request data 662 or may include all payment types available to that responding host) and/or any suitable information identifying a location of the responding host device and/or any suitable information identifying a status of the host device (e.g., awake, asleep, off, etc.). Host availability response data 664 shared by a host device may be the bare minimum amount of data required for host discovery, such as by using protocol buffers. Commercial entity subsystem 400 or any other entity may participate in the identification of host device 100 by client device 100' at step 612 and/or step 614. For example, as mentioned, commercial entity subsystem 400 may be operative to manage any suitable services made available to client device 100' and/or host device 100, such as iCloud™ and/or iMessage™ or any other suitable identity services transport, which may be operative to make associations between different devices and/or to automatically determine the status and/or capabilities of various devices (e.g., a family may have an account with commercial entity subsystem 400 that may be associated with client device 100' as well as multiple other devices, including host device 100). As one example, client device 100' may send host availability request data 662 to commercial entity subsystem 400 for requesting the status of all other devices associated with an account of client device 100', and commercial entity subsystem 400 may respond by obtaining the status of one, some, or each one of such devices and sharing each one of those statuses with client device 100' as host availability response data 664, where a status may be indicative of the availability of host device 100 and the identity of at least one payment type available to host device 100. Each host device may have its own settings with respect to such requests and potential responses (e.g., a particular host device may be configured to only respond to host availability request data 662 received from particular client devices (e.g., only devices associated with the same account at commercial entity subsystem 400, only devices associated with contacts in a contact application of that particular host device, etc.)). Such requests and/or responses for enabling the identification of one or more available payment sources at steps 612 and 614 may be communicated in any suitable manner, such as directly between client device 100' and host device 100 (e.g., via communications path 99 using any suitable communications protocol), or between client device 100' and commercial entity subsystem 400 (e.g., via communications path 95 using any suitable communications protocol) and between commercial entity subsystem 400 and host device 100 (e.g., via communications path 65 using any suitable communications protocol). For example, as shown in FIG. 1B, host availability request data 662 may be communicated from client device 100' to host device 100 (e.g., via communications path 99 using any suitable communications protocol or via commercial entity subsystem 400 (e.g., via communications path 95 and communications path 65 using any suitable communications protocol(s))) or to commercial entity subsystem 400 (e.g., via communications path 95 using any suitable communications protocol), and host availability response data 664 may be communicated to client device 100' from host device 100 (e.g., via communications path 99 using any suitable communications protocol or via commercial entity subsystem 400 (e.g., via communications path 65 and communications path 95 using any suitable communications protocol(s))) or from commercial entity subsystem 400 (e.g., via communications path 95 using any suitable communications protocol).

Host availability request data 612 may be sent automatically by client device 100' in response to receiving potential transaction data 660 or periodically independent of the receipt of such transaction data 660 or in response to a request made by a user of client device 100' at any suitable time, such as in response to a user of client device 100' interacting with the GUI of screen 190a of FIG. 3A. For example, in response to a user selection of secure pay prompt 309 of screen 190a of client device 100' in order to make a purchase from the merchant according to the details of potential transaction data 660, client device 100' may generate and transmit host availability request data 662. Moreover, as shown in FIG. 3B, client device 100' may be configured to provide screen 190b in response to receiving selection of secure pay prompt 309 of screen 190a of FIG. 3A and in response to receiving any suitable host availability response data 664, which may prompt a user to interact with client device 100' in one or more ways to choose a specific payment source or credential that may be available to client device 100' for making the purchase. For example, as shown, screen 190b may include a payment source selection prompt 311 that may enable a user to select one of potentially multiple payment sources that may be available to client device 100'. Payment source selection prompt 311 may only include payment sources with credentials that are associated with payment networks supported by the merchant (e.g., as may be determined by potential transaction data 660, as mentioned above) or may show all payment sources available to client device 100' (e.g., all sources associated with all AIDs received as host availability response data 664) yet may make only those that are associated with acceptable payment networks able to be selectable by a user. Payment source selection prompt 311 may include any suitable payment sources, including, but not limited to, any suitable payment credentials native to a secure element of client device 100' (not shown), any suitable non-native payment credentials of any available payment sources (e.g., payment method X of host device 1 as may be indicated by payment option identifier 311a of prompt 311, payment method Y of host device 1 as may be indicated by payment option identifier 311b of prompt 311, etc.) as may be identified by any received host availability response data 664, and/or any suitable other payment source that may be identified by client device 100' (e.g., payment option identifier 311c of prompt 311 that may enable a user of client device 100' to manually enter or select any suitable remote host device for requesting payment (e.g., by entering any suitable unique host device identifier, such as a telephone number or e-mail address of a host device, which may be used by client device 100' to communicate with that remote host, or by selecting a host device that may be identified in a contacts application of client device 100' or that may be identified as a last selected host device or otherwise)). In some embodiments, payment source selection prompt 311 may be operative to enable a user of client device 100' to select a particular payment type of a particular payment source (e.g., payment method (PM) X (e.g., "an American Express Card with an account number ending in 0096") of host device 1 of identifier 311a or payment method (PM) Y (e.g., "a MasterCard Card with an account number ending in 0035") of host device 1 of identifier 311b) and/or payment source selection prompt 311 may be operative simply to enable a user of client device 100' to select a particular payment source (e.g., host device 1 or host device 2) but not a particular payment type of that payment source (e.g., depending on the specificity of host availability response data 664 received by client device 100' or depending on any other suitable data available to client device 100'). In some embodiments, host availability response data 664 may be based on cached payment availability data known by commercial entity subsystem 400 and/or by client device 100' for a particular host device 100 that may currently be non-responsive (e.g., a host device 100 that may be turned off and not responsive to the discovery request of step 612 but may be known to include a suitable payment credential), where an identifier (not shown) of prompt 311 may include identification of that host device and its known payment credential as well as information alerting the user of client device 100' that such a host device is currently turned off (e.g., "HD2 must be turned on to enable use of HD2's PM Z").

Next, at step 616 of process 600, client device 100' may communicate payment request data 666 to at least one particular host device 100 (e.g., as described with respect to step 506 of process 500). A target host device 100 of payment request data 666 may be determined in any suitable manner by client device 100', such as automatically or in response to a user selection with respect to payment source selection prompt 311 of FIG. 3B, and/or such a determination may be made based on any suitable information, such as potential transaction data 660 and/or host availability response data 664. For example, a user of client device 100' may select the target host device 100 for payment request data 666 of step 616 from a list of potential target host devices of payment source selection prompt 311 of FIG. 3B that may be provided based on the identification of one or more payment sources using host availability response data 664 (e.g., "HD1's PM X" of identifier 311a and "HD1's PM Y" of identifier 311b), or client device 100' may identify any suitable particular target host device in any suitable manner (e.g., a host device in a contacts application of client device 100' and/or a host device identified manually by a user of device 100' (e.g., by a telephone number or e-mail address or any suitable unique device identifier of the host device (e.g., using the option of identifier 311c of FIG. 3B))). As just one particular example, as shown in FIG. 3C, client device 100' may be configured to provide screen 190c in response to receiving user selection of "HD1's PM X" of identifier 311a of payment source selection prompt 311 of FIG. 3B. Screen 190c of FIG. 3C may prompt a user to interact with client device 100' in one or more ways to request non-native host device payment for the selected payment source of payment source selection prompt 311 of FIG. 3B as indicated by payment method identifier 313 of FIG. 3C, such as by user selection of request host device (HD) payment prompt 315 of FIG. 3C. Alternatively, the target host device 100 for payment request data 666 of step 616 may be automatically selected by client device 100' in response to any identification data obtained by client device 100' at step 614 (e.g., client device 100' may be customized or otherwise configured to select one host device from a group of available host devices based on any suitable characteristic (e.g., the host device with the shortest distance to client device 100' or the host device with the highest priority of the available host devices (e.g., as may be determined by a default or customized setting of an application of client device 100' in combination with host availability response data 664 or otherwise), etc.). Therefore, payment request data 666 of step 616 may be automatically generated and transmitted by client device 100' without any user interaction with client device 100' (e.g., based on transaction data 660 and/or any host availability response data 664 and/or any application parameters (e.g., of any application running on client device 100')). Such payment request data 666 of step 616 may be communicated in any suitable manner at step 616, as shown in FIG. 1B, such as directly between client device 100' and host device 100 (e.g., via communications path 99 using any suitable communications protocol), or between client device 100' and commercial entity subsystem 400 (e.g., via communications path 95 using any suitable communications protocol) and then between commercial entity subsystem 400 and host device 100 (e.g., via communications path 65 using any suitable communications protocol). Client device 100' may be operative to maintain a local cache (e.g., on memory local to client device 100') of the various payment types available to the various host devices associated with client device 100'(e.g., based on data that may be routinely collected by commercial entity subsystem 400 and shared with client device 100' at any suitable times), such that a specific dedicated discovery request and response cycle may not be necessary when a payment request is to be made. When one or more available payment types from native credentials (e.g., on client device 100') and/or non-native credentials (e.g., on one of more host devices 100) are determined by client device 100', automatic selection of a particular payment source and/or prioritization amongst various payment sources for selection by a user of client device 100' may be enabled. For example, client device 100' may be operative to automatically select or prioritize one of at least one available payment sources to be targeted and identified in a payment request based on the distance between client device 100' and the host device that may include the selected payment source (e.g., the host device with an available payment source that is closest to the client device (e.g., as may be determined from distance data in a discovery response or via other suitable communication related data (e.g., detected communicated signal strength BlueTooth, etc.)) may be automatically selected to facilitate ease of use to the user of the client device). Alternatively or additionally, client device 100' may be operative to automatically select or prioritize one of at least one available payment sources to be targeted and identified in a payment request based on the payment sources supported by the merchant (e.g., a corporate-branded payment credential may be prioritized for use in a transaction with that corporation (e.g., a Disney-branded Visa card may be prioritized or selected for use in a transaction with a Disney merchant, where such a preference may be expressed by the merchant and made available to client device 100')).

Payment request data 666 may include any suitable information that may be provided by client device 100' to the target host device 100 for identifying one or more particular characteristics of the potential transaction to be financed. For example, like potential transaction data 660 of step 610, payment request data 666 of step 616 may include any suitable data related to the potential financial transaction to be funded, including, but not limited to, (i) specific merchant information, such as a unique merchant identifier of the merchant (i.e., "Merchant A") and/or identification of the particular merchant resource being used (e.g., the particular merchant application 113'), (ii) specific transaction information, such as identification of a specific currency to be used to pay for the transaction (e.g., yen, pounds, dollars, etc.) and/or identification of a specific amount of a currency to be paid for the transaction (i.e., "Price C") and/or identification of the particular product or service to be purchased or rented or otherwise paid for (i.e., "Product B") and/or identification of a default or initial shipping address to be used (i.e., "Shipping D"), (iii) information indicative of the one or more types of payment methods acceptable to the merchant for the transaction (e.g., a list of payment cards that may be used for the purchase (e.g., MasterCard but not Visa)) or selected by client device 100' (i.e., "HD1's PM X"), (iv) a unique merchant-based transaction identifier (e.g., any suitable data element, such as a 3 or 4 character alphanumeric string, that may be randomly or uniquely generated by merchant subsystem 200 for association with the transaction being conducted), (v) a unique client-based transaction identifier (e.g., any suitable data element, such as a 3 or 4 character alphanumeric string, that may be randomly or uniquely generated by client device 100' for association with the transaction being conducted), and/or (vi) a unique client-based payment request identifier (e.g., any suitable data element, such as a 3 or 4 character alphanumeric string, that may be randomly or uniquely generated by client device 100' for association with the payment request being made by payment request data 666). In some embodiments, payment request data 666 may be encrypted or otherwise formatted or handled by commercial entity subsystem 400 before communication to the target host device 100. Such payment request data 666 may be referred to herein as a PKRemotePaymentRequest and may include any suitable data, including, but not limited to, (1) the PKPaymentRequest of potential transaction data 660 step 610 (e.g., which may be wrapped inside the PKRemotePaymentRequest), (2) any suitable data identifying the selected target host device (e.g., host device identifier 119 of host device 100, as may be included in host availability response data 664 of step 614), which may be referred to herein as PKRemoteDevice, (3) any suitable data identifying a selected or default particular payment credential of the target host device (e.g., AID 155*aa* of secure element 145 of host device 100, as may be included in host availability response data 664 of step 614 and/or as may be automatically or user-selected at client device 100'), which may be referred to herein as a SelectedApplicationIdentifier, and/or (4) any suitable data identifying a unique identifier to be associated with the payment request (e.g., a unique value that can be used to identify the payment request across the client and host devices of the system and that may be generated by client device 100 or otherwise), which may be referred to herein as a RemotePaymentIdentifier.

In response to receiving payment request data 666 from client device 100' at step 616, a target host device 100 may be operative to provide any suitable information to a user of host device 100 for acting on the payment request. For example, as shown in FIG. 3D, a push notification screen 190*d* may be provided by a GUI of host device 100 that may be operative to indicate to a user of host device 100 that a client payment request has been received with an identifier 317 and may include an option 321 that may be selectable to hide the notification and/or an option 319 that may be selectable to view more details about the notification. For example, in response to user selection of view more details option 319 or in lieu of screen 190*d*, the GUI of host device 100 may proceed to a screen 190*e* of FIG. 3E that may enable a user of host device 100 to respond to the client payment request in one or more suitable ways. Screen 190*e* of FIG. 3E may prompt a user of host device 100 to interact with host device 100 in one or more ways to choose a specific credential native to host device 100, or non-native to device 100 but accessible to device 100 through a process similar to process 600, for making the purchase. As shown in FIG. 3E, in addition to identifiers 307*a*-307*d* that may identify to a user of host device 100 the same merchant, product, price, and shipping information for the potential transaction as identified to the user of client device 100' on screen 190*c* of FIG. 3C prior to and/or at step 616, screen 190*e* may include a credential selection prompt 323 that may enable a user to select one of potentially multiple credentials that may be provisioned on host device 100 (e.g., the credential of credential SSD 154*a*) for use in funding the potential transaction. Prompt 323 may only include credentials native to host device 100 that are associated with payment networks supported by the merchant (e.g., as may be determined by payment request data 666, as mentioned above). As shown, prompt 323 may include a first native payment credential option 325 associated with "Credential X" of host device 100 and a second native payment credential option 327 associated with "Credential Y" of host device 100, each of which may be acceptable for use by merchant subsystem 200 of the potential transaction (e.g., based on any suitable portion of payment request data 666), and/or where any suitable technique may be used to identify the credential selected by client device 100' if applicable (e.g., an "*" may be provided next to first native payment credential option 325 associated with "Credential X" if that "PM X" may have been selected by client device 100' (e.g., at screen 190*b* of FIG. 3B) and specifically identified in payment request data 666). As shown in FIG. 3F, the GUI of host device 100 may be configured to provide screen 190*f* in response to receiving host device user selection of a particular credential from credential selection prompt 323 of screen 190*e* of FIG. 3E (e.g., "Credential X"). Screen 190*f* of FIG. 3F may identify that selected or automatically identified default credential with credential identifier information 329 and may prompt a user of host device 100 to interact with host device 100 in one or more ways to authenticate the user and its intent to utilize the selected credential. This may include prompting the user (e.g., with an authentication prompt 331) to enter user authentication via personal identification number ("PIN") entry or via user interaction with a biometric sensor in order to access the secure element of host device 100 and, thus, the credential to be used for the purchase.

Different instances of payment request data 666 may be sent to different target host devices at step 616 (e.g., to a group of available host devices (e.g., from a child's client device to its father's host device and to its mother's host device) in order to increase the chances of a quick response). If an asleep host device is a target host device, then payment request data 666 for that host device may be queued up for sharing with that target host device when it comes online (e.g., by commercial entity subsystem 400 or by client device 100' itself), where such queuing may only be enabled for a certain period of time (e.g., 2 hours after generation of such payment request data 666, after which such payment request data may be deemed expired and may not be provided to its target host device). As mentioned, prompt 311 may include a notice to client device 100' that a particular host device is not online or a notification may be provided indicating that a particular host device is not responding to payment request data and may generate a request for a user of the client device to take steps to enable that host device. Commercial entity subsystem 400 may be operative to manage settings that may be operative to block certain discovery requests and/or certain payment requests from certain client devices from going to certain host devices, or a certain host device may be operative to set any suitable options to block such requests from certain client devices.

If a user of host device 100 is willing and able to select or confirm a particular payment credential for use in funding the potential transaction in response to payment request data 666 received at step 616, process 600 may proceed to step 625 where process 600 may include receiving intent and authentication by a user of host device 100 to utilize a specific credential for carrying out the potential transaction for a particular merchant, product, price, and shipping destination based on potential transaction data 666 (e.g., through user selection of authentication prompt 331 of FIG. 3F). Access SSD 154*b* may leverage applet 153*b* of host device 100 to determine whether such authentication has occurred before allowing other SSDs 154 (e.g., credential SSD 154*a*) to be used for enabling its credential information in a commerce credential data communication. As just one example of step 625, applet 153*b* of access SSD 154*b* may be configured to determine intent and local authentication of a user of host device 100 (e.g., via one or more input components 110, such as a biometric input component 110*i* of FIG. 3, as may be used by a user interacting with any application of device 100 (e.g., card management application 113*b* of host device 100)) and, in response to such a determination, may be configured to enable another particular SSD for conducting a payment transaction (e.g., with a credential of credential SSD 154*a*). In some embodiments, after such a determination, but before such enablement, a GUI of host device 100 may be configured to provide another screen (e.g., similar to screen 190*g* of FIG. 3G) that may prompt a user of host device 100 (e.g., with a prompt similar to prompt 333 of FIG. 3G) to interact with host device 100 in one or more ways to finally initiate payment using the selected and authenticated credential.

A user of host device 100 may provide intent and authentication at step 625 for use of a particular payment credential native to host device 100 for funding a potential transaction identified by payment request data 666 of step 616 (e.g., for "Merchant A" and "Product B" and "Price C" and "Shipping D" of screens 190*c* and 190*e*), whereby step 625 may occur immediately after step 616. However, alternatively, process 600 may enable a user of host device 100 to adjust one or more characteristics of the potential transaction before any intent and authentication is provided at step 625. For example, after receipt of payment request data 666 at step 616, host device 100 may be operative to adjust any suitable characteristic of the potential transaction, such as a shipping address for the transaction, a shipping method for the transaction, and/or a payment method for the transaction, either automatically or in response to any suitable user interaction with host device 100 (e.g., with screen 190*e*). Rather than proceeding from step 616 to step 625, process 600 may include step 618, whereby host device 100 may send host response data 668 back to client device 100' in response to payment request data 666. Such host response data 668 may include any suitable data indicative of any suitable potential transaction data that may be at least partially defined by host device 100. For example, through interaction with screen 190*e* of FIG. 3E, a user of host device 100 may not only choose "Credential X" of first native payment credential option 325 (e.g., the same or a different payment method as identified by payment request data 666) but may also choose to have the potential transaction ship "Product B" to a new "Shipping Address E" rather than to initial "Shipping Address D" as may have been identified by screen 190*c* of client device 100' and payment request data 666. Therefore, in response to the host device's update of the shipping address information or of any other suitable portion of the payment request data that may need to be processed by client device 100' and/or merchant subsystem 200 before process 600 may enable funding of the transaction, host device 100 may be operative to generate and send host response data 668 indicative of that updated shipping information to client device 100' at step 618 (e.g., via commercial entity subsystem 400 or otherwise, similarly to any other information communicated between host device 100 and client device 100' during process 600). Such host response data 668 may be substantially similar to payment request data 666 but may be indicative of whatever changes were identified by host device 100 (e.g., the change from "Shipping Address D" to "Shipping Address E"). Next, client device 100' may receive such host response data 668 at step 618 and communicate at least a portion of such host response data 668 to merchant subsystem 200 as updated transaction request data 670 at step 620, where updated transaction request data 670 may identify to merchant subsystem 200 any one or more desired updates to potential transaction data 660 (e.g., the change from "Shipping Address D" to "Shipping Address E" as identified by host device 100 or any change made locally by client device 100' after step 610 and/or after step 618 but prior to step 620 (e.g., a selection of particular payment method 311*a* at screen 190*b* by a user of client device 100' may generate updated transaction request data 670).

In response to receipt and processing of such updated transaction request data 670, merchant subsystem 200 may be operative to generate and transmit any suitable updated potential transaction data 672 to client device 100' at step 622, which may be substantially similar to potential transaction data 660 but may be indicative of any updates made by client device 100' and/or host device 100 (e.g., the change from "Shipping Address D" to "Shipping Address E") as well as any additional potential transaction information that may have been changed by merchant subsystem 200 as a result (e.g., the price may be changed from "Price C" of potential transaction data 660 to a new "Price Ca", which may be due to different shipping costs being associated with the change from "Shipping Address D" to "Shipping Address E"). As another example, in response to client device 100' choosing payment method option 311*b* after choosing payment method option 311*a* (e.g., at screen 190*c* prior to selecting request payment prompt 315) and sending appropriate updated transaction request data 670, merchant subsystem 200 may be operative to generate and transmit any suitable updated potential transaction data 672 to client device 100' at step 622, which may be substantially similar to potential transaction data 660 but may be indicative of that update made by client device 100' (e.g., such a change from "Payment Method X" of option 311*a* to "Payment Method Y" of option 311*b*) as well as any additional potential transaction information that may have been changed by merchant subsystem 200 as a result (e.g., the price may be changed from "Price C" of potential transaction data 660 to a new "Price C*", which may be due to a different payment method being selected (e.g., selection of a merchant-branded payment method may realize price savings over selection of a payment method not branded by the merchant)). Such updated potential transaction data 672 may be received and processed by client device 100' (e.g., by providing an updated screen 190*c*) and/or client device 100' may generate and send updated payment request data 674 to host device 100 at step 624. Each one of payment request data 666, host response data 668, and updated payment request data 674 may be associated with or may include the same unique merchant-based transaction identifier and/or the same unique client-based transaction identifier and/or the same unique client-based payment request identifier (e.g., RemotePaymentIdentifier) despite certain other information (e.g., shipping address information and/or payment method information and/or price information) varying between such data. Therefore, in response to any alteration to any suitable portion of potential transaction data 660 by client device 100' and/or in response to any alteration to any suitable portion of payment request data 666 by host device 100, such as an alteration to a payment method (e.g., from a first payment credential to a second payment credential) and/or to a shipping method (e.g., from a ground delivery method to a two-day air delivery method) and/or to a shipping address (e.g., from a first shipping address to a second shipping address) and/or to any other suitable data type, an updated transaction request may result in updated potential transaction data 672 that may result in updated payment request data 674 that may be sent to host device 100 at step 624, while maintaining a consistent transaction identifier. None, either, or both of client device 100' and host device 100 may be operative to change at least a portion of the transaction information (e.g., shipping method, shipping address, payment method, etc.), depending on the capabilities of each device's user interface. Any suitable request/response model may be employed to enable proper generation of update requests and responses based on any suitable changes by either device. For example, updated potential transaction data 672 and/or updated payment request data 674 may confirm an update and may provide the updated information, which may include payment summary items, shipping methods, payment status, and/or the like. For example, in response to update transaction request data 670, updated potential transaction data 672 may result that may include an updated total and shipping method, or a payment status of "invalid shipping address". Any suitable underlying communication protocol between devices (e.g., an identity services transport layer between client device 100' and host device 100) may be operative to provide completion handlers that may be operative to ensure that each device knows when the other device has received and processed an update (e.g., similarly to "read receipts" of iMessage™ or other suitable media messaging protocols). For example, a payment continuity service may be provided (e.g., by IDMS component 470 of commercial entity subsystem 400 or otherwise) for enabling the secure communication of payment requests and payment responses between client and host devices, where each of the client device and the host device may be capable of using the messaging transport of that service (e.g., the IDS transport, such as with IDS application 113*d* of host device 100). Any suitable mechanisms for communicating such data may be employed, such as Handoff™ by Apple Inc. (e.g., seamless sharing of application data between devices) or AirDrop™ by Apple Inc. (e.g., a secure ad hoc transfer protocol) or Continuity™ SMS/MMS by Apple Inc. or the like. Moreover, either device may be operative to cancel a request (e.g., client device 100' may cancel a transmitted request after step 612 and/or after step 624 and/or host device 100 may cancel a received request after step 612 and/or after step 624), which may be operative to update the presentation of data on each device (e.g., update screens 190*c* and 190*e*). A common RemotePaymentIdentifier of all request/responses for a particular transaction may be used by each device to confirm that each device is communicating with respect to the same particular transaction. For example, the most recently received payment request with a particular RemotePaymentIdentifier may be used by a host device over any previously received payment request with that same particular RemotePaymentIdentifier.

Next, once intent and authentication has been received at step 625 for a particular payment credential in response to receiving particular payment request data (e.g., payment request data 666 at step 616 or updated payment request data 674 at step 624), steps 626-628 of process 600 may include host device 100 generating, encrypting, and transmitting host transaction data 678 for use by commercial entity subsystem 400 (e.g., as described with respect to steps 508 and 510 of process 500). Once the credential of credential SSD 154*a* on secure element 145 of host device 100 has been selected, authenticated, and/or enabled for use in a financial transaction (e.g., at step 625), secure element 145 of host device 100 (e.g., processor module 142 of NFC component 120) may generate and encrypt certain credential data of that selected credential for use by commercial entity subsystem 400. For example, host payment credential data 675 of credential SSD 154*a* (e.g., payment card data of SSD 154*a* (e.g., as may be associated with selected "Credential X")), such as token data and crypto data (e.g., as described above with respect to step 508 of process 500)) may be generated and/or at least partially encrypted with credential key 155*a*' at step 626 as host payment credential data 676 to include at least token data and crypto data, such that such encrypted host payment credential data 676 may only be decrypted by an entity with access to that credential key 155*a*' (e.g., financial institution subsystem 350) for accessing host payment credential data 675. That host payment credential data 675 may include all data necessary to make a payment with that credential, such as, for example, a primary account number (e.g., an actual F-PAN or a virtual D-PAN), a card security code (e.g., a card verification code ("CVV")), expiration date, name associated with the credential, associated crypto data (e.g., a cryptogram generated using a shared secret between secure element 145 and financial institution subsystem 350 and any other suitable information), and/or the like. In some embodiments, once some or all of that host payment credential data 675 of credential SSD 154*a* has been encrypted with credential key 155*a*' at step 626 as encrypted host payment credential data 676, that encrypted host payment credential data 676, either alone or along with at least a first portion if not all of the applicable payment request data 666/674 (e.g., a portion or all of potential transaction data 660/672 that may include identification of the merchant, identification of the price amount, identification of the currency and/or shipping and/or product, and/or unique merchant-based transaction identifier and/or unique client-based transaction identifier and/or unique client-based payment request and/or the like) and/or any other suitable information (e.g., any information identifying host device 100 itself (e.g., host device identifier 119), any specific host device-based transaction identifier, and/or the like), may be encrypted by access information (e.g., by access key 155*a* of SSD 154*a*, access key 155*b* of access SSD 154*b*, ISD key 156*k*, and/or CRS 151*k* and/or signed by CASD 158*k*) at step 627 as encrypted host payment data 677. For example, secure element 145 of host device 100 (e.g., processor module 142 of NFC component 120) may use access information to encrypt not only an identification of the merchant from data 660/666/672/674 (e.g., identification of the merchant or its resource being used for the purchase, such as application 113'), but also the identification of the amount of the purchase and/or currency code from data 660/666/672/674, as well as the encrypted host payment credential data 675 of SSD 154*a* (e.g., encrypted host payment credential data 676) into encrypted host payment data 677. In some embodiments, host payment credential data 675 of credential SSD 154*a* (e.g., payment card data of SSD 154*a*, such as token data and crypto data (e.g., as described above with respect to step 508 of process 500)) may be generated but not encrypted with a credential key (e.g., at step 626 as data 676) before being encrypted with a commercial entity key or access key (e.g., at step 627 as data 677), and, instead, such host payment credential data 675 may be encrypted with a commercial entity key or access key (e.g., at step 627 as data 677), whereby in such embodiments, any future reference to data 676 may also be in reference to data 675 that is not encrypted with any credential key. In some embodiments, such a commercial entity key or access key may be a commercial entity public key associated with a scheme of commercial entity subsystem 400 and of which commercial entity subsystem 400 may have access to an associated commercial entity private key. Commercial entity subsystem 400 may provide such a commercial entity public key to financial institution subsystem 350 and financial institution subsystem 350 may then share that commercial entity public key with host device 100 (e.g., when provisioning credential data on host device 100 (e.g., at step 654 of process 600)).

Next, encrypted host payment data 677 along with any additional information, such as at least some of payment request data 666/674 (e.g., identification of the merchant, identification of the price amount, identification of the currency, a unique merchant-based transaction identifier, identification of the product/service, and/or the like) and/or any other suitable information (e.g., any information identifying host device 100 itself, a unique host device-based transaction identifier, and/or the like) may together be transmitted as host transaction data 678 from host device 100 to commercial entity subsystem 400 at step 628 (e.g., as described with respect to step 510 of process 500). Therefore, at least portions of host transaction data 678 (e.g., encrypted host payment data 677) may only be decrypted by an entity with access to that access information used for the encryption (e.g., access key 155*a*, access key 155*b*, ISD key 156*k*, CRS 151*k*, and/or CASD 158*k*) that generated encrypted host payment data 677 of host transaction data 678 (e.g., commercial entity subsystem 400). Such host transaction data 678 may be generated at steps 626-628 and then transmitted to commercial entity subsystem 400 at step 628 (e.g., from secure element 145 of NFC component 120, via communications component 106 and communication path 65). Steps 626, 627, and 628 may ensure that any credential data generated and transmitted from secure element 145 of host device 100 as part of host transaction data 678 has first been encrypted in such a way that it cannot be decrypted by another portion of host device 100 (e.g., by processor 102). That is, host payment credential data 675 of host transaction data 678 may be encrypted as encrypted host payment credential data 676 with a credential key 155a' that may not be exposed to or accessible by any portion of host device 100 outside of its secure element. Moreover, such encrypted host payment credential data 676 of host transaction data 678 may be encrypted as encrypted host payment data 677 with an access key (e.g., access key 155a, 155b, 156k, 151k, and/or 158k (e.g., referred to herein as "access information")) that may not be exposed to or accessible by any portion of host device 100 outside of its secure element.

Next, at step 630, process 600 may include commercial entity subsystem 400 receiving and decrypting at least a portion of host transaction data 678. For example, commercial entity subsystem 400 may receive host transaction data 678 and may then decrypt encrypted host payment data 677 of host transaction data 678 using access information (e.g., 155a, 155b, 156k, 151k, and/or 158k) as available at commercial entity subsystem 400. This may enable commercial entity subsystem 400 to determine an unencrypted identification of the merchant (e.g., from decrypted host payment data 677), while also maintaining host payment credential data 675 in an encrypted state (e.g., as encrypted host payment credential data 676), because commercial entity subsystem 400 may not have access to credential key 155a' with which such host payment credential data 675 may have been encrypted by secure element 145 of host device 100 at step 626 as encrypted host payment credential data 676. Additionally or alternatively, the merchant may be identified by the additional data that may have been included in host transaction data 678 along with encrypted host payment data 677. Host transaction data 678 may include information identifying host device 100 or at least its secure element, such that, when host transaction data 678 is received by commercial entity subsystem 400, commercial entity subsystem 400 may know which access information (e.g., which of access information 155a, 155b, 156k, 151k, and/or 158k) to use at step 630. For example, commercial entity subsystem 400 may have access to multiple access keys 155a/155b and/or multiple ISD keys 156k, each one of which may be particular to a specific host device 100 or to a specific secure element.

Next, at step 631, process 600 may include commercial entity subsystem 400 identifying a merchant key (e.g., merchant key 157') associated with the merchant that may have been identified by payment request data 666/674 and, thus, by host transaction data 678, and then re-encrypting at least a portion of host transaction data 678 using that merchant key. That is, after decrypting at least a portion of host transaction data 678 using suitable access information at step 630 (e.g., after decrypting encrypted host payment data 677 to realize encrypted host payment credential data 676 and any other information that may have been encrypted in encrypted host payment data 677), commercial entity subsystem 400 may then, at step 631, re-encrypt at least a portion of host transaction data 678 (e.g., the token data and/or the crypto data of encrypted host payment credential data 676) with an appropriate merchant key that may be associated with merchant information identified in host transaction data 678. For example, such a merchant key (e.g., merchant key 157') may be determined by comparing commercial entity merchant information identified in host transaction data 678 with data in table 430 of FIG. 1B. With this determined appropriate merchant key, commercial entity subsystem 400 may re-encrypt with that merchant key (e.g., merchant key 157') at least a portion of host transaction data 678 (e.g., the token data and/or the crypto data of encrypted host payment credential data 676) as encrypted merchant credential data 681. For example, encrypted merchant credential data 681 may include at least encrypted host payment credential data 676 from host transaction data 678 as well as any suitable transaction data, such as the purchase amount data or other suitable transaction data from or based on host transaction data 678 and/or payment request data 666/674 (e.g., data that may have been initially identified by potential transaction data 660/672). The merchant identification information from host transaction data 678 may not need to be included in encrypted merchant credential data 681 as that merchant identification may have already been used to determine the merchant key with which encrypted merchant credential data 681 may be encrypted at step 631. Encrypted merchant credential data 681 may be signed by commercial entity subsystem 400 in such a way that, when received by merchant subsystem 200, may establish commercial entity subsystem 400 as the creator of such encrypted merchant credential data 681 and/or may enable merchant subsystem 200 to ensure that such encrypted merchant credential data 681 has not been modified after being signed. Such encrypted merchant credential data 681 may be generated at step 631 and then transmitted to host device 100 along with any other suitable data as secured host transaction data 682 at step 632 (e.g., from server 410 of commercial entity subsystem 400 to communications component 106 of host device 100 via path 65 of FIG. 1B).

Steps 631 and 632 may be operative to ensure that credential data transmitted from the commercial entity subsystem 400 as part of secured host transaction data 682 of FIG. 1B (e.g., token data and/or crypto data of encrypted merchant credential data 681) may be encrypted in such a way that it cannot be decrypted by a portion of host device 100 other than secure element 145. That is, credential data of secured host transaction data 682 (e.g., token data and/or crypto data of encrypted merchant credential data 681) may be encrypted with a merchant key (e.g., merchant key 157') that may not be exposed to or otherwise accessible by any portion of host device 100, including, in some embodiments, secure element 145. Moreover, credential data of secured host transaction data 682 (e.g., token data and/or crypto data of encrypted merchant credential data 681) may be encrypted with a credential key 155a' that may not be exposed to or otherwise accessible by any portion of host device 100 outside of secure element 145.

Secured host transaction data 682 may then be forwarded on to client device 100' (e.g., as described with respect to step 516 of process 500) as secured host transaction data 684 (e.g., via communications path 99 and/or via commercial entity subsystem 400 using any suitable protocol(s)) at step 634. Then client device 100' may be operative to forward on at least encrypted merchant credential data 681 of secured host transaction data 684 to merchant subsystem 200 (e.g., as described with respect to step 518 of process 500) as client transaction data 686 (e.g., via communications path 15 or as a contactless proximity-based communication 5) at step 636. In some embodiments, between step 634 and step 636, a GUI of client device 100' may be configured to provide another screen 190g of FIG. 3G that may prompt a user of client device 100' with a prompt 333 to interact with client device 100' in one or more ways to review and reject and/or finally initiate payment using the selected and authenticated credential from host device 100 (e.g., as encrypted host payment credential data 676 encrypted within encrypted merchant credential data 681 of secured host transaction data 682/684). Alternatively, step 636 may occur transparently to a user of client device 100'. Alternatively, merchant credential data 681 may be communicated to merchant subsystem 200 from commercial entity subsystem 400 without being communicated via host device 100 and/or via client device 100'. One, some, or all portions of potential transaction data 660/672 may be carried through client device 100' and/or host device 100 and/or commercial entity subsystem 400 from payment request data 666/674 to host transaction data 678 and/or to secured host transaction data 682 and/or to secured host transaction data 684 and/or to client transaction data 686, such that certain identifiers of the potential transaction may be identified by each of the entities during process 600, including, but not limited to, (i) specific merchant information, such as a unique merchant identifier of the merchant (i.e., "Merchant A") and/or identification of the particular merchant resource being used (e.g., the particular merchant application 113'), (ii) specific transaction information, such as identification of a specific currency to be used to pay for the transaction (e.g., yen, pounds, dollars, etc.) and/or identification of a specific amount of a currency to be paid for the transaction (i.e., "Price C" and/or "Price C*") and/or identification of the particular product or service to be purchased or rented or otherwise paid for (i.e., "Product B") and/or identification of a default or initial shipping address to be used (i.e., "Shipping D" and/or "Shipping E"), (iii) information indicative of the one or more types of payment methods acceptable to the merchant for the transaction (e.g., a list of payment cards that may be used for the purchase (e.g., MasterCard but not Visa)) or selected by client device 100' (i.e., "HD1's PM X"), (iv) a unique merchant-based transaction identifier (e.g., any suitable data element, such as a 3 or 4 character alphanumeric string, that may be randomly or uniquely generated by merchant subsystem 200 for association with the transaction being conducted), (v) a unique client-based transaction identifier (e.g., any suitable data element, such as a 3 or 4 character alphanumeric string, that may be randomly or uniquely generated by client device 100' for association with the transaction being conducted), (vi) a unique client-based payment request identifier (e.g., any suitable data element, such as a 3 or 4 character alphanumeric string, that may be randomly or uniquely generated by client device 100' for association with the payment request being made by payment request data 666/674), and/or (vii) a unique host-based payment request identifier (e.g., any suitable data element, such as a 3 or 4 character alphanumeric string, that may be randomly or uniquely generated by host device 100 for association with the payment request being funded by host device 100). Such carried data may include at least a portion of a PKRemotePaymentRequest and may include any suitable data, including, but not limited to, (1) the PKPaymentRequest of step 610 and/or step 622 (e.g., which may be wrapped inside the PKRemotePaymentRequest), (2) any suitable data identifying the selected target host device (e.g., host device identifier 119 of host device 100, as may be included in a discovery response of step 614), which may be referred to herein as PKRemoteDevice, (3) any suitable data identifying a selected or default particular payment credential of the target host device (e.g., AID 155aa of secure element 145 of host device 100, as may be included in a discovery response of step 614 and as may be automatically or user-selected at client device 100'), which may be referred to herein as a SelectedApplicationIdentifier, and/or (4) any suitable data identifying a unique identifier to be associated with the payment request (e.g., a unique value that can be used to identify the payment request across the client and host devices of the system and that may be generated by client device 100 or otherwise), which may be referred to herein as a RemotePaymentIdentifier. In other embodiments, host device 100 may communicate secured host transaction data 684 directly to merchant subsystem 200 at step 634 rather than via client device 100'. In yet other embodiments, commercial entity subsystem 400 may communicate secured host transaction data 682 directly to client device 100' at step 632 rather than via host device 100. In yet other embodiments, commercial entity subsystem 400 may communicate secured host transaction data 632 directly to merchant subsystem 200 at step 621 rather than via host device 100 and/or via client device 100'.

Once merchant credential data 681 including secured host payment credential data 675/676 is received by merchant subsystem 200 (e.g., as client transaction data 686 at step 636), process 600 may also include step 638 at which merchant subsystem 200 may be configured to generate and transmit payment data 688 to acquiring bank subsystem 300 (e.g., via communication path 25 between merchant subsystem 200 and acquiring bank subsystem 300 of FIG. 1B), where data 688 may include payment information and an authorization request that may be indicative of the secured host payment credential data of host device 100 and the merchant's purchase price for the product or service (e.g., as may be included in or otherwise associated with client transaction data 686 or as may be otherwise associated with the transaction as known by merchant subsystem 200 (e.g., by potential transaction data 660/672 (e.g., based on a unique transaction identifier))). For example, at step 638, merchant subsystem 200 may leverage its known merchant key 157' to at least partially decrypt merchant credential data 681 of client transaction data 686 such that payment data 688 may include the secured host payment credential data of credential SSD 154a encrypted with its credential key 155a' (e.g., encrypted payment credential data 676) but not with a key that is not available to financial institution subsystem 350.

If payment data 688 is transmitted to acquiring bank subsystem 300 at step 638, then, at step 640, acquiring bank subsystem 300 may forward authorization request information from payment data 688 to financial institution subsystem 350 as authorization request data 690 (e.g., via communication path 35 between acquiring bank subsystem 300 and financial institution subsystem 350 of FIG. 1B). Next, at step 642, when issuing bank subsystem 370 of financial institution subsystem 350 receives an authorization request (e.g., directly from acquiring bank subsystem 300 as data 690 at step 640, or indirectly via payment network subsystem 360 as data 405), the payment information (e.g., host payment credential data 675 of host device 100 as encrypted by credential key 155a' by secure element 145 of host device 100 (e.g., encrypted host payment credential data 676)) and the purchase amount, each of which may be included in the authorization request data 690, as well as in data 684, 686, and/or 688, may be decrypted (e.g., using credential key 155a' at financial institution subsystem 350) and analyzed to determine if the account associated with the commerce credential has enough credit to cover the purchase amount. If sufficient funds are not present, issuing bank subsystem 370 may decline the requested transaction by transmitting a negative authorization response to acquiring bank subsystem 300. However, if sufficient funds are present, issuing bank subsystem 370 may approve the requested transaction by transmitting a positive authorization response to acquiring bank subsystem 300 and the financial transaction may be completed. Either type of authorization response may be provided by user financial subsystem 350 to acquiring bank subsystem 300 as authorization response transaction status data 692 at step 642 of process 600 (e.g., directly from issuing bank subsystem 370 to acquiring bank subsystem 300 via communication path 35, or from payment network subsystem 360 to acquiring bank subsystem 300 based on authorization response data 415 that may be provided to payment network subsystem 360 from issuing bank subsystem 370 via communication path 45 of FIG. 1B). Next, in response to receiving authorization response transaction status data 692 at step 642, process 600 may also include acquiring bank subsystem 300 or any other suitable subsystem sharing such authorization response transaction status data with merchant subsystem 200 as authorization response transaction status data 694 at step 644, which may then be shared with client device 100' (e.g., using the merchant resource or otherwise) as confirmed transaction status data 696 at step 646 (e.g., as described with respect to step 522 of process 500) and/or with host device 100 as confirmed transaction status data 698 at step 648 (e.g., as described with respect to step 524 of process 500). Such confirmed transaction status data may be configured to provide any suitable confirmation data to device 100 and/or 100', such as confirmation data 335 of screen 190*h* of FIG. 3H. If the transaction is successful, the confirmed transaction status data may be operative to close the transaction (e.g., the transaction identified by the unique RemotePaymentIdentifier of the payment request data) at client device 100' at step 646 and/or at host device 100 at step 648. Additionally or alternatively, if the transaction is not successful, the confirmed transaction status data may or may not be operative to close the transaction (e.g., close the transaction if no valid funds available or host device identified as fraudulent, but keep open and allow updates if a non-valid shipping address is determined). Any non-transaction-terminating transaction status data may allow the payment process to continue until the process is cancelled by an application, the process is cancelled by a user, or the process is completed.

Therefore, merchant subsystem 200 may be configured to process client transaction data 686 or any other carrier of merchant credential data 681 in any suitable way. For example, to obtain host payment credential data from merchant credential data 681, merchant subsystem 200 may verify that a signature property of the received merchant credential data 681 is valid and that commercial entity subsystem 400 is the signer of that signature. Merchant subsystem 200 may use any suitable technique to determine which merchant key (e.g., which merchant public key 157') may have been used by commercial entity subsystem 400 to construct merchant credential data 681. Then, merchant subsystem 200 may retrieve the corresponding merchant private key (e.g., merchant private key 157' at merchant subsystem 200) and use that retrieved key to de-encapsulate and/or decrypt encrypted merchant credential data 681 to recover encrypted host payment credential data 676. Then such data 676 may be provided to the appropriate payment network 360, which may leverage the appropriate credential key 155*a*' of financial institution subsystem 350 to de-encapsulate and/or decrypt encrypted host payment credential data 676 to recover host payment credential data 675 (e.g., to recover the token data and/or the crypto data of host payment credential data 675 for validating host payment credential data 675 (e.g., to independently generate the crypto data based on the token data of received host payment credential data 675, compare that generated crypto data to the crypto data of the received host payment credential data 675, and either validate or reject the transaction based on the comparison)).

It is understood that the steps shown in process 600 of FIG. 6 are only illustrative and that existing steps may be modified or omitted, additional steps may be added, and the order of certain steps may be altered. In some embodiments, a potential transaction (e.g., as identified by potential transaction data 660 or potential transaction data 672) may be at least partially funded by two different payment credentials. For example, client device 100' may be operative to generate and transmit not only a first payment request (e.g., first payment request data 666) to a first host device for initiating generation of first host transaction data (e.g., first host transaction data 684) that may be operative to fund a first portion of the transaction but also a second payment request (e.g., second payment request data 666) to a second host device for initiating generation of second host transaction data (e.g., second host transaction data 684) that may be operative to fund a second portion of the transaction, where each instance of host transaction data may be shared by client device 100' for funding the transaction. Alternatively, a second portion of the transaction may be funded by credential data native to client device 100'. Although not shown, secured host transaction data may be communicated from commercial entity subsystem 400 directly to client device 100' (e.g., via communications path 95 and not via host device 100) or directly to merchant subsystem 200 (e.g., via communications path 85 and not via host device 100 and/or not via client device 100') or directly to financial institution subsystem 350 (e.g., via communications path 55 and not via host device 100 and/or not via client device 100' and/or not via merchant subsystem 200). Additionally or alternatively, although not shown, secured host transaction data may be communicated from host device 100 directly to merchant subsystem 200 (e.g., not via client device 100') or directly to financial institution subsystem 350 (e.g., via communications path 75 and not via client device 100' and/or not via merchant subsystem 200). Additionally or alternatively, although not shown, client transaction data may be communicated from client device 100' directly to financial institution subsystem 350 (e.g., not via merchant subsystem 200). As mentioned, client device 100' may be configured to determine that a particular product ought to be purchased and to interact with one or more merchants in order to obtain associated potential transaction data from at least one particular merchant for that particular product (e.g., client device 100' may be a home appliance that may be configured to determine that an appliance product must be purchased (e.g., detect that more laundry detergent is needed by a washing machine or detect a calendar event pre-set by a user to buy more detergent on a particular date) and may automatically identify a particular merchant offering the best deal for that product and may automatically interact with that merchant to obtain potential transaction data for purchasing that product from that merchant), all automatically and without any active interaction by a user of client device 100'. After which, client device 100' may be operative to automatically generate and push a payment request (e.g., payment request data 666) to one or more particular target host devices. For example, such a client device 100' may be an automated device that may be paired to one or more host devices 100 in an ecosystem (e.g., using a home automation platform, such as HomeKit™ by Apple Inc.) and such a payment request may be at least partially pre-populated or otherwise populated according to any suitable pre-defined settings (e.g., request payment for new laundry detergent from host device X and request payment for new drier sheets from host device Y, or request payment for any purchase over $G from host device X and under $G from host device Y, etc.).

One, some, or each data communication between host device 100 and client device 100' of process 600 (e.g., communication of one, some, or each of data 662, 664, 666, 668, 674, 684, and/or 698) may be made over any suitable communications path(s) using any suitable communications protocol(s), such as directly in a peer-to-peer arrangement or via commercial entity subsystem 400 or any other suitable entity, using any suitable transport mechanism that may be encrypted in any suitable fashion or not at all. Such data communication may occur via any suitable online messaging, instant messaging, e-mail messaging, text message, any suitable proximity-based messaging, NFC, BlueTooth™, and/or the like and may be enabled using any suitable device addressing schemes, such as telephone numbers, e-mail addresses, unique device identifiers, location-based beacons, and the like. Each host device and each client device may be any suitable device with any suitable UI and I/O capabilities for a user, such as a laptop, cellular telephone, home appliance, merchant accessory device (e.g., a device provided at a gas pump by a gasoline merchant), user accessory (e.g., wearable device, such as a smart watch), and the like. By allowing any host device with a native payment credential to receive and respond to a payment request (e.g., over the public internet or in any other suitable fashion) from any other suitable device (e.g., a client device with or without its own native payment credentials) that may or may not itself have a native payment credential, system 1 and process 600 may enable many secure and effective use cases and user experiences.

For example, a user is shopping online using an online merchant resource of merchant subsystem 200 (e.g., application 113') on client device 100' (e.g., a laptop computer that may not have a secure element or any native payment credentials) and interacts with the online resource to identify a particular product to purchase (e.g., "Product B"). In response to identification of that product (e.g., in response to the user selecting a "Buy with Secure Credential Payment" (e.g., Apple Pay™ by Apple Inc.), the online resource may be operative to present a payment sheet or any suitable UI on client device 100' that may enable the user to enter a particular shipping address or other variable data (e.g., as shown by screen 190a and as may be updated by the user of client device 100' through one or more iterations of steps 620 and 622 that may update other information (e.g., in response to the user of client device 100' changing a shipping address of information 307d, the price of information 307c may be updated)). At some point, the user of client device 100' may select a "Secure Pay" option 309 of screen 190a, which may result in a discovery process (e.g., steps 662 and 664) that may automatically identify (e.g., without any further interaction by the user of client device 100') that client device 100' has no native payment credentials suitable for funding the purchase of the payment sheet of screen 190a (e.g., based on acceptable payment options indicated by potential transaction data 660) and that "HD1's PM X" (i.e., Payment Method X of Host Device 1) is the only available or preferred non-native payment credential suitable for use (e.g., preference may be automatically determined based on the proximity of each available host device to the client device or any other suitable characteristics that may be accessible to client device 100' via the discovery process). After such identification, client device 100' may be operative to automatically present screen 190c of FIG. 3C to the user of client device 100' for enabling the user to select option 315 of FIG. 3C for sending an appropriate payment request to that host device or process 600 may automatically make that selection on the user's behalf (e.g., by automatically sending appropriate payment request data 666/674 to the available target host device 1 (i.e., host device 100) in response to identification of the discover process), which may result in screen 190d of FIG. 3D or screen 190e of FIG. 3E automatically being presented by that host device 100 (e.g., presenting a pay sheet on host device 100 that may be similar to the pay sheet presented on client device 100'). Host device 100 may be a mobile telephone or any other device that may include a secure element with at least one native payment credential suitable for funding the transaction initiated by client device 100'. The user of client device 100' may be proximate to not only client device 100' but also to host device 100 and may be able to interact with a GUI of one of screens 190d-190f of host device 100 for authorizing the use of a particular payment credential native to host device 100 for funding the transaction initiated or otherwise being conducted by client device 100' and merchant subsystem 200 (e.g., by selecting authenticate option 331 of screen 190f of FIG. 3F). In response to such authentication on host device 100, host payment credential data for a credential native to host device 100 may be provided to financial institution subsystem 350 for attempting to fund the transaction (e.g., at steps 625-640 of process 600) and a confirmation status of the transaction may then be shared with the user at client device 100' and/or at host device 100 (e.g., by screen 190h of FIG. 3H). In an alternative embodiment, multiple host devices may be identified as available and a payment request may be sent from client device 100' to each one of the available host devices and the first host device to respond with host payment credential data may fund the transaction or each host device may respond with host payment credential data that may fund a particular portion of the transaction.

As another example, a user's home appliance client device 100' (e.g., a washing machine) that may be communicatively coupled to a communication network using a home automation platform (e.g., HomeKit™ by Apple Inc.) may be operative to determine that it is almost out of a resource needed to operate properly (e.g., washing machine client device 100' may be operative to determine automatically that its reserve of laundry detergent is at 20% capacity). In response to such a determination, home appliance client device 100' may be operative to automatically identify an opportunity to purchase more of that resource (e.g., home appliance client device 100' may be operative to interact with one or more merchant subsystems via one or more online resources to identify the needed laundry detergent for sale at the best price or other suitable metric). Potential transaction data 660/672 for that purchase opportunity may thereby be obtained by client device 100' and client device 100' may be operative to automatically discover at least one host device that may be available to fund that transaction (e.g., via a discovery process of steps 662/664) and may automatically share appropriate payment request data 666/674 with each of the at least one discovered host devices, such as a host device of at least one user associated with the home automation platform ecosystem containing home appliance client device 100'. Host device 100 may receive such payment request data and may present a user of host device 100 with the ability to select and authenticate a payment credential native to that host device for use in funding the transaction identified by home appliance client device 100' (e.g., as identified without any active user interaction at client device 100'). This may enable a user and a host device 100 at any suitable location with respect to home appliance client device 100' to receive a request a unique payment request from home appliance client device 100' and to provide home appliance client device 100' with host transaction data for a payment credential native to the host device for use in funding the transaction associated with the unique payment request (e.g., host device 100 and its user may be positioned on the other side of the country from home appliance client device 100' yet may still be operative to receive a payment request from home appliance client device 100' and respond with host payment credential data (e.g., via any suitable internet communications path(s) or any other suitable communication path(s))). Alternatively, rather than communicating over large distances via the internet, home appliance client device 100' may present a QR code on a display of client device 100' that may be scanned by a sensor of a proximate host device 100 and processed to identify particular payment request data or client device 100' and host device 100 may communicate via BlueTooth™ or any other suitable local communication protocol.

In some embodiments, at least a portion of process 500 and/or 600 and/or any other process of this disclosure may be operative to transfer money between a user of host device 100 and a user of client device 100' (e.g., client device 100' may request funds from host device 100 independent of any transaction between client device 100' and a merchant subsystem). In some embodiments, this may be enabled by an acquiring bank and/or one or more entities of financial institution subsystem 350 to enable host transaction data to facilitate the transfer of funds between an account associated with a credential on a host device and an account associated with a user of a client device, without the need for any merchant subsystem. Alternatively, a stored value card on a host device and/or a stored value card on a client device may be leveraged to transfer funds between a host and a client (e.g., to transfer funds from a stored value credential native to a host device (e.g., a credential on secure element 145 of host device 100) to a stored value credential native to a client device (e.g., a credential on a secure element of client device 100')). For example, client device 100' may communicate a payment request to host device 100 that may be operative to request that host device 100 deduct an amount of currency from a stored value credential on host device 100 and send any appropriate APDU commands to client device 100' that may be operative to add the appropriate amount of currency to a stored value credential of client device 100' (e.g., such that host transaction data shared with client device 100' may include such APDU commands and/or may include actual crypto-currency).

When client device 100' may be communicating with merchant subsystem 200 via a native application on client device 100' that may be specific to the merchant, then merchant application 113c may be provided by such an application. However, when client device 100' may be communicating with merchant subsystem 200 via an internet browser not specific to a merchant but that may be pointed to a website managed by a merchant (e.g., on a server under the control of the merchant), then merchant application 113c may be a layout engine software component (e.g., WebKit) that may forward communications on to a website of the merchant (e.g., via communications component 106). For example, such an application 113c of client device 100' may be a conduit for any host transaction data to be provided to merchant subsystem 200. Alternatively, such host transaction data may be communicated to merchant subsystem 200 not via client device 100' but instead directly from host device 100 or commercial entity subsystem 400 (e.g., using a merchant identifier or address provided by the merchant in potential transaction data and the client device payment request data).

Figure 7:
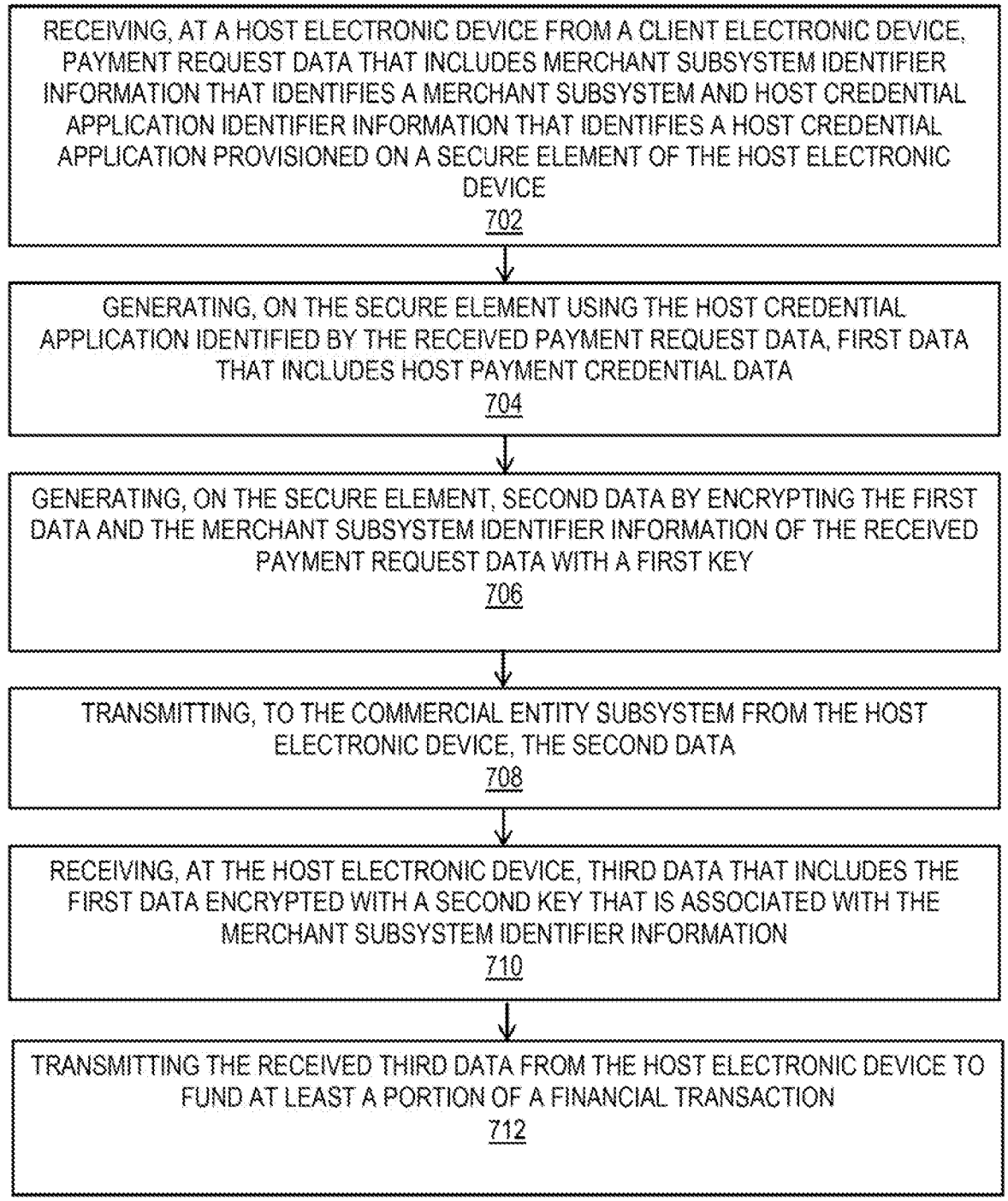

Description of FIG. 7

FIG. 7 is a flowchart of an illustrative process 700 for conducting a financial transaction with a merchant subsystem using a commercial entity subsystem, a client electronic device, and a host electronic device that includes a secure element and a host credential application provisioned on the secure element. At step 702 of process 700, the host electronic device may receive from the client electronic device payment request data that includes merchant subsystem identifier information that identifies the merchant subsystem and host credential application identifier information that identifies the host credential application. For example, host electronic device 100 may receive payment request data 662 that may include an identifier of merchant subsystem 200 and an identifier of credential payment applet 153a of host electronic device 100. At step 704 of process 700, the host electronic device may generate, on the secure element using the host credential application identified by the received payment request data, first data that includes host payment credential data. For example, credential payment applet 153a identified by payment request data 666 may generate host payment credential data 675. At step 706 of process 700, the host electronic device may generate, on the secure element of the host electronic device, second data by encrypting the first data and the merchant subsystem identifier information of the received payment request data with a first key. For example, host electronic device 100 may encrypt host payment credential data 675 and payment request data including an identifier of merchant subsystem 200 with an access key as host payment data 677. At step 708 of process 700, the host electronic device may transmit, from the host electronic device to the commercial entity subsystem, the second data. For example, host electronic device 100 may transmit host payment data 678 to commercial entity subsystem 400. At step 710 of process 700, the host electronic device may receive third data that includes the first data encrypted with a second key that is associated with the merchant subsystem identifier information. For example, host electronic device 100 may receive secured host transaction 682 that may include host payment credential data 675/676 encrypted with a merchant key associated with merchant subsystem 200. At step 712 of process 700, the host electronic device may transmit the received third data to fund at least a portion of the financial transaction. For example, host electronic device 100 may transmit secured host transaction data 684 to fund at least a portion of a financial transaction (e.g., for merchant subsystem 200).

It is understood that the steps shown in process 700 of FIG. 7 are only illustrative and that existing steps may be modified or omitted, additional steps may be added, and the order of certain steps may be altered.

Figure 8:
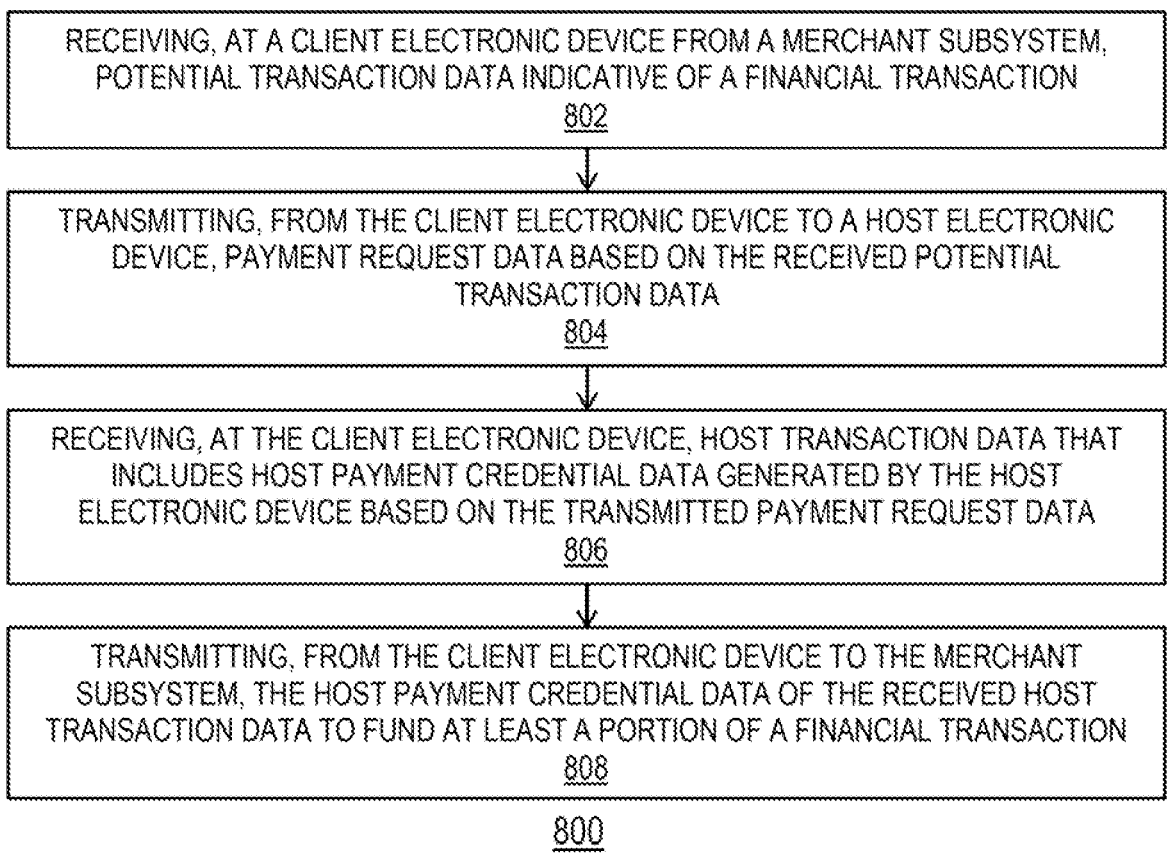

Description of FIG. 8

FIG. 8 is a flowchart of an illustrative process 800 for conducting a financial transaction with a merchant subsystem using a client electronic device and a host electronic device. At step 802 of process 800, the client electronic device may receive, from the merchant subsystem, potential transaction data indicative of the financial transaction. For example, client electronic device 100' may receive potential transaction data 660 indicative of a financial transaction from merchant subsystem 200. At step 804 of process 800, the client electronic device may transmit, from the client electronic device to the host electronic device, payment request data based on the received potential transaction data. For example, client electronic device 100' may transmit payment request data 666/674 to host electronic device 100 based on potential transaction data 660/672. At step 806 of process 800, the client electronic device may receive, at the client electronic device, host transaction data that includes host payment credential data generated by the host electronic device based on the transmitted payment request data. For example, secured host transaction data 684 including host payment credential data 675 generated by host electronic device 100 may be received by client electronic device 100'. At step 808 of process 800, the client electronic device may transmit, from the client electronic device to the merchant subsystem, the host payment credential data of the received host transaction data to fund at least a portion of the financial transaction. For example, client electronic device 100' may transmit client transaction data 686 including host payment credential data 675 to merchant subsystem 200 for funding at least a portion of a financial transaction (e.g., for merchant subsystem 200).

It is understood that the steps shown in process 800 of FIG. 8 are only illustrative and that existing steps may be modified or omitted, additional steps may be added, and the order of certain steps may be altered.

Figure 9:
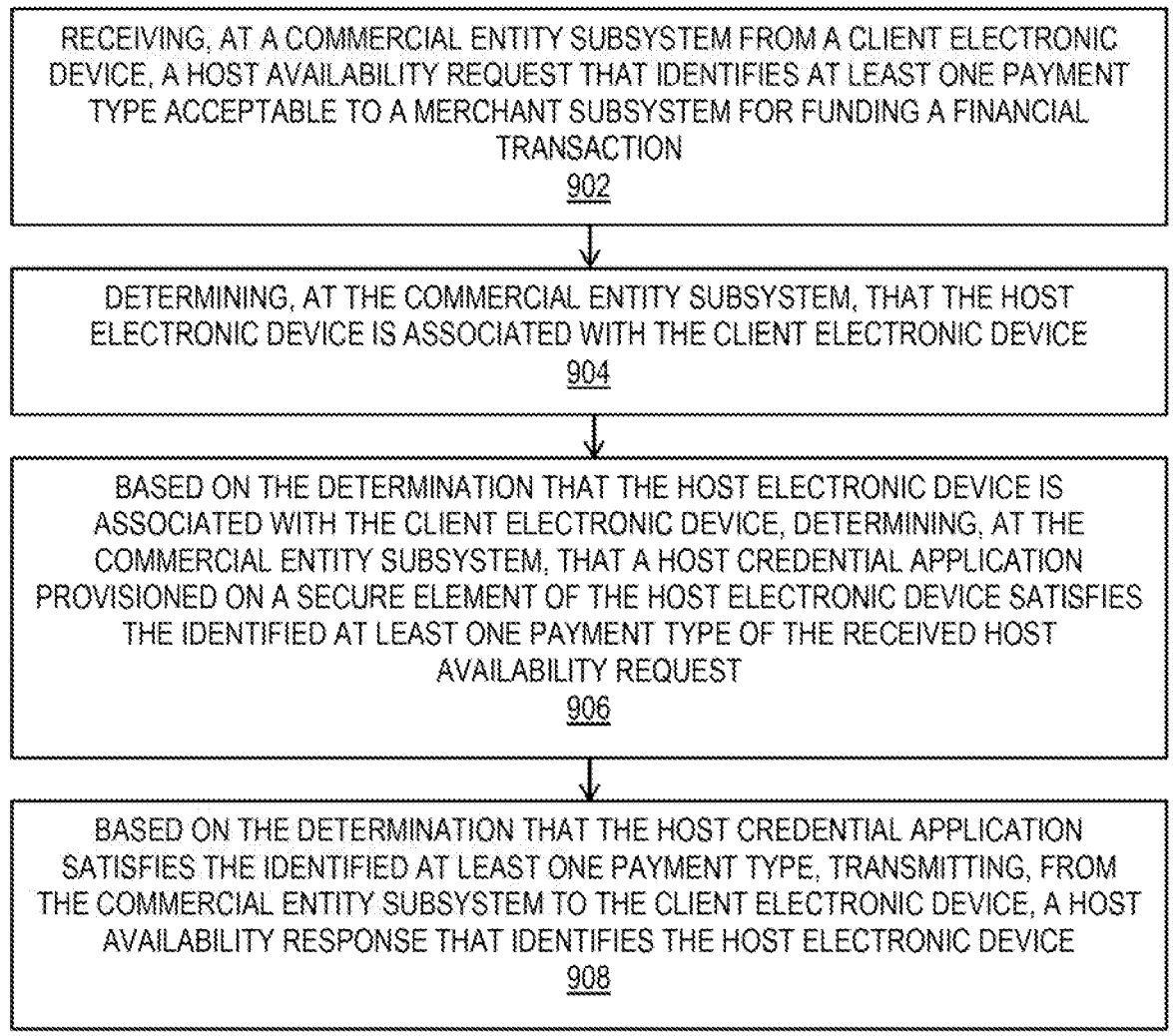

Description of FIG. 9

FIG. 9 is a flowchart of an illustrative process 900 for conducting a financial transaction with a merchant subsystem using a commercial entity subsystem, a client electronic device, and a host electronic device that includes a secure element and a host credential application provisioned on the secure element. At step 902 of process 900, the commercial entity subsystem may receive from the client electronic device, a host availability request that identifies at least one payment type acceptable to the merchant subsystem for funding the financial transaction. For example, commercial entity subsystem 400 may receive host availability request data 662 from client device 100' that identifies at least one payment type acceptable to merchant subsystem 200 for funding a financial transaction (e.g., based on potential transaction data 660). At step 904 of process 900, the commercial entity subsystem may determine, at the commercial entity subsystem, that the host electronic device is associated with the client electronic device. For example, commercial entity subsystem 400 may be operative to determine that host electronic device 100 is associated with client electronic device 100' (e.g., that both devices are associated with the same particular user account of commercial entity subsystem). At step 906 of process 900, the commercial entity subsystem may determine, based on the determination that the host electronic device is associated with the client electronic device, that the host credential application provisioned on the secure element of the host electronic device satisfies the identified at least one payment type of the received host availability request. For example, commercial entity subsystem 400 may be operative to determine that payment credential applet 153*a* may be associated with a payment method (e.g., a Visa credit card) acceptable to merchant subsystem 200. At step 908 of process 900, the commercial entity subsystem may, based on the determination that the host credential application satisfies the identified at least one payment type, transmit, from the commercial entity subsystem to the client electronic device, a host availability response that identifies the host electronic device. For example, commercial entity subsystem 400 may be operative to transmit host availability response data 664 to client electronic device 100' that may identify host electronic device 100 (e.g., as an available non-native payment source).

It is understood that the steps shown in process 900 of FIG. 9 are only illustrative and that existing steps may be modified or omitted, additional steps may be added, and the order of certain steps may be altered.

Description of FIG. 10

FIG. 10 is a flowchart of an illustrative process 1000 for conducting a transaction with a service provider subsystem using a client electronic device and a host electronic device. At step 1002 of process 1000, the client electronic device may communicate with the service provider subsystem to define at least a portion of a transaction for purchasing access to a product of the service provider subsystem. For example, client electronic device 100' may receive potential transaction data 660 indicative of a financial transaction from merchant subsystem 200. At step 1004 of process 1000, the client electronic device may involve the host electronic device to generate a transaction credential for funding the transaction. For example, client electronic device 100' may transmit payment request data 666/674 to host electronic device 100 based on potential transaction data 660/672.

It is understood that the steps shown in process 1000 of FIG. 10 are only illustrative and that existing steps may be modified or omitted, additional steps may be added, and the order of certain steps may be altered.

Further Description of FIG. 1, FIG. 1A, FIG. 1B. FIG. 2, FIG. 2A, and FIG. 3

When a credential of a secure element of host device 100 is appropriately enabled (e.g., commerce credential data associated with an enabled applet 153*a* of credential SSD 154*a* of NFC component 120) so as to be provided as host payment credential data of host transaction data (e.g., as a contactless proximity-based communication to merchant terminal 220 and/or as an online-based communication to merchant server 210), acquiring bank subsystem 300 may utilize such host payment credential data for completing a financial transaction with financial institution subsystem 350. For example, after a user of client device 100' has chosen a product for purchase and a user of host device 100 has appropriately enabled a specific credential of device 100 to be used for payment, merchant subsystem 200 may receive host payment credential data indicative of payment credential data for the specific credential. Merchant server 210 and/or merchant terminal 220 may be provided by any suitable merchant or merchant agent of merchant subsystem 200 that may provide a product or service to a user of an end-user electronic device in response to device 100 providing host payment credential data (e.g., via client device 100'). Based on such received host payment credential data (e.g., as data 686), merchant subsystem 200 may be configured to generate and transmit data 688 to acquiring bank subsystem 300 (e.g., via communications path 25 between merchant subsystem 200 and acquiring bank subsystem 300), where data 688 may include host payment credential data and an authorization request that may be indicative of the host device payment credential and the merchant's purchase price for the product or service. Also known as a payment processor or acquirer, acquiring bank subsystem 300 may be a banking partner of the merchant associated with merchant subsystem 200, and acquiring bank subsystem 300 may be configured to work with financial institution subsystem 350 to approve and settle credential transactions attempted to be funded by host device 100 with host payment credential data. Acquiring bank subsystem 300 may then forward the authorization request from payment data 688 to financial institution subsystem 350 as authorization data 690 (e.g., via communications path 35 between acquiring bank subsystem 300 and financial institution subsystem 350).

Payment network subsystem 360 and issuing bank subsystem 370 may be a single entity or separate entities. For example, American Express may be both a payment network subsystem 360 and an issuing bank subsystem 370. In contrast, Visa and MasterCard may be payment networks 360, and may work in cooperation with issuing banks 370, such as Chase, Wells Fargo, Bank of America, and the like. Financial institution subsystem 350 may also include one or more acquiring banks, such as acquiring bank subsystem 300. For example, acquiring bank subsystem 300 may be the same entity as issuing bank subsystem 370. One, some, or all components of acquiring bank subsystem 300 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of payment network subsystem 360 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of issuing bank subsystem 370 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. In the case of payment network subsystem 360 and issuing bank subsystem 370 being separate entities, payment network subsystem 360 may receive data 690 from acquiring bank subsystem 300 and may then forward a request to issuing bank subsystem 370 as data 405 (e.g., via a communication path 45 between payment network subsystem 360 and issuing bank subsystem 370). In the case of payment network subsystem 360 and issuing bank subsystem 370 being the same entity, acquiring bank subsystem 300 may submit data 690 directly to issuing bank subsystem 370. Furthermore, payment network subsystem 360 may respond to acquiring bank subsystem 300 on behalf of issuing bank subsystem 370 (e.g., according to conditions agreed upon between payment network subsystem 360 and issuing bank subsystem 370). By interfacing between acquiring bank subsystem 300 and issuing bank subsystem 370, payment network subsystem 360 may reduce the number of entities that each acquiring bank subsystem 300 and each issuing bank subsystem 370 may have to interact with directly. That is, to minimize direct integration points of financial institution subsystem 350, payment network subsystem 360 may act as an aggregator for various issuing banks 370 and/or various acquiring banks 300. Financial institution subsystem 350 may also include one or more acquiring banks, such as acquiring bank subsystem 300. For example, acquiring bank subsystem 300 may be the same entity as issuing bank subsystem 370.

When issuing bank subsystem 370 receives an authorization request (e.g., directly from acquiring bank subsystem 300 as data 690 or indirectly via payment network subsystem 360 as data 405), the payment information (e.g., commerce credential information of device 100) and the purchase amount included in the authorization request may be analyzed to determine if the account associated with the commerce credential has enough credit to cover the purchase amount. If sufficient funds are not present, issuing bank subsystem 370 may decline the requested transaction by transmitting a negative authorization response to acquiring bank subsystem 300. However, if sufficient funds are present, issuing bank subsystem 370 may approve the requested transaction by transmitting a positive authorization response to acquiring bank subsystem 300 and the financial transaction may be completed. Either type of authorization response may be provided by user financial subsystem 350 to acquiring bank subsystem 300 as authorization response data or transaction status data 692 (e.g., transaction status data 692 may be provided directly from issuing bank subsystem 370 to acquiring bank subsystem 300 via communications path 35, or transaction status data 692 may be provided from payment network subsystem 360 to acquiring bank subsystem 300 based on authorization response data or transaction status data 415 that may be provided to payment network subsystem 360 from issuing bank subsystem 370 via communications path 45).

As mentioned, and as shown in FIG. 2, host electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic or commercial appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, or any combination thereof. In some embodiments, electronic device 100 may perform a single function (e.g., a device dedicated to conducting financial transactions) and, in other embodiments, electronic device 100 may perform multiple functions (e.g., a device that conducts financial transactions, plays music, and receives and transmits telephone calls). Electronic device 100 may be any portable, mobile, hand-held, or miniature electronic device that may be configured to conduct financial transactions wherever a user travels. Some miniature electronic devices may have a form factor that is smaller than that of hand-held electronic devices, such as an iPod™. Illustrative miniature electronic devices can be integrated into various objects that may include, but are not limited to, watches (e.g., an Apple Watch™ by Apple Inc.), rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, host electronic device 100 may not be portable at all, but may instead be generally stationary.

As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated on one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers or subsystems (e.g., one or more subsystems or other components of system 1) using any suitable communications protocol. For example, communications component 106 may support Wi-Fi (e.g., an 802.11 protocol), ZigBee (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. Communications component 106 may also include or be electrically coupled to any suitable transceiver circuitry (e.g., transceiver circuitry or antenna 116 via bus 118) that can enable device 100 to be communicatively coupled to another device (e.g., a host computer or an accessory device) and communicate with that other device wirelessly, or via a wired connection (e.g., using a connector port). Communications component 106 may be referred to as an online communications component when operative to communicate any suitable data to any remote server or other suitable entity (e.g., to any suitable internet connection). Communications component 106 may be configured to determine a geographical position of electronic device 100. For example, communications component 106 may utilize the global positioning system ("GPS") or a regional or site-wide positioning system that may use cell tower positioning technology or Wi-Fi technology.

Power supply 108 can include any suitable circuitry for receiving and/or generating power, and for providing such power to one or more of the other components of electronic device 100. For example, power supply 108 can be coupled to a power grid (e.g., when device 100 is not acting as a portable device or when a battery of the device is being charged at an electrical outlet with power generated by an electrical power plant). As another example, power supply 108 can be configured to generate power from a natural source (e.g., solar power using solar cells). As another example, power supply 108 can include one or more batteries for providing power (e.g., when device 100 is acting as a portable device). For example, power supply 108 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply 108 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply 108 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 110 may be provided to permit a user to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, scanner (e.g., a bar code scanner or any other suitable scanner that may obtain product identifying information from a code, such as a bar code, a QR code, or the like), proximity sensor, light detector, motion sensor, biometric sensor (e.g., a fingerprint reader or other feature recognition sensor, which may operate in conjunction with a feature-processing application that may be accessible to electronic device 100 for authenticating a user), and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, audio line-outs, visual displays, antennas, infrared ports, haptic output components (e.g., rumblers, vibrators, etc.), or combinations thereof.

As a specific example, electronic device 100 may include a display output component as output component 112. Such a display output component may include any suitable type of display or interface for presenting visual data to a user. A display output component may include a display embedded in device 100 or coupled to device 100 (e.g., a removable display). A display output component may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, a display output component can include a movable display or a projecting system for providing a display of content on a surface remote from electronic device 100, such as, for example, a video projector, a head-up display, or a three-dimensional (e.g., holographic) display. As another example, a display output component may include a digital or mechanical viewfinder, such as a viewfinder of the type found in compact digital cameras, reflex cameras, or any other suitable still or video camera. A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O interface (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen.

Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103, an application 113, and/or an application 143. Each application 103/113/143 may include, but is not limited to, one or more operating system applications, firmware applications, media playback applications, media editing applications, NFC low power mode applications, biometric feature-processing applications, or any other suitable applications. For example, processor 102 may load application 103/113/143 as a user interface program to determine how instructions or data received via an input component 110 or other component of device 100 may manipulate the way in which information may be stored and/or provided to the user via an output component 112. Application 103/113/143 may be accessed by processor 102 from any suitable source, such as from memory 104 (e.g., via bus 118) or from another device or server (e.g., via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes.

Electronic device 100 may also include near field communication ("NFC") component 120. NFC component 120 may be any suitable proximity-based communication mechanism that may enable contactless proximity-based transactions or communications between electronic device 100 and merchant subsystem 200 (e.g., merchant payment terminal 220). NFC component 120 may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. Alternatively or additionally, NFC component 120 may allow for close range communication at relatively high data rates (e.g., 370 Mbps), and may comply with any suitable standards, such as the TransferJet™ protocol. Communication between NFC component 120 or NFC component 120' and merchant subsystem 200 may occur within any suitable close range distance between the NFC component and merchant subsystem 200 (see, e.g., distance D of FIGS. 1A and 1B between NFC component 120' and merchant payment terminal 220), such as a range of approximately 2 to 4 centimeters, and may operate at any suitable frequency (e.g., 13.56 MHz). For example, such close range communication of an NFC component may take place via magnetic field induction, which may allow the NFC component to communicate with other NFC devices and/or to retrieve information from tags having radio frequency identification ("RFID") circuitry. Such an NFC component may provide a manner of acquiring merchandise information, transferring payment information, and otherwise communicating with an external device (e.g., communicating between NFC component 120' and merchant terminal 220 and/or between NFC component 120' and NFC component 120).

NFC component 120 may include any suitable modules for enabling contactless proximity-based communication between electronic device 100 and merchant subsystem 200. As shown in FIG. 2, for example, NFC component 120 may include an NFC device module 130, an NFC controller module 140, and an NFC memory module 150.

NFC device module 130 may include an NFC data module 132, an NFC antenna 134, and an NFC booster 136. NFC data module 132 may be configured to contain, route, or otherwise provide any suitable data that may be transmitted by NFC component 120 to merchant subsystem 200 as part of a contactless proximity-based or NFC communication 5. Additionally or alternatively, NFC data module 132 may be configured to contain, route, or otherwise receive any suitable data that may be received by NFC component 120 from merchant subsystem 200 as part of a contactless proximity-based communication (e.g., communication 5 between NFC component 120' and merchant terminal 220).

NFC transceiver or NFC antenna 134 may be any suitable antenna or other suitable transceiver circuitry that may generally enable communication of communication from NFC data module 132 to merchant subsystem 200 and/or to NFC data module 132 from subsystem 200. Therefore, NFC antenna 134 (e.g., a loop antenna) may be provided specifically for enabling the contactless proximity-based communication capabilities of NFC component 120.

Alternatively or additionally, NFC component 120 may utilize the same transceiver circuitry or antenna (e.g., antenna 116) that another communication component of electronic device 100 (e.g., communication component 106) may utilize. For example, communication component 106 may leverage antenna 116 to enable Wi-Fi, Bluetooth™, cellular, or GPS communication between electronic device 100 and another remote entity, while NFC component 120 may leverage antenna 116 to enable contactless proximity-based or NFC communication between NFC data module 132 of NFC device module 130 and another entity (e.g., merchant subsystem 200). In such embodiments, NFC device module 130 may include NFC booster 136, which may be configured to provide appropriate signal amplification for data of NFC component 120 (e.g., data within NFC data module 132) so that such data may be appropriately transmitted by shared antenna 116 as communication to subsystem 200. For example, shared antenna 116 may require amplification from booster 136 before antenna 116 (e.g., a non-loop antenna) may be properly enabled for communicating contactless proximity-based or NFC communication between electronic device 100 and merchant subsystem 200 (e.g., more power may be needed to transmit NFC data using antenna 116 than may be needed to transmit other types of data using antenna 116).

NFC controller module 140 may include at least one NFC processor module 142. NFC processor module 142 may operate in conjunction with NFC device module 130 to enable, activate, allow, and/or otherwise control NFC component 120 for communicating an NFC communication between electronic device 100 and merchant subsystem 200. NFC processor module 142 may exist as a separate component, may be integrated into another chipset, or may be integrated with processor 102, for example, as part of a system on a chip ("SoC"). As shown in FIG. 2, NFC processor module 142 of NFC controller module 140 may be used to run one or more applications, such as an NFC low power mode or wallet application 143 that may help dictate the function of NFC component 120. Application 143 may include, but is not limited to, one or more operating system applications, firmware applications, NFC low power applications, or any other suitable applications that may be accessible to NFC component 120 (e.g., application 103/113). NFC controller module 140 may include one or more protocols, such as the Near Field Communication Interface and Protocols ("NFCIP-1"), for communicating with another NFC device (e.g., merchant subsystem 200). The protocols may be used to adapt the communication speed and to designate one of the connected devices as the initiator device that controls the near field communication.

NFC controller module 140 may control the near field communication mode of NFC component 120. For example, NFC processor module 142 may be configured to switch NFC device module 130 between a reader/writer mode for reading information (e.g., communication 5) from NFC tags (e.g., from merchant subsystem 200) to NFC data module 132, a peer-to-peer mode for exchanging data (e.g., communication 5) with another NFC enabled device (e.g., merchant subsystem 200), and a card emulation mode for allowing another NFC enabled device (e.g., merchant subsystem 200) to read information (e.g., communication 5) from NFC data module 132. NFC controller module 140 also may be configured to switch NFC component 120 between active and passive modes. For example, NFC processor module 142 may be configured to switch NFC device module 130 (e.g., in conjunction with NFC antenna 134 or shared antenna 116) between an active mode where NFC device module 130 may generate its own RF field and a passive mode where NFC device module 130 may use load modulation to transfer data to another device generating an RF field (e.g., merchant subsystem 200). Operation in such a passive mode may prolong the battery life of electronic device 100 compared to operation in such an active mode. The modes of NFC device module 130 may be controlled based on preferences of a user and/or based on preferences of a manufacturer of device 100, which may be defined or otherwise dictated by an application running on device 100 (e.g., application 103 and/or application 143).

NFC memory module 150 may operate in conjunction with NFC device module 130 and/or NFC controller module 140 to allow for NFC communication between electronic device 100 and merchant subsystem 200. NFC memory module 150 may be embedded within NFC device hardware or within an NFC integrated circuit ("IC"). NFC memory module 150 may be tamper resistant and may provide at least a portion of a secure element. For example, NFC memory module 150 may store one or more applications relating to NFC communications (e.g., application 143) that may be accessed by NFC controller module 140. For example, such applications may include financial payment applications, secure access system applications, loyalty card applications, and other applications, which may be encrypted. In some embodiments, NFC controller module 140 and NFC memory module 150 may independently or in combination provide a dedicated microprocessor system that may contain an operating system, memory, application environment, and security protocols intended to be used to store and execute sensitive applications on electronic device 100. NFC controller module 140 and NFC memory module 150 may independently or in combination provide at least a portion of a secure element 145, which may be tamper resistant. For example, such a secure element 145 may be configured to provide a tamper-resistant platform (e.g., as a single or multiple chip secure microcontroller) that may be capable of securely hosting applications and their confidential and cryptographic data (e.g., applet 153 and key 155) in accordance with rules and security requirements that may be set forth by a set of well-identified trusted authorities (e.g., an authority of financial institution subsystem and/or an industry standard, such as GlobalPlatform). NFC memory module 150 may be a portion of memory 104 or at least one dedicated chip specific to NFC component 120. NFC memory module 150 may reside on a SIM, a dedicated chip on a motherboard of electronic device 100, or as an external plug in memory card. NFC memory module 150 may be completely independent from NFC controller module 140 and may be provided by different components of device 100 and/or provided to electronic device 100 by different removable subsystems. Secure element 145 may be a highly secure, tamper-resistant hardware component within a chip, which may be used for storing sensitive data or applications on electronic device 100. At least a portion of secure element 145 may be provided in a removable circuit card, such as a universal integrated circuit card ("UICC") or a subscriber identity module ("SIM") card, that may be used in electronic devices 100 compatible within global system for mobile communications ("GSM") networks, universal mobile telecommunications systems ("UMTS") and/or long-term evolution ("LTE") standard networks. Alternatively or additionally, at least a portion of secure element 145 may be provided in an integrated circuit that may be embedded into electronic device 100 during manufacturing of device 100. Alternatively or additionally, at least a portion of secure element 145 may be provided in a peripheral device that can be plugged into, inserted into, or otherwise coupled to electronic device 100, such as a micro secure digital ("SD") memory card.

As shown in FIG. 2, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution (e.g., commercial entity subsystem 400 and/or financial institution subsystem 350) may store keys and/or other suitable information for creating or otherwise provisioning one or more credentials (e.g., commerce credentials associated with various credit cards, bank cards, gift cards, access cards, transit passes, digital currency (e.g., bitcoin and associated payment networks), etc.) on electronic device 100 (e.g., via communications component 106), for credential content management, and/or for security domain management. A specific supplemental security domain ("SSD") 154 (e.g., SSD 154a) may be associated with a particular TSM and at least one specific commerce credential (e.g., a specific credit card credential or a specific public transit card credential) that may provide specific privileges or payment rights to electronic device 100. For example, a first payment network subsystem 360 (e.g., Visa) may be the TSM for first SSD 154a and applet 153a of first SSD 154a may be associated with a commerce credential managed by that first payment network subsystem 360, while a second payment network subsystem 360 (e.g., MasterCard) may be the TSM for another SSD 154.

Security features may be provided for enabling use of NFC component 120 (e.g., for enabling activation of commerce credentials provisioned on device 100) that may be particularly useful when transmitting confidential payment information, such as credit card information or bank account information of a credential, from electronic device 100 to merchant subsystem 200. Such security features also may include a secure storage area that may have restricted access. For example, user authentication via personal identification number ("PIN") entry or via user interaction with a biometric sensor may need to be provided to access the secure storage area (e.g., for a user to alter a life cycle state of a security domain element of the secure element). In certain embodiments, some or all of the security features may be stored within NFC memory module 150. Further, security information, such as an authentication key, for communicating with subsystem 200 may be stored within NFC memory module 150. In certain embodiments, NFC memory module 150 may include a microcontroller embedded within electronic device 100.

Merchant terminal 220 of merchant subsystem 200 of FIG. 1B may include a reader for detecting, reading, or otherwise receiving an NFC communication from electronic device 100 or electronic device 100' (e.g., communication 5 when client device 100' comes within a certain distance or proximity of merchant terminal 220). Accordingly, it is noted that an NFC communication between such a merchant terminal and electronic device 100/100' may occur wirelessly and, as such, may not require a clear "line of sight" between the respective devices. As mentioned, NFC device module 130 may be passive or active. When passive, NFC device module 130 may only be activated when within a response range of a suitable reader of such a merchant terminal. For instance, a reader of such a merchant terminal may emit a relatively low-power radio wave field that may be used to power an antenna utilized by NFC device module 130 (e.g., shared antenna 116 or NFC-specific antenna 134) and, thereby, enable that antenna to transmit suitable NFC communication information (e.g., credit card credential information) from NFC data module 132, via antenna 116 or antenna 134, to such a merchant terminal as an NFC communication. When active, NFC device module 130 may incorporate or otherwise have access to a power source local to electronic device 100 (e.g., power supply 108) that may enable shared antenna 116 or NFC-specific antenna 134 to actively transmit NFC communication information (e.g., credit card credential information) from NFC data module 132, via antenna 116 or antenna 134, to merchant terminal 220 as an NFC communication, rather than reflect radio frequency signals, as in the case of a passive NFC device module 130. Merchant terminal 220 may be provided by a merchant of merchant subsystem 200 (e.g., in a store of the merchant for selling products or services directly to the user of device 100' at the store). While NFC component 120 has been described with respect to near field communication, it is to be understood that component 120 may be configured to provide any suitable contactless proximity-based mobile payment or any other suitable type of contactless proximity-based communication between electronic device 100 and such a merchant terminal. For example, NFC component 120 may be configured to provide any suitable short-range communication, such as those involving electromagnetic/electrostatic coupling technologies.

While NFC component 120 has been described with respect to near field communication, it is to be understood that component 120 may be configured to provide any suitable contactless proximity-based mobile payment or any other suitable type of contactless proximity-based communication between electronic device 100 and merchant subsystem 200. For example, NFC component 120 may be configured to provide any suitable short-range communication, such as those involving electromagnetic/electrostatic coupling technologies. Moreover, in some embodiments, NFC component 120' of client device 100' may be the same or substantially the same as NFC component 120 of host device 100. Alternatively, in some embodiments, NFC component 120' of client device 100' may be configured to include any suitable components for enabling data available to processor 102' or any other part of device 100' to be communicated as any suitable contactless proximity-based communication between NFC component 120' of client device 100' and merchant terminal 220 of merchant subsystem 200, but NFC component 120' may or may not include a secure element operative to securely store credential applets for generating secure credential data on client device 100' for securely funding a financial transaction like the credential data native to host device 100.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing). It is to be understood that any client device 100' may include one, some, or all of the features described with respect to electronic device 100 and/or may include additional features not described with respect to electronic device 100. It is also to be understood that any host device 100 or any client device 100' may be provided as a combination of two or more devices working in conjunction with one another (e.g., a cellular telephone and a smart watch communicatively coupled via any suitable proximate communications protocol (e.g., BlueTooth™)).

As mentioned, and as shown in FIG. 3, one specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. Input component 110a may include a button that, when pressed, may cause a "home" screen or menu of a currently running application to be displayed by device 100. Input component 110b may be a button for toggling electronic device 100 between a sleep mode and a wake mode or between any other suitable modes. Input component 110c may include a two-position slider that may disable one or more output components 112 in certain modes of electronic device 100. Input components 110d and 110e may include buttons for increasing and decreasing the volume output or any other characteristic output of an output component 112 of electronic device 100. Each one of input components 110a-110e may be a mechanical input component, such as a button supported by a dome switch, a sliding switch, a control pad, a key, a knob, a scroll wheel, or any other suitable form.

An output component 112a may be a display that can be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112a. For example, as shown in FIG. 3, GUI 180 may be configured to display a first screen 190. One or more of user input components 110a-110i may be used to navigate through GUI 180. For example, one user input component 110 may include a scroll wheel that may allow a user to select one or more graphical elements or icons 182 of GUI 180. Icons 182 may also be selected via a touch screen I/O component 114a that may include display output component 112a and an associated touch input component 110f. Such a touch screen I/O component 114a may employ any suitable type of touch screen input technology, such as, but not limited to, resistive, capacitive, infrared, surface acoustic wave, electromagnetic, or near field imaging. Furthermore, touch screen I/O component 114a may employ single point or multi-point (e.g., multi-touch) input sensing.

Icons 182 may represent various layers, windows, screens, templates, elements, and/or other components that may be displayed in some or all of the areas of display component 112a upon selection by the user. Furthermore, selection of a specific icon 182 may lead to a hierarchical navigation process. For example, selection of a specific icon 182 may lead to a new screen of GUI 180 that may include one or more additional icons or other GUI elements of the same application or of a new application associated with that icon 182. Textual indicators 181 may be displayed on or near each icon 182 to facilitate user interpretation of each graphical element icon 182. It is to be appreciated that GUI 180 may include various components arranged in hierarchical and/or non-hierarchical structures. When a specific icon 182 is selected, device 100 may be configured to open a new application associated with that icon 182 and display a corresponding screen of GUI 180 associated with that application. For example, when the specific icon 182 labeled with a "Merchant App" textual indicator 181 (i.e., specific icon 183) is selected, device 100 may launch or otherwise access a specific merchant application and may display screens of a specific user interface that may include one or more tools or features for interacting with device 100 in a specific manner. For each application, screens may be displayed on display output component 112a and may include various user interface elements (e.g., screens 190a-190h of FIGS. 3A-3H). Additionally or alternatively, for each application, various other types of non-visual information may be provided to a user via various other output components 112 of device 100. The operations described with respect to various GUIs 180 may be achieved with a wide variety of graphical elements and visual schemes. Therefore, the described embodiments are not intended to be limited to the precise user interface conventions adopted herein. Rather, embodiments may include a wide variety of user interface styles.

Electronic device 100 also may include various other I/O components 114 that may allow for communication between device 100 and other devices. I/O component 114b may be a connection port that may be configured for transmitting and receiving data files, such as media files or customer order files, from a remote data source and/or power from an external power source. For example, I/O component 114b may be a proprietary port, such as a Lightning™ connector or a 30-pin dock connector from Apple Inc. of Cupertino, Calif. I/O component 114c may be a connection slot for receiving a SIM card or any other type of removable component. I/O component 114d may be a headphone jack for connecting audio headphones that may or may not include a microphone component. Electronic device 100 may also include at least one audio input component 110g, such as a microphone, and at least one audio output component 112b, such as an audio speaker.

Electronic device 100 may also include at least one haptic or tactile output component 112c (e.g., a nimbler), a camera and/or scanner input component 110h (e.g., a video or still camera, and/or a bar code scanner or any other suitable scanner that may obtain product identifying information from a code, such as a bar code, a QR code, or the like), and a biometric input component 110i (e.g., a fingerprint reader or other feature recognition sensor, which may operate in conjunction with a feature-processing application that may be accessible to electronic device 100 for authenticating a user). As shown in FIG. 3, at least a portion of biometric input component 110i may be incorporated into or otherwise combined with input component 110a or any other suitable input component 110 of device 100. For example, biometric input component 110i may be a fingerprint reader that may be configured to scan the fingerprint of a user's finger as the user interacts with mechanical input component 110a by pressing input component 110a with that finger. As another example, biometric input component 110i may be a fingerprint reader that may be combined with touch input component 110f of touch screen I/O component 114a, such that biometric input component 110i may be configured to scan the fingerprint of a user's finger as the user interacts with touch screen input component 110f by pressing or sliding along touch screen input component 110f with that finger. Moreover, as mentioned, electronic device 100 may further include NFC component 120, which may be communicatively accessible to subsystem 200 via antenna 116 and/or antenna 134 (not shown in FIG. 3). NFC component 120 may be located at least partially within housing 101, and a mark or symbol 121 can be provided on the exterior of housing 101 that may identify the general location of one or more of the antennas associated with NFC component 120 (e.g., the general location of antenna 116 and/or antenna 134).

One, some, or all of the processes described with respect to FIGS. 1-10 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 104 and/or memory module 150 of FIG. 2). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated to electronic device 100 via communications component 106 (e.g., as at least a portion of an application 103 and/or as at least a portion of an application 113 and/or as at least a portion of an application 143)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of system 1 may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 1 may be stored in or otherwise accessible to an entity of system 1 in any suitable manner (e.g., in memory 104 of device 100 (e.g., as at least a portion of an application 103 and/or as at least a portion of an application 113 and/or as at least a portion of an application 143)). For example, any or each module of NFC component 120 may be implemented using any suitable technologies (e.g., as one or more integrated circuit devices), and different modules may or may not be identical in structure, capabilities, and operation. Any or all of the modules or other components of system 1 may be mounted on an expansion card, mounted directly on a system motherboard, or integrated into a system chipset component (e.g., into a "north bridge" chip).

Any or each module or component of system 1 (e.g., any or each module of NFC component 120) may be a dedicated system implemented using one or more expansion cards adapted for various bus standards. For example, all of the modules may be mounted on different interconnected expansion cards or all of the modules may be mounted on one expansion card. With respect to NFC component 120, by way of example only, the modules of NFC component 120 may interface with a motherboard or processor 102 of device 100 through an expansion slot (e.g., a peripheral component interconnect ("PCI") slot or a PCI express slot). Alternatively, NFC component 120 need not be removable but may include one or more dedicated modules that may include memory (e.g., RAM) dedicated to the utilization of the module. In other embodiments, NFC component 120 may be integrated into device 100. For example, a module of NFC component 120 may utilize a portion of device memory 104 of device 100. Any or each module or component of system 1 (e.g., any or each module of NFC component 120) may include its own processing circuitry and/or memory. Alternatively, any or each module or component of system 1 (e.g., any or each module of NFC component 120) may share processing circuitry and/or memory with any other module of NFC component 120 and/or processor 102 and/or memory 104 of device 100.

As mentioned, an input component 110 of device 100 (e.g., input component 110o may include a touch input component that can receive touch input for interacting with other components of device 100 via wired or wireless bus 118. Such a touch input component 110 may be used to provide user input to device 100 in lieu of or in combination with other input components, such as a keyboard, mouse, and the like.

A touch input component 110 may include a touch sensitive panel, which may be wholly or partially transparent, semitransparent, non-transparent, opaque, or any combination thereof. A touch input component 110 may be embodied as a touch screen, touch pad, a touch screen functioning as a touch pad (e.g., a touch screen replacing the touchpad of a laptop), a touch screen or touch pad combined or incorporated with any other input device (e.g., a touch screen or touch pad disposed on a keyboard), or any multi-dimensional object having a touch sensitive surface for receiving touch input. In some embodiments, the terms touch screen and touch pad may be used interchangeably.

In some embodiments, a touch input component 110 embodied as a touch screen may include a transparent and/or semitransparent touch sensitive panel partially or wholly positioned over, under, and/or within at least a portion of a display (e.g., display output component 112*a*). In other embodiments, a touch input component 110 may be embodied as an integrated touch screen where touch sensitive components/devices are integral with display components/devices. In still other embodiments, a touch input component 110 may be used as a supplemental or additional display screen for displaying supplemental or the same graphical data as a primary display and to receive touch input.

A touch input component 110 may be configured to detect the location of one or more touches or near touches based on capacitive, resistive, optical, acoustic, inductive, mechanical, chemical measurements, or any phenomena that can be measured with respect to the occurrences of the one or more touches or near touches in proximity to input component 110. Software, hardware, firmware, or any combination thereof may be used to process the measurements of the detected touches to identify and track one or more gestures. A gesture may correspond to stationary or non-stationary, single or multiple, touches or near touches on a touch input component 110. A gesture may be performed by moving one or more fingers or other objects in a particular manner on touch input component 110, such as by tapping, pressing, rocking, scrubbing, rotating, twisting, changing orientation, pressing with varying pressure, and the like at essentially the same time, contiguously, or consecutively. A gesture may be characterized by, but is not limited to, a pinching, pulling, sliding, swiping, rotating, flexing, dragging, or tapping motion between or with any other finger or fingers. A single gesture may be performed with one or more hands, by one or more users, or any combination thereof.

As mentioned, electronic device 100 may drive a display (e.g., display output component 112*a*) with graphical data to display a graphical user interface ("GUI") 180. GUI 180 may be configured to receive touch input via a touch input component 110*f*. Embodied as a touch screen (e.g., with display output component 112*a* as I/O component 114*a*), touch I/O component 110*f* may display GUI 180. Alternatively, GUI 180 may be displayed on a display (e.g., display output component 112*a*) separate from touch input component 110*f*. GUI 180 may include graphical elements displayed at particular locations within the interface. Graphical elements may include, but are not limited to, a variety of displayed virtual input devices, including virtual scroll wheels, a virtual keyboard, virtual knobs, virtual buttons, any virtual user interface ("UI"), and the like. A user may perform gestures at one or more particular locations on touch input component 110*f*, which may be associated with the graphical elements of GUI 180. In other embodiments, the user may perform gestures at one or more locations that are independent of the locations of graphical elements of GUI 180. Gestures performed on a touch input component 110 may directly or indirectly manipulate, control, modify, move, actuate, initiate, or generally affect graphical elements, such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad may generally provide indirect interaction. Gestures may also affect non-displayed GUI elements (e.g., causing user interfaces to appear) or may affect other actions of device 100 (e.g., affect a state or mode of a GUI, application, or operating system). Gestures may or may not be performed on a touch input component 110 in conjunction with a displayed cursor. For instance, in the case in which gestures are performed on a touchpad, a cursor or pointer may be displayed on a display screen or touch screen and the cursor or pointer may be controlled via touch input on the touchpad to interact with graphical objects on the display screen. Alternatively, when gestures are performed directly on a touch screen, a user may interact directly with objects on the touch screen, with or without a cursor or pointer being displayed on the touch screen. Feedback may be provided to the user via bus 118 in response to or based on the touch or near touches on a touch input component 110. Feedback may be transmitted optically, mechanically, electrically, olfactory, acoustically, or the like or any combination thereof and in a variable or non-variable manner.

FURTHER APPLICATIONS OF DESCRIBED CONCEPTS

While there have been described systems, methods, and computer-readable media for conducting a transaction using an electronic device with a non-native credential, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method comprising:
   at a host electronic device:
      receiving, from a client electronic device that is associated with a same user account as the host electronic device, payment request data corresponding to a financial transaction between the client electronic device and a merchant subsystem, the payment request data comprising:
         merchant subsystem identifier information that identifies the merchant subsystem; and
         host credential application identifier information that identifies a host credential application provisioned on a secure element of the host electronic device;
      generating, on the secure element using the host credential application identified by the received payment request data, first data that comprises host payment credential data;
   generating, on the secure element, second data by encrypting the first data and the merchant subsystem identifier information of the received payment request data with a first key;
   transmitting, to a commercial entity subsystem, the second data;
   receiving third data that comprises the first data encrypted with a second key that is associated with the merchant subsystem identifier information; and
   transmitting the received third data to fund at least a portion of the financial transaction between the client electronic device and the merchant subsystem.

2. The method of claim 1, wherein:
the first key is not accessible to the merchant subsystem; and
the second key is not accessible to the host electronic device.

3. The method of claim 1, wherein the third data is not encrypted with the first key.

4. The method of claim 1, wherein the first key is accessible to the commercial entity subsystem.

5. The method of claim 1, wherein:
the generating the first data comprises generating the first data by encrypting the host payment credential data with a third key; and
at least a portion of the third data is encrypted with the third key.

6. The method of claim 5, wherein the third key is not accessible to the merchant subsystem.

7. The method of claim 5, wherein the third key is not accessible to the commercial entity subsystem.

8. The method of claim 1, wherein the receiving the third data comprises receiving the third data from the commercial entity subsystem after the transmitting the generated second data.

9. The method of claim 1, further comprising, prior to the generating the second data, receiving, at the host electronic device, the first key from the commercial entity subsystem.

10. The method of claim 1, wherein the transmitting the received third data comprises transmitting the received third data to the client electronic device.

11. The method of claim 10, wherein:
the second key is not accessible to the host electronic device; and
the second key is not accessible to the client electronic device.

12. The method of claim 10, further comprising:
at the client electronic device:
  accessing potential transaction data via an online resource of the merchant subsystem;
  identifying the merchant subsystem identifier information from the accessed potential transaction data; and
  generating the payment request data using the identified merchant subsystem identifier information.

13. The method of claim 12, further comprising:
at the client electronic device:
  receiving the third data transmitted by the host electronic device; and
  transmitting the received third data to the merchant subsystem using the accessed online resource.

14. The method of claim 12, further comprising:
at the client electronic device:
  identifying at least one payment type acceptable to the merchant subsystem from the accessed potential transaction data; and
  transmitting a host availability request that identifies the identified at least one payment type.

15. The method of claim 14, further comprising:
prior to the receiving the payment request data, at the host electronic device:
  receiving the transmitted host availability request;
  determining that the host credential application satisfies the identified at least one payment type of the received host availability request; and
  based on the determination, transmitting a host availability response comprising the host credential application identifier information.

16. The method of claim 1, further comprising:
prior to the receiving the payment request data, at the host electronic device:
  receiving, from the client electronic device, a host availability request; and
  based on the received host availability request, transmitting, to the client electronic device, a host availability response comprising the host credential application identifier information.

17. The method of claim 1, wherein the receiving the payment request data comprises the host electronic device receiving the payment request data from the client electronic device via an online communications path.

18. The method of claim 1, wherein the transmitting the received third data comprises transmitting the received third data from the host electronic device to the client electronic device via an online communications path.

19. The method of claim 1, wherein:
the transmitting the received third data comprises transmitting the received third data to the client electronic device; and
the method further comprises the client electronic device transmitting the third data to the merchant subsystem.

20. The method of claim 1, wherein:
the payment request data further comprises a unique payment request identifier; and
the transmitting the received third data comprises transmitting the received third data and the unique payment request identifier to the client electronic device.

21. A host electronic device comprising:
a communications component;
a secure element and a host credential application provisioned on the secure element; and
a processor that:
  receives, from a client electronic device using the communications component, payment request data corresponding to a transaction between the client electronic device and a merchant subsystem, the payment request data comprising:
    merchant identifier information that identifies the merchant subsystem; and
    host credential application identifier information that identifies the host credential application provisioned on the secure element;
  generates, on the secure element using the host credential application identified by the received payment request data, first data that comprises host payment credential data;
  generates, on the secure element, second data by encrypting the first data with a first key;
  transmits, to a commercial entity subsystem using the communications component, the second data and the merchant identifier information of the received payment request data; and
  receives third data that comprises the first data encrypted with a second key that is associated with the merchant identifier information.

22. The host electronic device of claim 21, wherein the first key is not accessible to the merchant subsystem.

23. The host electronic device of claim 21, wherein the second key is not accessible to the host electronic device.

24. The host electronic device of claim 21, wherein the third data is not encrypted with the first key.

25. The host electronic device of claim 21, wherein the first key is accessible to the commercial entity subsystem.

26. The host electronic device of claim 21, wherein:
the processor generates the first data by encrypting the host payment credential data with a third key; and at least a portion of the third data is encrypted with the third key.

27. The host electronic device of claim 26, wherein the third key is not accessible to the merchant subsystem.

28. The host electronic device of claim 26, wherein the third key is not accessible to the commercial entity subsystem.

29. The host electronic device of claim 21, wherein the processor transmits the received third data to the client electronic device.

30. The host electronic device of claim 29, wherein:
the second key is not accessible to the host electronic device; and
the second key is not accessible to the client electronic device.

31. The host electronic device of claim 21, wherein, prior to receiving the payment request data, the processor:
receives, from the client electronic device using the communications component, a host availability request; and
based on the received host availability request, transmits, to the client electronic device using the communications component, a host availability response comprising the host credential application identifier information.

32. The host electronic device of claim 21, wherein:
the payment request data further comprises a unique payment request identifier; and
the processor transmits the received third data and the unique payment request identifier to the client electronic device.

33. A non-transitory computer-readable storage medium storing at least one program, the at least one program comprising instructions, which when executed by a host electronic device comprising a secure element and a host credential application provisioned on the secure element, cause the host electronic device to:
receive, from a client electronic device, payment request data that comprises:
a merchant identifier that identifies a merchant subsystem; and
a host credential application identifier that identifies the host credential application;
generate, on the secure element using the host credential application identified by the received payment request data, first data that comprises host payment credential data;
generate second data by encrypting the first data with a first key; and
transmitting, to a commercial entity subsystem, the second data and the merchant identifier of the received payment request data.

34. The non-transitory computer-readable storage medium of claim 33, wherein the instructions, when executed by the host electronic device, further cause the host electronic device to receive third data that comprises the first data encrypted with a second key that is associated with the merchant subsystem identifier information.

35. The non-transitory computer-readable storage medium of claim 34, wherein the instructions, when executed by the host electronic device, further cause the host electronic device to transmit the received third data to fund at least a portion of a financial transaction.

\* \* \* \* \*